United States Patent
Isberg et al.

(10) Patent No.: US 11,697,498 B2
(45) Date of Patent: Jul. 11, 2023

(54) LAUNCHING UNMANNED AERIAL VEHICLES

(71) Applicants: SONY CORPORATION, Tokyo (JP); SONY EUROPE B.V., Weybridge (GB)

(72) Inventors: Anders Isberg, Åkarp (SE); Pär Spjuth, Södra Sandby (SE); Hannes Bergkvist, Rydebäck (SE); Peter Exner, Malmö (SE); Shaun Lee, Winchester (GB)

(73) Assignee: Sony Group Corporation, Tokyo (JP)

( * ) Notice: Subject to any disclaimer, the term of this patent is extended or adjusted under 35 U.S.C. 154(b) by 291 days.

(21) Appl. No.: 17/176,301

(22) Filed: Feb. 16, 2021

(65) Prior Publication Data

US 2021/0300552 A1 Sep. 30, 2021

(30) Foreign Application Priority Data

Mar. 27, 2020 (SE) .................................... 2050344-7

(51) Int. Cl.
*B64C 39/02* (2023.01)
*B64F 1/36* (2017.01)
(Continued)

(52) U.S. Cl.
CPC .............. *B64C 39/024* (2013.01); *B64F 1/10* (2013.01); *B64F 1/364* (2013.01);
(Continued)

(58) Field of Classification Search
CPC ................................................. G06Q 10/06315
See application file for complete search history.

(56) References Cited

U.S. PATENT DOCUMENTS 6,874,729 B1 * 4/2005 McDonnell ............. B64C 25/68
244/63
9,262,929 B1 2/2016 Roy et al.
(Continued)

FOREIGN PATENT DOCUMENTS

CN 104494503 A 4/2015
EP 3246776 A1 11/2017
(Continued)

OTHER PUBLICATIONS

"Office Action with Swedish Search Report", SE Application No. 2050344-7, dated Oct. 6, 2020, 9 pp.

*Primary Examiner* — Peter D Nolan
*Assistant Examiner* — Jacob Kent Besteman-Street
(74) *Attorney, Agent, or Firm* — Myers Bigel, P.A.

(57) ABSTRACT

A system performs a control method to launch an unmanned aerial vehicle, UAV. The control method includes calculating a selected altitude, relative to a reference level, for launching the UAV, operating a lifting arrangement to vertically elevate the UAV to the selected altitude, and causing the UAV to be launched from the selected altitude. Elevating the UAV may improve the performance of the UAV in terms of range, power consumption, ability to carry payload, transit time to destination, etc. The selected altitude may be calculated as a function of parameter data representing any of the UAV, the lifting arrangement, or surrounding conditions. An apparatus is further provided to determine an optimal location of the system in relation to a plurality of destinations of UAVs to be elevated by the system.

20 Claims, 23 Drawing Sheets

(51) Int. Cl.
  *B64F 1/10*   (2006.01)
  *G06Q 50/28*  (2012.01)
  *G06Q 10/0631* (2023.01)
  *B64U 70/80*  (2023.01)
  *B64U 101/30* (2023.01)
  *B64U 101/60* (2023.01)

(52) U.S. Cl.
  CPC ....... *G06Q 10/06315* (2013.01); *G06Q 50/28*
   (2013.01); *B64U 70/80* (2023.01); *B64U*
  *2101/30* (2023.01); *B64U 2101/60* (2023.01);
       *B64U 2201/10* (2023.01)

(56) References Cited

U.S. PATENT DOCUMENTS

| | | |
|---|---|---|
| 9,915,956 B2 | 3/2018 | Bokeno et al. |
| 2017/0267343 A1 | 9/2017 | Chen et al. |
| 2018/0290763 A1 | 10/2018 | Huang |
| 2018/0350243 A1 | 12/2018 | Priest |
| 2019/0197643 A1 | 6/2019 | Cochran et al. |
| 2020/0065762 A1 | 2/2020 | Briggs et al. |
| 2022/0340300 A1* | 10/2022 | X ............................. B64F 1/222 |

FOREIGN PATENT DOCUMENTS

| | | |
|---|---|---|
| KR | 20190100089 A | 8/2019 |
| WO | 2017190026 A2 | 11/2017 |

\* cited by examiner

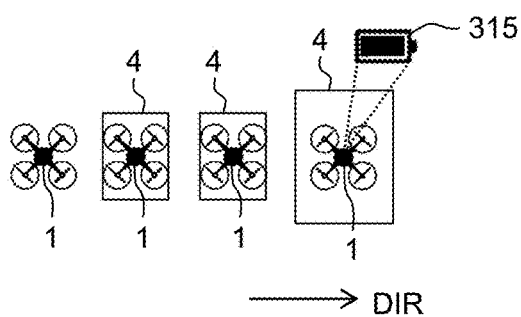
FIG. 27A
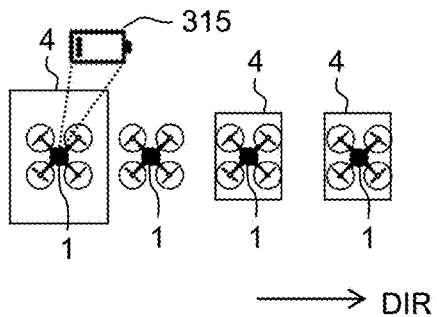
FIG. 27B
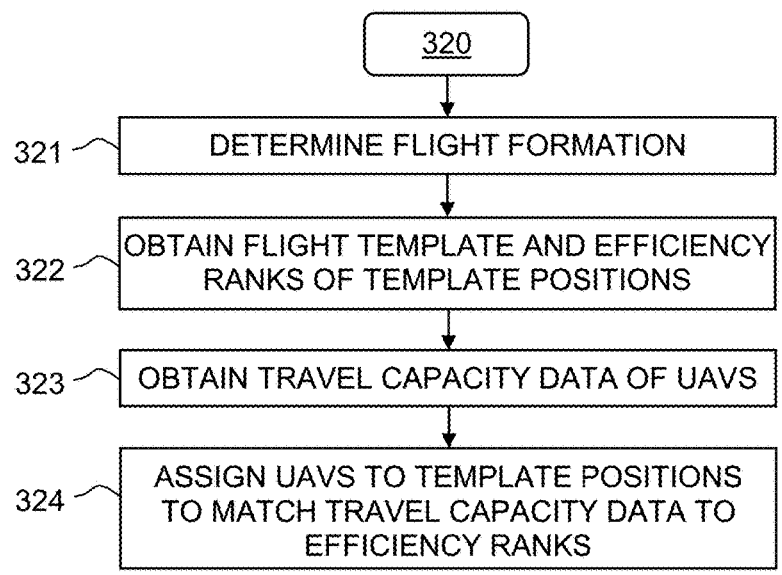
FIG. 28
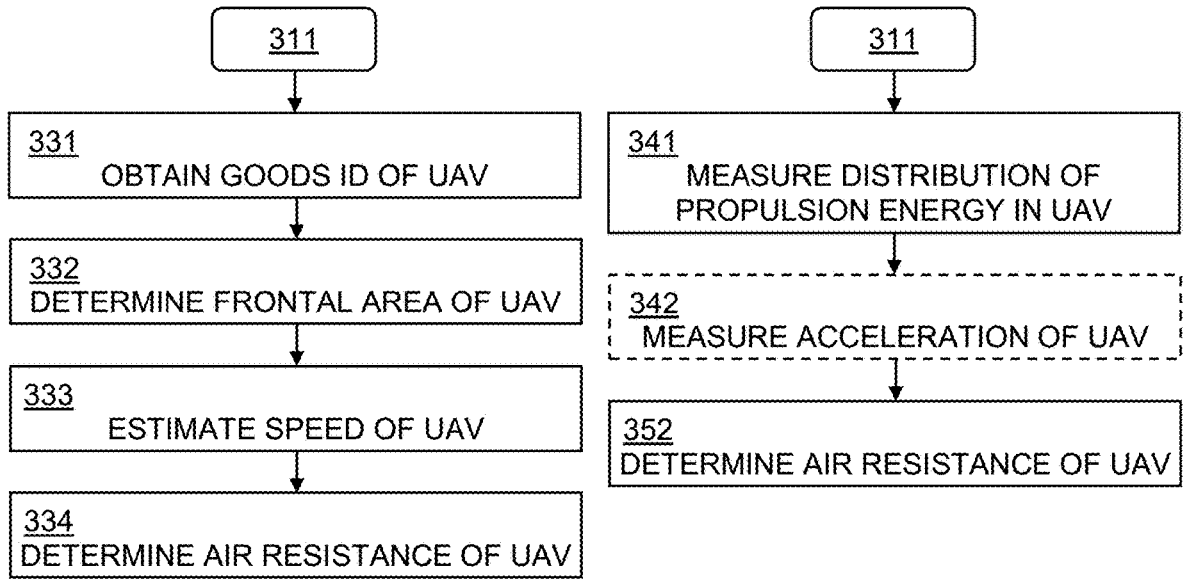
FIG. 29A
FIG. 29B

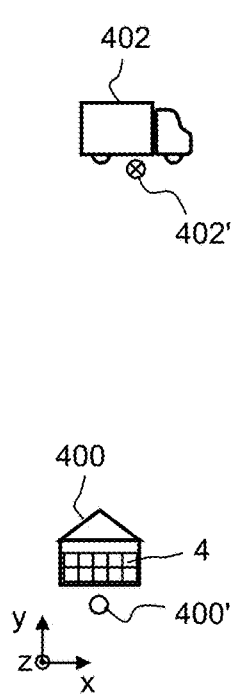
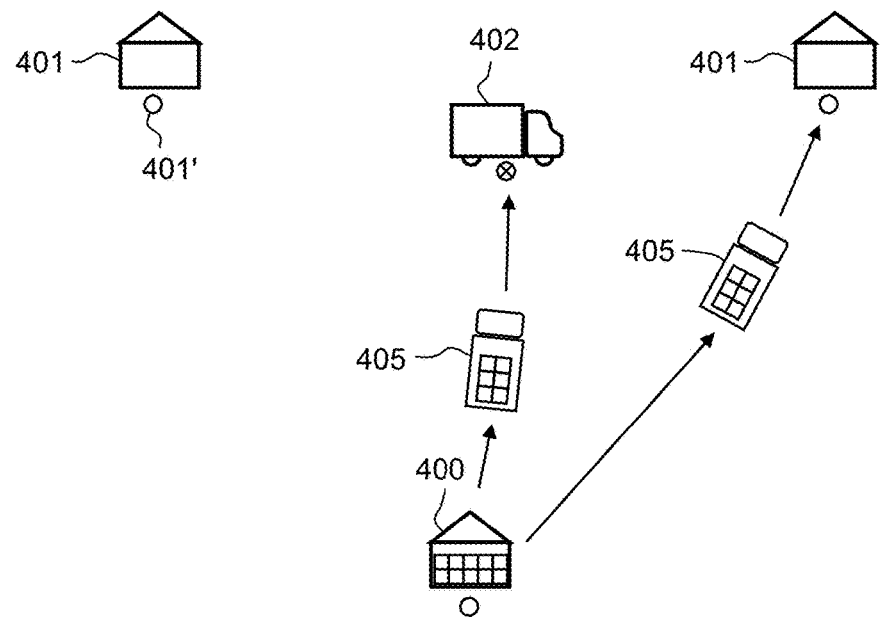
FIG. 33A
FIG. 33B
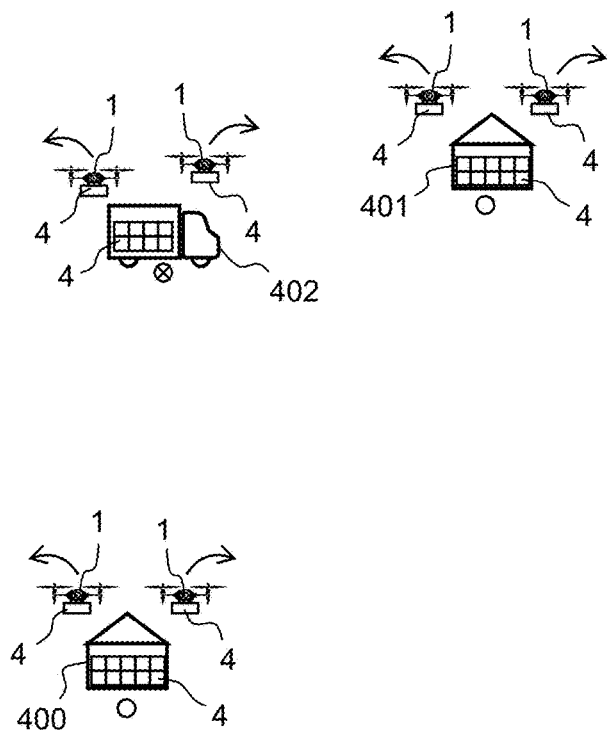
FIG. 33C
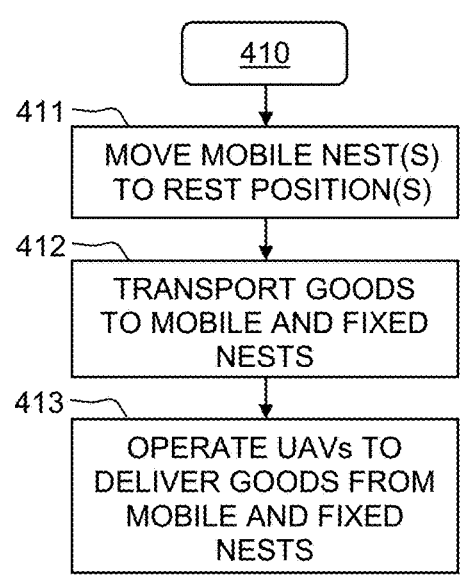
FIG. 34A

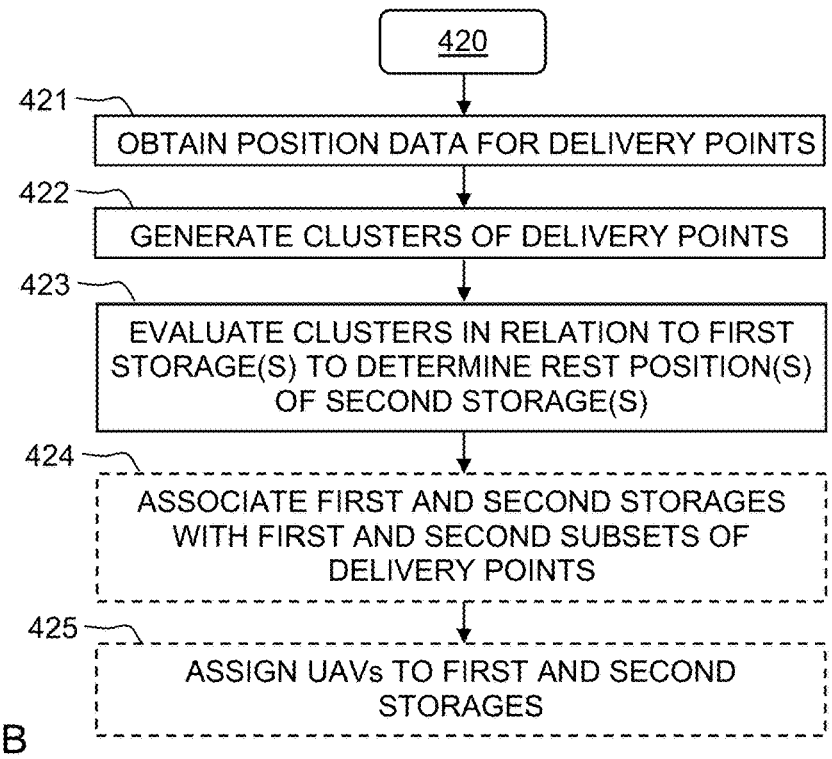
FIG. 34B
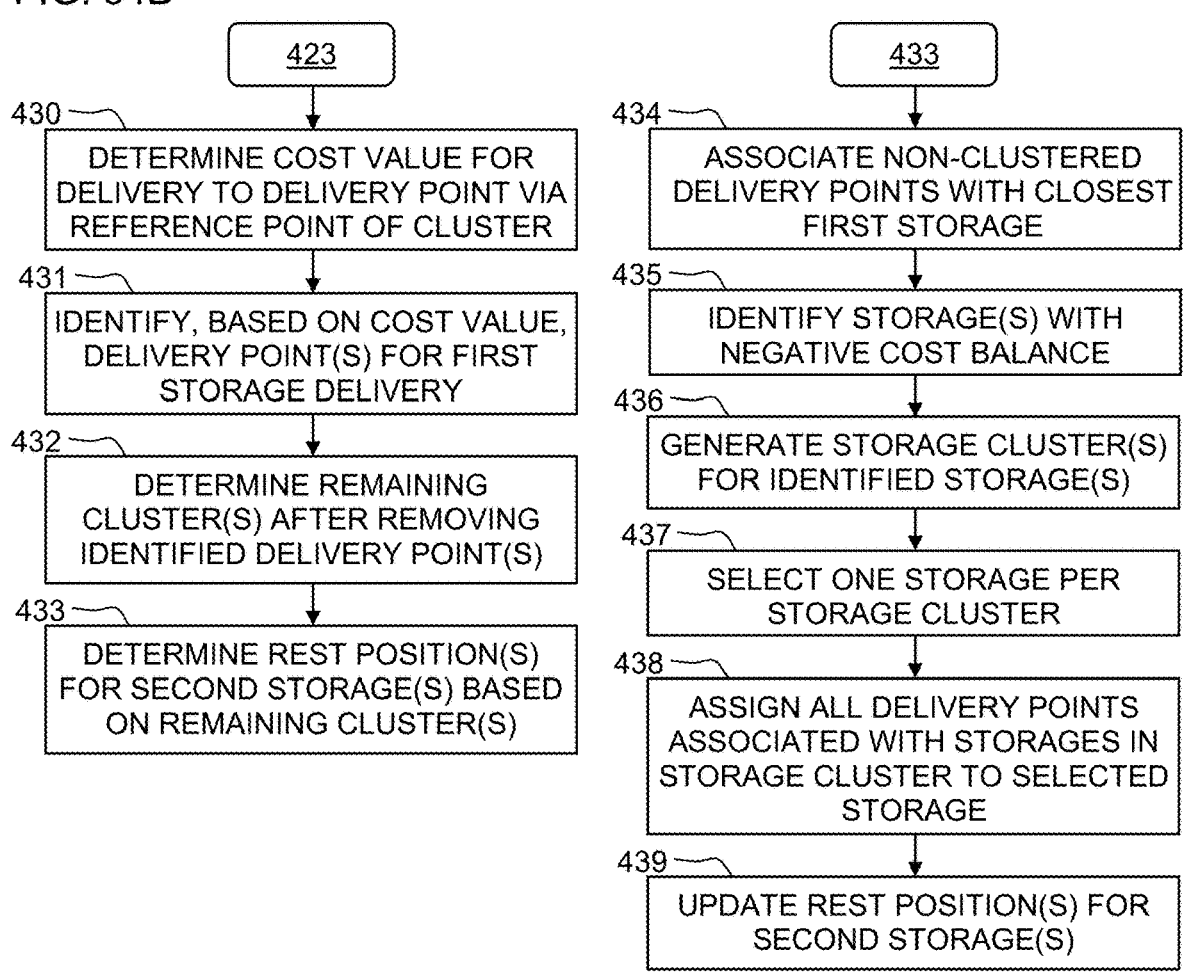
FIG. 34C                    FIG. 34D

LAUNCHING UNMANNED AERIAL VEHICLES

RELATED APPLICATION

The present application claims the benefit of and priority to Swedish Patent Application No. 2050344-7, filed Mar. 27, 2020, the disclosure of which is incorporated herein by reference in its entirety.

TECHNICAL FIELD

The present disclosure relates generally to delivery of goods by use of unmanned aerial vehicles and, in particular, to improved launching of unmanned aerial vehicles.

BACKGROUND ART

Advancements in autonomous aerial vehicle technology are opening up new possibilities in the area of goods delivery systems. Unmanned Aerial Vehicles (UAVs), otherwise known as drones, have been configured to carry and deliver various types of goods. Such goods may, for example, include packages that would otherwise be personally delivered from land-based delivery vehicles, such as automobiles and trucks.

UAVs may be launched from fixed stations, for example at a centralized storage facility. It is also known to launch UAVs from mobile stations, for example as disclosed in WO2017/190026, in which a delivery vehicle is configured to operate as a mobile hub for UAV-based parcel deliveries. The delivery vehicle comprises a plurality of UAVs configured to take off from a roof panel of the delivery vehicle, deliver parcels to consignee locations, and return to the delivery vehicle for landing on the roof panel.

Given that UAVs are self-powered, deployment of UAVs for delivery of goods is demanding in terms of operational characteristics such as power consumption, range and payload capacity of the UAVs.

BRIEF SUMMARY

It is an objective to at least partly overcome one or more limitations of the prior art.

Another objective is to provide a technique of reducing the power consumption and/or increasing the range of UAVs used for delivering goods.

A further objective is to provide a technique of increasing the payload capacity of UAVs used for delivering goods.

Yet another objective is to provide a technique of reducing the transit time of UAVs from launch to delivery.

One or more of these objectives, as well as further objectives that may appear from the description below, are at least partly achieved by a system for launching an unmanned aerial vehicle, an apparatus for configuring a delivery system and a computer-implemented method according to the independent claims, embodiments thereof being defined by the dependent claims.

Still other objectives, as well as features, aspects and technical effects will appear from the following detailed description, from the attached claims as well as from the drawings.

BRIEF DESCRIPTION OF DRAWINGS

Embodiments will now be described in more detail with reference to the accompanying schematic drawings.

FIGS. 27A-27B are top plan views of an example group of UAVs on mission to deliver goods, illustrating example arrangements of UAVs based on air resistance.

FIG. 28 is a flow chart of an example procedure for determining relative positions of UAVs.

FIGS. 29A-29C are flow charts of example procedures for determining air resistance of UAVs.

FIGS. 33A-33C illustrate an example delivery system configured in accordance with an embodiment.

FIGS. 34A-34D are flow charts of example methods of configuring a delivery system for delivery of goods by use of UAVs according to embodiments.

DETAILED DESCRIPTION OF EXAMPLE EMBODIMENTS

Figure 1:
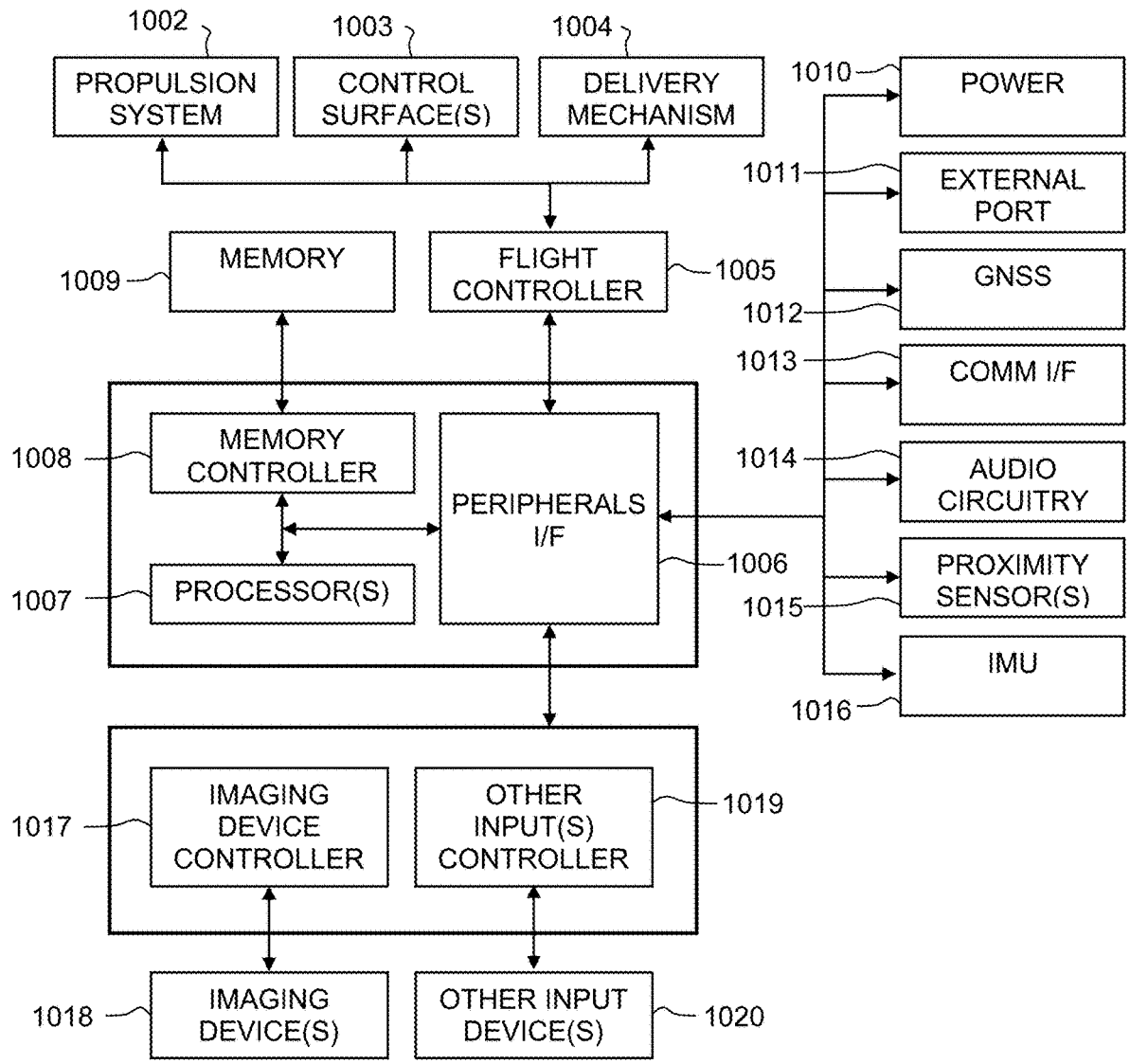
FIG. 1 is a block diagram of an example UAV according to some embodiments.

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. The term "compute", and derivatives thereof, is used in its conventional meaning and may be seen to involve performing a calculation involving one or more mathematical operations to produce a result, for example by use of a computer.

As used herein, the terms "multiple", "plural" and "plurality" are intended to imply provision of two or more items, whereas the term a "set" of items is intended to imply a provision of one or more items. The term "and/or" includes any and all combinations of one or more of the associated listed items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Like numerals refer to like elements throughout.

Before describing embodiments in more detail, a few definitions will be given.

As used herein, "unmanned aerial vehicle" (UAV) refers to an aircraft without an onboard human pilot. The UAV may be controlled by an onboard automated control system, a ground-based control system or by a ground-based human pilot. Such an aircraft is also known as a drone or an "uncrewed aerial vehicle". Other synonyms or variants encompassed by the term UAV as used herein comprise RPAS (Remotely Piloted Aircraft System), UAS (Unmanned Aircraft System), MAV (Micro Air Vehicle), and sUAS (small Unmanned Aircraft System). Examples of UAVs include multi-rotor drones (such as tricopters, quadcopters, hexacopters, octocopters, etc.), fixed-wing drones, single-rotor helicopter drones, and fixed wing hybrid VTOL (vertical takeoff and landing) drones. The UAV may, but need not, comprise a propulsion system.

As used herein, "payload" refers to any load carried by a vehicle exclusive of what is necessary for its operation. The payload may comprise any type of item to be delivered by the vehicle, for example to a final destination or an intermediate storage. For example, the payload may comprise goods or merchandises, optionally contained in one or more parcels, packages, containers, bags, etc.

Embodiments relate to various aspects of systems and methods that at least partly rely on UAVs for goods delivery. The following description is separated into Chapters 1-5 dealing with inventive concepts for UAV-based delivery. The separation into chapters is made for clarity of presentation and does not imply that the concepts cannot be combined. On the contrary, the concepts and embodiments thereof may indeed be combined in various constellations to achieve corresponding synergistic effects, as will be appreciated by the persons skilled in the art.

Generally, a UAV for use in a delivery system may be considered to comprise a main body or structure, a control system, and a mechanism for holding a payload. The control system comprises logic which is configured to control the operation of the UAV. The logic may be implemented in hardware, software or a combination of both hardware and software.

A detailed example of a UAV is depicted in FIG. 1. As shown, the UAV may include a propulsion system 1002, control surfaces 1003, a delivery mechanism 1004, a flight controller 1005, a peripherals interface 1006, one or more processors 1007, a memory controller 1008, a memory 1009, a power system 1010, an external port 1011, a GNSS module 1012, a communication interface 1013, audio circuitry 1014, a proximity sensor 1015, an inertial measurement unit (IMU) 1016, an imaging device controller 1017 and one or more associated imaging devices 1018, and any other input controllers 1019 and input devices 1020. One or more of these components may communicate over one or more communication buses or signal lines as represented by arrows in FIG. 1.

FIG. 1 is only one example of a UAV system. A UAV may thus include more or fewer components than those shown in FIG. 1, may combine two or more components as functional units, or a may have a different configuration or arrangement of the components. Some of the various components shown in FIG. 1 may be implemented in hardware, software or a combination of both hardware and software, including one or more signal processing and/or application-specific integrated circuits.

In some embodiments, the propulsion system 1002 may comprise one or more of a fixed-pitch rotor, a variable-pitch rotor, a variable-pitch jet engine, or any other mode of propulsion having the effect of providing a thrust force. The propulsion system 1002 may be operable to vary the applied thrust force, for example via an electronic speed controller varying the speed of each rotor. Further, according to some embodiments, the propulsion system 1002 may include a propulsion sub-system dedicated to the delivery mechanism 1104 to enable maneuvering of a payload independently from the main body of the UAV.

In some embodiments, the UAV may include control surfaces 1003 such as flaps, rudders, ailerons, etc. The control surfaces 1003 may comprise components for adjustment such as electric motors, cable pulley systems, or hydraulic systems.

The delivery mechanism 1004 may comprise the above-mentioned payload holder, which may comprise a coupling operable to secure and release a payload.

The flight controller 1005 (sometimes referred to as "navigation system" or "autopilot") may include a combination of hardware and/or software configured to receive input data (for example, sensor data from image device(s) 1018 and/or proximity sensor(s) 1015), interpret the input data and output control signals to the propulsion system 1002, control surfaces 1003, and/or delivery mechanism 1004. Alternatively or in addition, the flight controller 1005 may be configured to receive control commands generated by another component or device (for example, processor(s) 1007 and/or a remote computing device), interpret those control commands and output control signals for the propulsion system 1002, control surfaces 1003, and/or delivery mechanism 1004.

The peripherals interface (I/F) 1006 may couple input and output peripherals to the processor(s) 1007 and memory 1009. The one or more processors 1007 may run or execute various software programs and/or sets of instructions stored in memory 1009 to perform various functions for the UAV and to process data. In some embodiments, processor(s) 1007 may include a general central processing unit (CPU), a specialized processing unit such as a Graphical Processing Unit (GPUs), for example suited to parallel processing applications, or any combination thereof. The memory 1009 may include one or more computer-readable storage mediums, such as high-speed random access memory, and/or non-volatile memory, such as one or more magnetic disk storage devices, flash memory devices, or other non-volatile solid-state memory devices. Access to memory 1009 by other components such as the processor(s) 1007 and the peripherals I/F 1006 may be controlled by the memory controller 1008. In some embodiments, the peripherals I/F 1006, the processor(s) 1007, and the memory controller 1008 may be implemented on a single integrated chip (indicated by solid rectangle). In other embodiments, one or more of the peripherals I/F 1006, the memory controller 1008, and the processor(s) 1009 may be implemented on separate chips.

In some embodiments, the UAV includes a power system 1010 for powering its various components. The power system 1310 may include a power management system, one or more local power sources such as battery, fuel cell, etc., a recharging system, a power failure detection circuit, a power converter or inverter, a power status indicator and any other components associated with the generation, management and distribution of power in a computerized device.

In some embodiments, a communication module (not shown) may facilitate wired communication with other devices over one or more external ports 1011. The external port(s) 1011 (for example, USB, FIREWIRE, etc.) may be adapted for coupling directly to other devices or indirectly over a network (for example, the Internet, wireless LAN, etc.).

In some embodiments, the UAV may include a receiver such as a Global Navigation Satellite System (GNSS) receiver 1012 for obtaining a position of the UAV. The GNSS receiver 1012 may be configured for communication with any satellite navigation system such as GPS, GLONASS, Galileo or BeiDou. FIG. 1 shows a GNSS receiver 1012 coupled to the peripherals I/F 1006. Alternately, the GNSS receiver 1012 may be coupled to an input controller 1019. The GNSS receiver 1012 may determine a current global position of the UAV based on satellite signals.

The communication interface (I/F) 1013 may facilitate transmission and reception of communication signals, for example, in the form of electromagnetic signals. The transmission and reception of communication signals may be carried out wirelessly, for example via a radiofrequency (RF) transceiver. In some embodiments, the communication I/F 1013 may include RF circuitry. In such embodiments, the RF circuitry may convert electrical signals to/from electromagnetic signals and communicate with communication networks and other communication devices via the electromagnetic signals. The RF circuitry may include well-known circuitry for transmission and reception of communication signals, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and reception of data over communication networks (including public, private, local, and wide area). For example, wireless communication may be over a wide area network (WAN), a cellular telephone network, a local area network (LAN), or any other mode of wireless communication. The wireless communication may use any of a plurality of communication standards, protocols and technologies, including but not limited to GSM, EDGE, HSDPA, W-CDMA, CDMA, TDMA, LTE, 5G, Bluetooth, VoIP, Wi-MAX, or any other suitable communication protocol(s).

The audio circuitry 1014 may include one or more of a speaker and a microphone and may provide an audio interface between the surrounding environment and the UAV. The audio circuitry 1014 may receive audio data from the peripherals I/F 1006, convert the audio data to an electrical signal, and transmit the electrical signal to the speaker. The speaker may convert the electrical signal to human-audible sound waves. The audio circuitry 1014 may also receive electrical signals converted by the microphone from sound waves. The audio circuitry 1014 may convert the electrical signal to audio data and transmit the audio data to the peripherals I/F 1006 for processing. Audio data may be retrieved from and/or transmitted to memory 1009 and/or the communication I/F 1013 by the peripherals I/F 1006.

The UAV may include one or more proximity sensors 1015. FIG. 1 shows a proximity sensor 1015 coupled to the peripherals I/F 1006. Alternately, the proximity sensor 1015 may be coupled to an input controller 1019. Proximity sensors 1015 may generally include remote sensing technology for proximity detection, range measurement, target identification, etc. For example, proximity sensors 1015 may include radio-based sensors (for example radar), audio-based sensors (for example sonar), optical-based sensors (for example LIDAR), etc.

The UAV may include one or more IMUs 1016. The IMU 1016 may measure and report one or more of velocity, acceleration, orientation, and gravitational forces. The IMU 1016 may include one or more subcomponents such as gyroscopes, accelerometers, magnetometers, etc. While FIG. 1 shows the IMU 1016 coupled to the peripherals I/F 1006, it may alternatively be coupled to an input controller 1019. Further, the IMU 1016 may be supplemented or replaced by individual gyroscopes, accelerometers, magnetometers, etc.

The UAV may include at least one imaging device 1018. In the example of FIG. 1, the imaging device 1018 is coupled to an imaging device controller 1017 in an I/O subsystem (indicated by solid rectangle). The respective imaging device 1018 may comprise imaging optics and an optical sensor responsive to electromagnetic radiation. The respective imaging device 1018 may be responsive to electromagnetic radiation in any wavelength range, including but not limited to ultraviolet, visible or infrared radiation, or any part or combination thereof. The optical sensor may comprise a digital image sensor such as a CCD or CMOS sensor. As used herein, a combination of an optical sensor and imaging optics may be referred to as a "camera". In conjunction with an imaging module located in memory 1009, the imaging device(s) 1018 may capture digital images (including still images and/or video), which may be mono- or polychromatic. In some embodiments, the imaging device(s) 1018 may comprise a single fixed camera. In some embodiments, the imaging device(s) 1018 may comprise a camera with adjustable orientation, for example by use of a gimbal mechanism with one or more axes of motion. In some embodiments, the imaging device(s) 1018 may comprise a camera with a wide-angle lens providing a wider field of view. In some embodiments, the imaging device(s) 1018 may comprise an array of multiple cameras providing up to a full 360 degree view in all directions. In some embodiments, the imaging device(s) 1018 may comprise two or more cameras placed next to each other in order to provide stereoscopic vision. In some embodiments, the imaging device(s) 1018 may comprise multiple cameras of any combination as described above. In some embodiments, the UAV may comprise one or more cameras dedicated for image capture for navigation, for example using visual inertial odometry (VIO).

In some embodiments, the input controller 1019 may receive/send electrical signals from/to one or more other input or control devices 1020, such as physical buttons (e.g., push buttons, rocker buttons, etc.), dials, touch screen displays, slider switches, joysticks, click wheels, and so forth. A touch screen display may be used to implement virtual or soft buttons and one or more soft keyboards and may provide an input interface and an output interface between the UAV and a user. In some embodiments, the other control devices 1020 comprise a code reader for detecting machine-readable codes from payload(s) carried by the UAV. The machine-readable codes may comprise a sequence of characters, a bar code, a 2D code, etc.

In some embodiments, software components stored in memory 1009 may include an operating system, and a set of modules or applications, such as a communication module, a flight control module, a navigation module, a computer vision (CV) module, or a graphics module. For clarity, such modules are not shown in FIG. 1. The operating system (for example, Darwin, RTXC, LINUX, UNIX, OS X, WINDOWS, or an embedded operating system such as Vx Works) may comprise various software components and/or drivers for controlling and managing general system tasks (for example, memory management, storage device control, power management, etc.) and facilitates communication between various hardware and software components. The graphics module may include various software components for processing, rendering and displaying graphics data. As used herein, the term "graphics" may include any object that can be displayed to a user, including without limitation text, still images, videos, animations, icons, and the like. The graphics module in conjunction with a GPU may process in real time or near real time, graphics data captured by imaging device(s) 1018 and/or proximity sensors 1015. The CV module, which may be a component of the graphics module, may provide analysis and recognition of graphics data. For example, while the UAV is in flight, the CV module along with the graphics module (if separate), the processor(s) 1007, and imaging device(s) 1018 and/or proximity sensors 1015 may recognize and track the captured image of one or more objects in the physical environment. The CV module may further communicate with the navigation module and/or the flight control module to update a relative position between the UAV and a point of reference, for example a target object such as a payload, a delivery surface, a landing site, etc. The navigation module may determine the position and/or orientation of the UAV and other objects and provide this information for use in various modules and applications, for example the flight control module which thereby generates commands for use by the flight controller 1005. Each of the above identified modules and applications may correspond to a set of instructions for performing one or more functions described above. Described modules need not be implemented as separate software programs, procedures or modules, and thus various subsets of the described modules may be combined or otherwise re-arranged in various embodiments. In some embodiments, memory 1009 may store a subset of the modules and data structures identified above. Furthermore, memory 1009 may store additional modules and data structures not described above.

1. Safeguarded Delivery of Goods by Uavs

This part of the disclosure relates to enabling delivery of items by UAVs without requiring the consignee (for example, a user making an order of goods for delivery) to be present when the items arrive at the designated point of delivery. This part of the disclosure is particularly, but not exclusively, related to delivery of items that are of sensitive nature in one or more respects. In one example, the items may have a high monetary and/or sentimental value. In another example, the items may be of confidential nature. In yet another example, the items may be perishable and, for example, require storage at certain ambient temperature, at least if a time limit is exceeded. Examples of such perishable items include various food items, which may be raw or processed, as well as medications.

While a delivery by UAV often may be pre-scheduled to ensure that the consignee is present to receive the items, this may be perceived as limiting to the consignee who needs to adhere to the agreed schedule. Further, unforeseen events such a traffic jams may prevent the consignee from showing up at the delivery point in time for the delivery. In conventional road-based delivery, for example by van or truck, there is an option of keeping the items onboard and re-routing for other deliveries. This option is less realistic for UAV delivery systems, given that UAVs generally have a limited ability to carry load and are propelled by a local power source of limited capacity.

Figure 2:
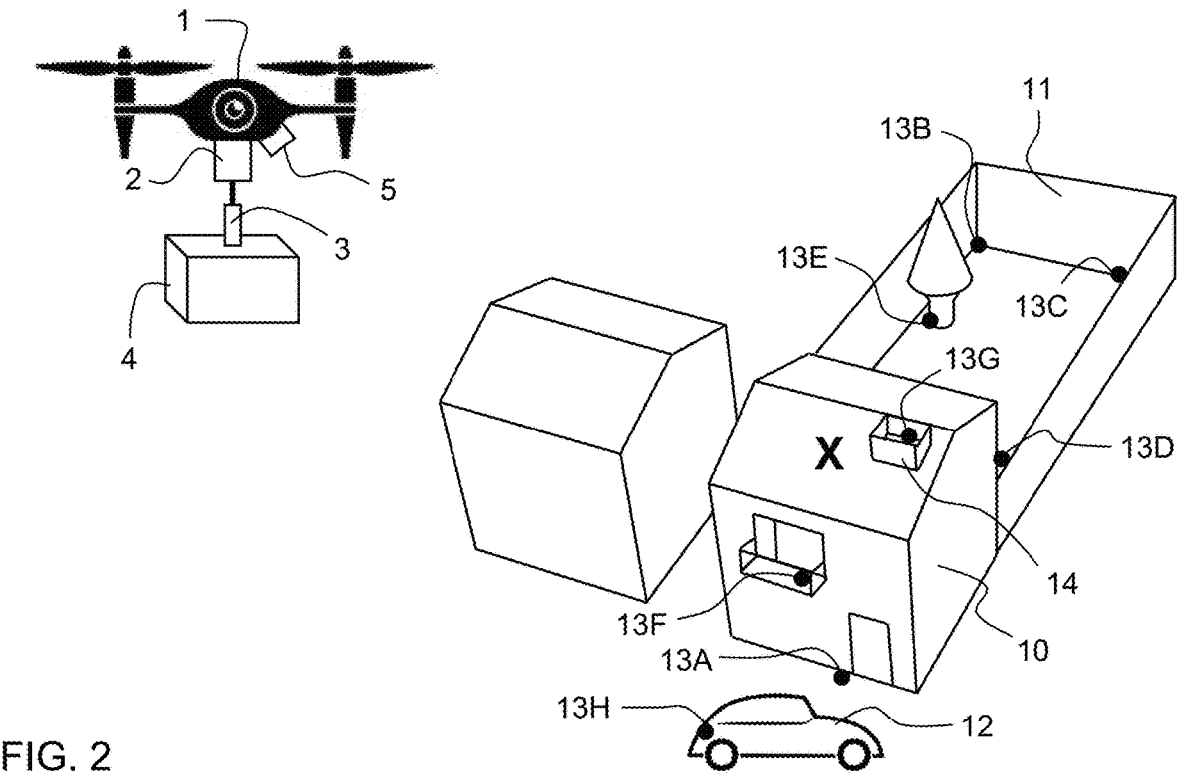
FIG. 2 is a diagram of a UAV approaching a designated location for delivery of a payload carried by the UAV.

FIG. 2 illustrates a UAV 1 in transit for delivery of a payload 4. The UAV 1 comprises a control system 2, a delivery mechanism 3 (cf. 1004 in FIG. 1) and an imaging device 5 (cf. 1018 in FIG. 1). The delivery mechanism 3 is releasably attached to a payload 4, which is to be delivered to the destination indicated by X in FIG. 2. In the illustrated example, the destination comprises a residential building 10 with a backyard surrounded by a fence 11. A car 12 is parked on the driveway of the building 10.

Figure 3A:
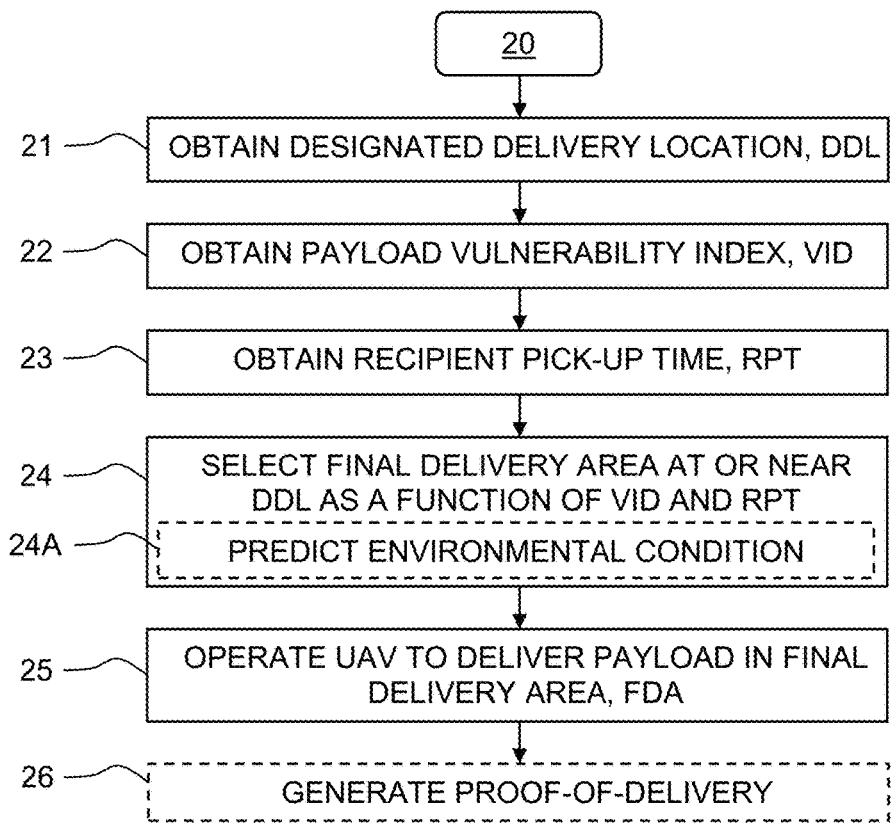
FIG. 3A is a flow chart of an example delivery method for a UAV according to an embodiment.

FIG. 3A illustrates an example delivery method 20 in accordance with some embodiments. The method 20 may be performed by the control system of an UAV and will be exemplified with reference to the UAV in FIG. 2. Step 21 obtains the designated delivery location for the payload 4. The designated delivery location, DDL, may be given in any suitable format, for example as GNSS coordinates, a street address, proprietary map coordinates, etc. Step 22 obtains at least one payload vulnerability index, VID. The VID may be predefined for the payload 4 and indicate a sensitivity or vulnerability of the payload 4 to a general or specific environmental condition. In some embodiments, the VID may represent a monetary or sentimental value or a confidentiality of the payload 4 and thus may indicate a vulnerability to theft. In some embodiments, the VID may represent a temperature sensitivity, for example to indicate a vulnerability of the payload 4 to temperatures that are too high or too low in relation to a nominal temperature. In some embodiments, the VID may represent an acceptable range of storage temperatures. In some embodiments, the VID may represent a moisture sensitivity of a packaging around an item to be delivered or the item itself, or both. In some embodiments, the VID may represent a wind sensitivity, for example indicating the risk that the payload 4 will be carried away or damaged by wind.

Step 23 obtains a recipient pick-up time, RPT, at which the payload 4 is expected to be retrieved from the DDL by the consignee ("recipient"). The RPT may be, and generally is, different from the time point when the UAV is scheduled/estimated to deliver the payload at the DDL ("delivery time"). The UAV 1 may perform one or more of steps 21-23 in communication with one or more external computing resources (not shown), which may provide one or more of the DDL, VID or RPT to the UAV 1. Alternatively or additionally, the UAV 1 may obtain one or more of the DDL, VID or RPT by detecting and interpreting one or more machine-readable codes on the payload 4. In step 24, a final delivery area, FDA, is selected at or near the DDL as a function of the VID and the RPT. In step 25, the method 20 may be concluded by the UAV 1 being operated to deliver the payload 4 in the FDA, for example by releasing the delivery mechanism 3.

In some embodiments, the FDA is selected to mitigate the vulnerability of the payload 4 while it is located at or near the DDL during the time period from delivery to RPT. Step 24 generally facilitates delivery of payloads by UAVs and opens up the possibility of tailoring the FDA to the respective payload to be delivered and ensuring the integrity of the respective payload until it is expected to be picked up by the consignee. It should be understood that while the DDL may be a specific location, the FDA is typically spaced from the DDL. In some embodiments, the UAV may store an area definition that specifies the limits of a search area within which the FDA may be selected. For example, the search area may be given as a predefined distance to the DDL, or by defined boundaries in relation to the DDL. In the example of FIG. 2, the search area may be limited to the real estate that includes the DDL, for example the building 10, the backyard and the driveway in FIG. 2. In some embodiments, the UAV 1 autonomously determines the limits of the search area, for example by computer vision analysis of images captured by the imaging device 5 around the DDL.

In some embodiments, the FDA may be selected among a set of candidate areas, which may be predefined for the DDL or dynamically identified by the UAV when making the delivery at the DDL. The predefined candidate area(s) may be determined by or for the above-mentioned external computing resource by computer analysis of the local topography, images, etc. and transmitted to the UAV 1. The images may, for example, be captured by satellites and/or by one or more other UAVs, which may or may not be part of the delivery system. Examples of candidate areas are shown in FIG. 2 and designated by 13A-13H. It may be noted that candidate area 13G is within a dedicated safety container 14 which is arranged on the roof of the building 10 and may or may not be closed or even locked. In some embodiments, the UAV 1 is operable to remotely open the safety container 14, for example by transmitting a security code to a control system of the container 14. Candidate area 13H is a safe space associated with the car 12 on the driveway, for example its boot or an attached safety container, which may be similarly accessible to the UAV 1.

As indicated in FIG. 3A, step 24 may comprise a step 24A of predicting an environmental condition in the set of candidate delivery areas. In some embodiments, the environmental condition is predicted for a residence time period that extends from the delivery time to the RPT, and the FDA is selected among the set of candidate delivery areas as a function of the predicted environmental condition and the VID. The predicted environmental condition may be relevant for the VID, and vice versa. For example, the VID may indicate a vulnerability of the payload 4 to the environmental condition that is predicted by step 24A. In some embodiments, the environmental condition may comprise exposure to sunlight. Such an environmental condition may be relevant to a VID indicative of temperature sensitivity. In some embodiments, the environmental condition may comprise exposure to precipitation, dew or other moisture. Such an environmental condition may be relevant to a VID indicative of moisture sensitivity. In some embodiments, the environmental condition may comprise exposure to wind, draught or the like. Such an environmental condition may be relevant to a VID indicative of wind sensitivity.

Some non-limiting examples of considerations for selecting the FDA for delivery of an item include: finding an area in shade for a certain length of time for keeping items cool, considering the RPT; finding an area directly exposed to the sun for a certain length of time for keeping items warm, considering the RPT; finding a dry surface; finding an area specified by a photograph of a section of the recipient's premises, for example part of a garden, or a text describing a location in the recipient's premises; finding an area immediately behind a fence or wall, between two large structures, or on an elevated structure such as a roof or balcony, to keep the item concealed and/or less accessible to non-recipients; or identifying an in-vehicle option, for example the boot or a special compartment of a car owned by the recipient.

Figure 3B:
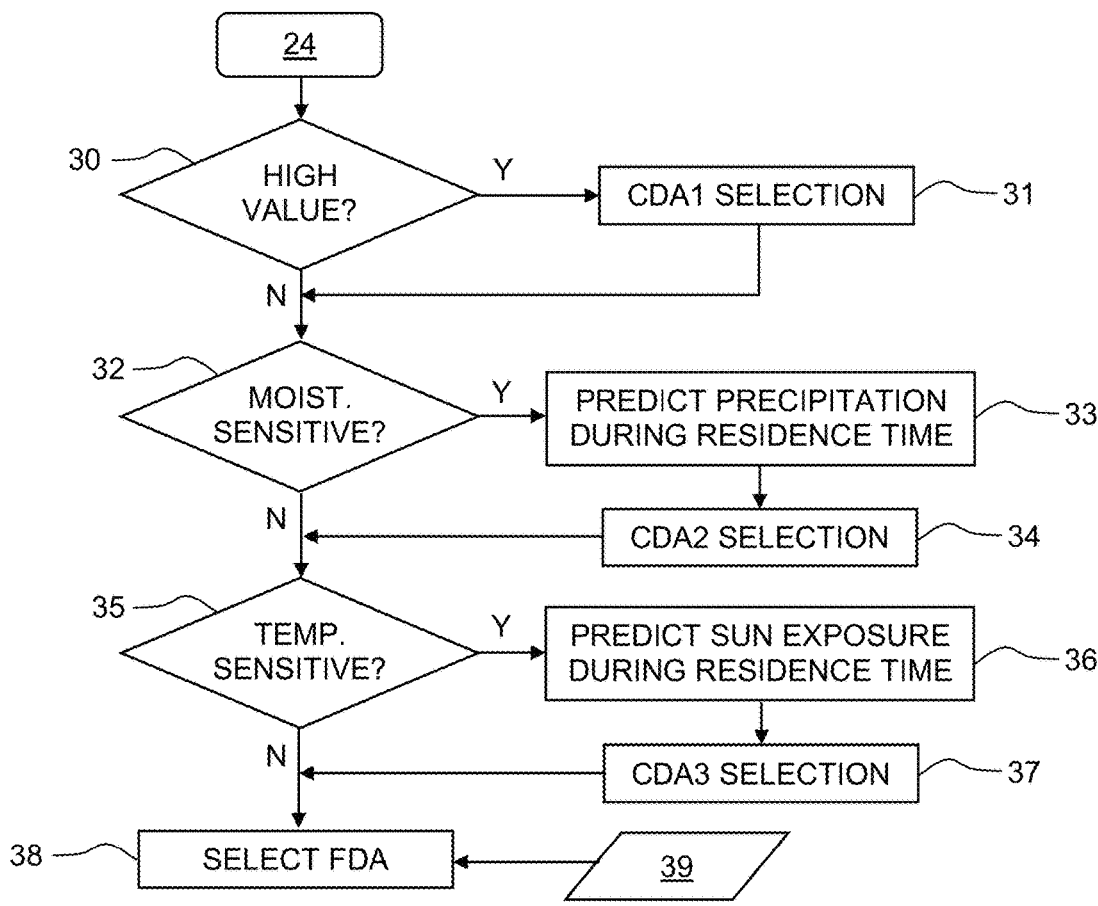
FIG. 3B is a flow chart of an example procedure for selecting a final delivery area in the delivery method of FIG. 3A.

FIG. 3B is a flowchart of an example procedure for selecting the FDA. As indicated, the example procedure may be part of step 24 in FIG. 3A. The procedure presumes a nominal selection of candidate areas, which is denoted CAD0 below and may include all available candidate areas. In step 30, the VID is evaluated to determine if the payload 4 is of high value, for example in terms of money, affection or confidentiality. If so, step 31 determines a first set of candidate areas, CAD1, that matches the VID by reducing the risk that the payload 4 is stolen, for example areas that are hidden from view ("non-overlooked areas"). In the example of FIG. 2, CAD1 may include all candidate areas except 13A. In some embodiments, the VID may indicate different categories of value, and CAD1 may differ depending on category. For example, for the most valuable payloads, CAD1 may consist of 13G and 13H. With respect to 13H, step 31 may include verifying that the car 12 belongs to the consignee, for example based on the number plate of the car 12. The procedure proceeds to step 32, which evaluates the VID to determine if the payload 4 is sensitive to moisture. If so, step 33 predicts the risk for precipitation at DDL during the residence time period. Step 33 may thus be part of step 24A in FIG. 3A. Step 33 may comprise predicting the risk for precipitation in the available candidate areas 13A-13H, or a subset thereof. The prediction in step 33 may be based on weather data for the DDL, for example a weather forecast for the residence time period or part thereof. Step 33 may account not only for precipitation but also for the local topography (cf. 3D model, below) and/or estimated wind directions at the candidate areas. For example, candidate area 13E may be deemed to be shielded from precipitation given its location beneath a tree. Based on step 33, step 34 determines a second selection of candidate areas, CAD2, which is deemed to mitigate the risk that the payload 4 is exposed to moisture. In the example of FIG. 2, CAD2 may include 13E, 13G, 13H and, depending on wind direction, one or more of 13B-13D. The procedure proceeds to step 35, which evaluates the VID to determine if the payload 4 is sensitive to temperature. If so, step 36 predicts the exposure to sunlight in the available candidate areas 13A-13H, or a subset thereof.

Figure 3C:
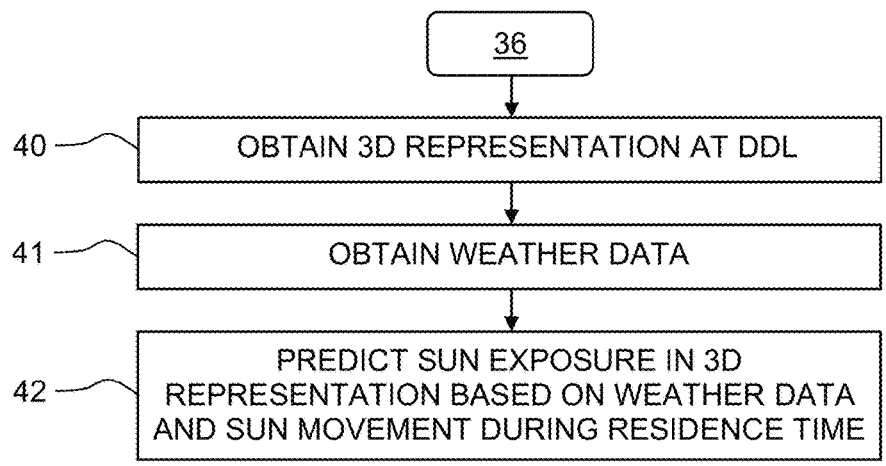
FIG. 3C is an example procedure for predicting an environmental condition in the delivery method of FIG. 3A.

An example procedure that may be performed by step 36 is shown in FIG. 3C. Step 40 obtains a three-dimensional (3D) representation of the DDL. The 3D representation may be a 3D model of a region that includes the DDL. The extent of the region may be defined to include any structures that may cast shadows on the available candidate areas at the DDL. Such structures may include surrounding buildings as well as natural formations of the terrain. Step 41 obtains weather data for the DDL or the region, for example the above-mentioned weather forecast. Step 42 then predicts the exposure to sunlight in the 3D model, for example at the available candidate areas or a subset thereof, based on the weather data and movement of the sun during the residence time period. The weather data may be used to estimate the amount of clouds and thereby a likelihood of sunlight exposure.

Reverting to FIG. 3B, step 37 determines a third selection of candidate areas, CAD3, which is deemed to match the temperature requirements of the payload 4 as indicated by the VID. If the payload is sensitive to high temperatures, CAD3 may include candidate areas with little or no exposure to sunlight. If the payload is sensitive to low temperatures, CAD3 may include candidate areas with much exposure to sunlight. The procedure then proceeds to step 38, which selects the FDA among the selections CAD0-CAD3, to the extent that they have been determined. For example, step 38 may select the FDA among the intersection of the determined selections CAD0-CAD3, i.e. the candidate areas that are included in all of the determined selections.

As indicated in FIG. 3B, the FDA may be further selected based on input data 219, which may be provided by the consignee, for example when placing the delivery order. The input data 219 may be indicative of one or more candidate areas in the nominal selection CAD0. For example, the input data 219 may comprise one or more photographs of suggested candidate areas and/or a textual description thereof.

In some embodiments, step 24 may comprise obtaining sensor data from a sensor device (cf. 1018, 1020 in FIGS. 1 and 5 in FIG. 2) on the UAV or one or more other UAVs, and step 24A may predict the environmental condition at the DDL based on the sensor data. Such sensor data may comprise ambient humidity from a humidity sensor, wind data (speed and/or direction) from a wind sensor, images from two or more cameras or a stereoscopic camera for determination of 3D topography, images from a thermographic camera for determination of temperature or sunlight exposure, images from any type of camera for identification of shades and/or ground moisture. Such images are non-limiting examples of 2D representations that may be taken in the proximity of the DDL for use in predicting the environmental condition. In some embodiments, the sensor data may supplement or even replace the above-mentioned weather data. In some embodiments, the sensor data may provide or supplement the above-mentioned 3D representation. In some embodiments, the sensor data may enable prediction of exposure to sunlight during the residence time period without the need for further weather data.

Figure 4:
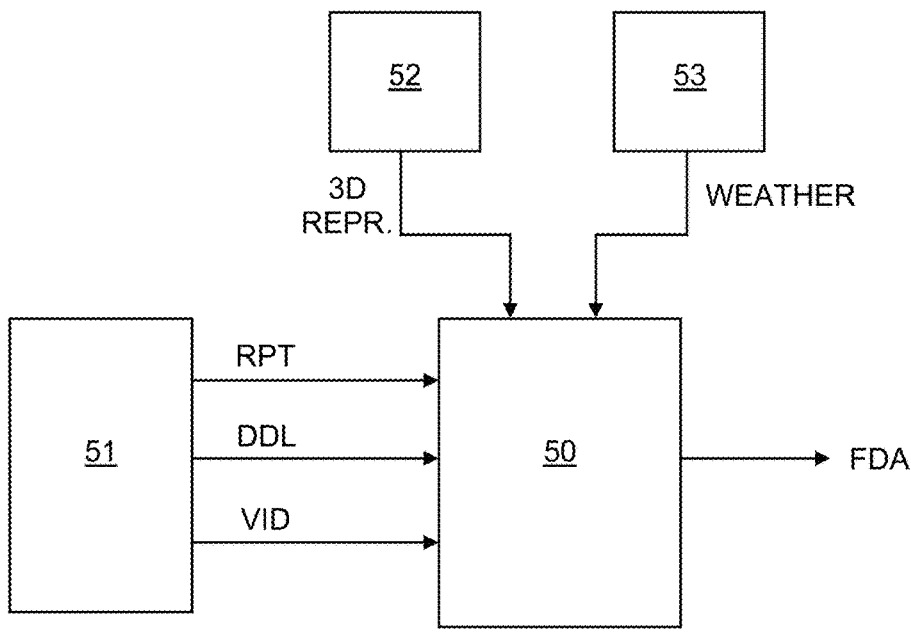
FIG. 4 is a block diagram of an example system configured to select a final delivery area according to an embodiment.

FIG. 4 is a block diagram of an example system for determining the FDA. The system comprises a computation device 50, which is configured to obtain the RPT, the DDL and the VID from one or more first modules 51 (one shown) and compute the FDA in accordance with any of the methods and procedures described herein. In the illustrated example, the computation device 50 is further configured to obtain the 3D representation of the DDL (cf. step 40) from one or more second modules 52, and weather data (cf. step 41) from one or more third modules 53. As understood from the foregoing, the computation device 50 may be included in the UAV 1, and the first module(s) 51 may be included in one or more external computing resources. Optionally, a first module 52 may be located on the UAV 1 and connected to a code reader. Likewise, the second module(s) 52 and third module(s) 53 may be included in one or more external computing resources and/or be included in the UAV 1 and connected to one or more sensor devices.

It is also conceivable that the computation device 50 is included in an external computing resource, which is configured to communicate the FDA to the UAV 1. For example, such an external computing resource may perform the method 20 in FIG. 3A, or at least steps 21-24.

The method 20 in FIG. 2A further includes an optional step 26 of generating proof-of-delivery when the payload has been delivered in the FDA. Step 26 may comprise operating the imaging device 5 on the UAV 1 to capture one or more images, for example in the form of still images or video, that visually include the payload 4 at the FDA and provide the image(s) as proof-of-delivery. In some embodiments, the proof-of-delivery may further comprise the above-mentioned sensor data and/or prediction data that is relevant for the payload 4. In a specific example, the proof-of-delivery may state that "The package has been delivered. The current temperature is 7° C. and is expected to be 9° C. at the pick-up time, with a confidence level of 88%".

In some embodiments, the image(s) for the proof-of-delivery may be taken to fulfil at least one predefined image criterion. Such an image criterion may specify one or more objectively identifiable characteristics or visual features to be included in the image(s). The visual features may broadly represent the DDL or the recipient. One visual feature may be an identifier associated with the recipient address, such as a nameplate, a building or apartment sign, a number sign, etc. Another visual feature may be an identifier associated with an object owned by the recipient, such as the license plate of the recipient's car 12. Yet another visual feature may be supplied and requested by the recipient, for example a specific window, balcony, door or other feature of the recipient's premises. In one example, the image criterion comprises a photograph provided by the recipient to be approximately matched with an image provided with the proof-of-delivery. In some embodiments, the UAV 1 may be configured to automatically detect presence of the visual feature(s) in the image(s), for example by use of vision-based machine learning for object detection or the like.

Figure 5:
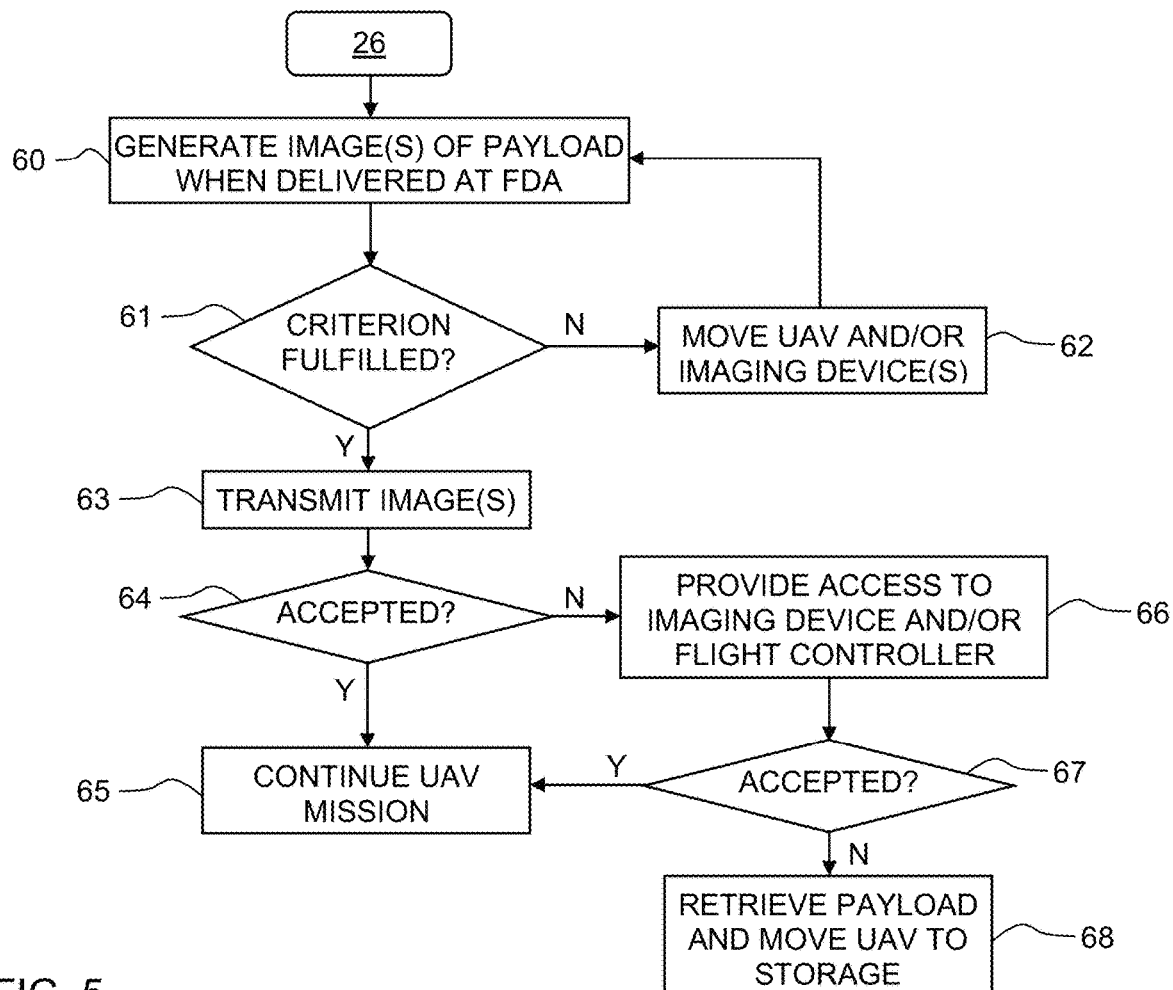
FIG. 5 is a flow chart of an example procedure for generating proof-of-delivery according to an embodiment.

FIG. 5 is a flowchart of an example procedure for providing proof-of-delivery by operating the UAV 1. As indicated, the example procedure may be part of step 26 in FIG. 3A. With reference to the example in FIG. 2, step 60 may comprise operating the imaging device 5 on the UAV 1 to generate image(s) of the FDA. Step 61 evaluates if the at least one image criterion is fulfilled. If not, step 62 moves the UAV 1 in relation to the FDA and/or the imaging device 5 in relation to the UAV 1, whereupon step 60 is repeated. In one example, steps 60-62 may cause the UAV 1 to adjust its position by circling and/or moving in/out with respect to the payload 4 until the at least one image criterion is fulfilled. When the criterion is fulfilled, step 63 may transmit the image(s) from the UAV 1 for display to the recipient in real time or substantially in real-time. At this time, the recipient may be given the opportunity to accept or reject the proposed delivery, as detected by step 64. If the delivery is accepted, step 64 proceeds to step 65 which operates the UAV 1 to continue its mission, for example to deliver another payload. Otherwise, step 64 may proceed to step 66 which may give the recipient, for example through a dedicated control interface, access to the imaging device 5 and/or the flight controller (cf. 1005) of the UAV 1 while the UAV 1 continually provides real-time images for display to the recipient. The control interface may also enable other interactions with or by the recipient, as described herein. For example, the control interface may be provided on mobile device such as a smartphone. Step 66 may limit the recipient's access, for example by limiting the movement of the UAV 1 to a predefined airspace around the DDL. Step 66 may give the recipient the option to select a new FDA, for example among the candidate areas and/or a selection of other pre-calculated locations, whereupon the UAV 1 places the payload 4 at the new FDA. If the recipient then accepts the placement of the payload 4 at the new FDA, as detected by step 67, the UAV may continue its mission (step 65). Otherwise, step 68 may operate the UAV 1 to retrieve the payload 4 and move it to a storage.

It is conceivable that the example procedure in FIG. 5 is instead performed before step 25, to give recipient the opportunity to accept or reject the FDA before the payload 4 is placed at the FDA. This will obviate the need for the UAV 1 to retrieve the payload 4 in case of rejection in step 64 or 67.

Figure 6:
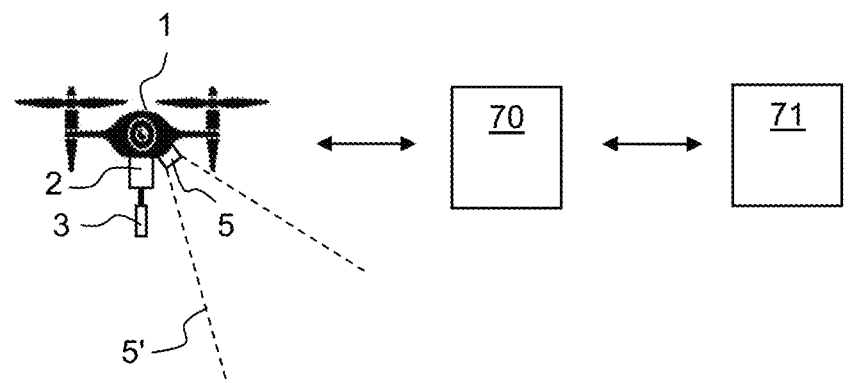
FIG. 6 is an overview of an example delivery system according to an embodiment.

FIG. 6 is a schematic overview of an example delivery system in accordance with an embodiment. The delivery system comprises a fleet of UAVs 1 (one shown), and a server 70 which is configured to communicate with the UAVs 1 in the fleet. It is understood that the above-mentioned external computing resource(s) may include the server 70. In the illustrated example, the server 70 is also be configured to communicate with electronic user devices 71 (one shown), which may be operated by the above-mentioned recipients to place delivery orders with the delivery system, optionally through a merchant or any other provider of goods. For example, the user devices 71 may be operated to enter the DDL and the RPT for a delivery order. The user devices 71 may also be operated to receive and display the image(s) of the FDA as provided by step 63 from the respective UAV 1 to the server 70. The user devices 71 may also be operated to control the respective UAV 1 via the server 70 in accordance with step 66, for example to change the direction of the field of view 5' of the imaging device 5 and/or change the position and/or orientation of the UAV 1.

In the following, items are recited to summarize some aspects and embodiments as disclosed in the foregoing.

Item 1: A method of delivering a payload (4) by an unmanned aerial vehicle, UAV (1), said method comprising:
obtaining (21) a designated location for delivery of the payload (4),
obtaining (22) at least one payload vulnerability index for the payload (4),
obtaining (23) a pick-up time indicative of a time point when the payload (4) is expected to be retrieved by a recipient,
selecting (24) a final delivery area at or near the designated location as a function of the at least one payload vulnerability index and the pick-up time, and
operating (25) the UAV (1) to deliver the payload (4) to the final delivery area.

Item 2: The method of item 1, wherein the at least one payload vulnerability index represents one or more of a monetary value, a temperature sensitivity, an acceptable range of storage temperatures, a moisture sensitivity, or a wind sensitivity.

Item 3: The method of item 1 or 2, wherein said selecting (24) comprises: predicting (24A) an environmental condition in a set of candidate delivery areas, which are located within proximity of the designated location, the environmental condition being predicted for a residence time period that extends from an estimated delivery time to the pick-up time, and selecting (204) the final delivery area among the set of candidate delivery areas as a function of the predicted environmental condition and the at least one payload vulnerability index.

Item 4: The method of item 3, wherein the environmental condition comprises at least one of an exposure to sunlight, an exposure to moisture, and an exposure to wind.

Item 5: The method of item 3 or 4, wherein the environmental condition is predicted based on a three-dimensional model of a region surrounding the delivery location and weather data for the region in the residence time period.

Item 6: The method of any one of items 3-5, wherein the environmental condition is predicted based on sensor data from a sensor device (5; 1018; 1020) on the UAV (1), or on another UAV.

Item 7: The method of item 6, wherein the sensor data comprises at least one two-dimensional representation taken in proximity of the delivery location.

Item 8: The method of any preceding item, wherein the final delivery area is further selected based on input data (39) which is supplied by the recipient and indicative of at least one candidate area in the set of candidate areas.

Item 9: The method of item 8, wherein the input data (39) comprises one or more of a photographic reproduction and a textual description.

Item 10: The method of any preceding item, further comprising: operating (26; 60) an imaging device (5; 1018) on the UAV (1) to capture at least one image of the final delivery area in accordance with at least one image criterion.

Item 11: The method of item 10, wherein the at least one image criterion is indicative of one or more objectively identifiable characteristics to be included in the at least one image.

Item 12: The method of item 10 or 11, further comprising: providing (63) the at least one image for display to the recipient in real time or substantially in real time.

Item 13: The method of any one of items 10-12, further comprising: enabling (66) external control, for the recipient, of at least one of the imaging device (5; 1018) and a flight controller (1005) of the UAV (1) while providing the at least one image for display in real time.

Item 14: The method of any one of items 10-13, further comprising: operating (60-63) the UAV (1) to capture images of the final delivery area, while moving at least one of the UAV (1) and the imaging device (5; 1018), until the at least one image is deemed to match a predefined image.

Item 15: The method of any one of items 10-14, wherein the at least one image is captured after delivery of the payload (4) to the final delivery area to include the payload (4).

Item 16: A control system comprising logic (1101, 1102) configured to perform the method of any one of items 1-15.

Item 17: An unmanned aerial vehicle comprising the control system of item 16.

Item 18: A computer-readable medium comprising computer instructions (1102A) which, when executed by a processing system (1101), cause the processing system (1101) to perform the method of any one of items 1-15.

Item 19: An unmanned aerial vehicle, configured to: obtain a designated location for delivery of a payload (4); obtain at least one payload vulnerability index for the payload (4);
obtain a pick-up time indicative of a time point when the payload (4) is expected to be retrieved by a recipient; select a final delivery area at or near the designated location as a function of the at least one payload vulnerability index and the pick-up time; and deliver the payload (4) to the final delivery area.

Item 20: The unmanned aerial vehicle of item 19, which is further configured to: predict an environmental condition in a set of candidate delivery areas, which are located within proximity of the designated location, the environmental condition being predicted for a residence time period that extends from an estimated delivery time to the pick-up time; and select the final delivery area among the set of candidate delivery areas as a function of the predicted environmental condition and the at least one payload vulnerability index.

Item 21: The unmanned aerial vehicle of item 20, which is further configured to: predict the environmental condition based on sensor data from a sensor device (5; 1018; 1020) on the unmanned aerial vehicle, or on another unmanned aerial vehicle.

Item 22: The unmanned aerial vehicle of any one of items 19-21, which is further configured to operate an imaging device (5; 1018) on the unmanned aerial vehicle to capture at least one image of the final delivery area in accordance with at least one image criterion.

Item 23: The unmanned aerial vehicle of item 22, which is further configured to: enable the recipient to manipulate at least one of the imaging device (5; 1018) and a flight controller (1005) of the unmanned aerial vehicle (1) while the unmanned aerial vehicle provides the at least one image for display in real time.

Item 24: The unmanned aerial vehicle of item 22 or 23, which is further configured to: compare the at least one image to a predefined image and capture images of the final delivery area until the at least one image is deemed to match the predefined image.

2. Improved Utilization of a Fleet of Uavs for Delivery of Goods

This part of the disclosure relates to improving utilization of a fleet of UAVs in a delivery system and takes a different approach than conventional centralized planning. Such centralized planning optimizes the delivery system for maximum utilization and requires all tasks and parameters for a specific timespan to be given, and then constructs a plan and executes it. This timespan introduces a latency of the delivery system. The time span needs to be substantial, since optimization becomes more a function of chance if the timespan is too short. During its execution, the plan cannot be adapted to changes, for example new deliveries, drone failures and unexpected weather conditions, without sacrificing the level of optimization. For proper optimization, centralized planning relies on access to all relevant parameters and therefore typically relies on a multitude of real-time sensors, which may both difficult and costly to implement.

This part of the disclosure is not directed to a specific technique for scheduling delivery missions for individual UAVs in the fleet, but rather focuses on providing enabling features for a different type of logistics system for the fleet of UAVs, specifically a logistics system that applies swarm intelligence to optimize utilization. Swarm intelligence (SI) is a well-known technical field, also known as collective intelligence or symbiotic intelligence, which deals with the behaviour of natural and artificial systems comprising multiple agents that interact locally with one another and with their environment. Specifically, SI systems lack any centralized control structure. Instead, local and to a certain degree random interactions between the agents lead to the emergence of "intelligent" global behaviour, unknown to the individual agents. The individual behaviour of the agents may often be described in probabilistic terms, and each agent may act solely based on its local perception of the neighbourhood. This mechanism of indirect coordination or self-organization is also known as stigmergy in the art. The principle of stigmergy is that the trace left in the environment by an individual action stimulates the performance of a succeeding action, possibly by the same agent, but in many scenarios by a different agent. Thereby, SI systems may be both inherently flexible and robust, as well as decentralized and unsupervised.

The principle of SI may be applied to UAV delivery by providing an interactive ordering system, which allows users to evaluate different locations for delivery or pick-up of goods by a UAV based on location-specific transportation prices that are computed based on the orders placed hitherto, and which allows the users to place an order for delivery/pick-up at a selected location based on the evaluation. By providing such an interactive ordering system that is configured to present a transportation price that reflects the impact of a decision taken by a user (selection of a location for delivery/pick-up), it is possible to configure the delivery system with a dynamically adapting solver for the utilization of the fleet of UAVs based on swarm intelligence, with the users being agents in such an SI logistics system. By distributing the choice of location to each user, and make the users base their choice to a large extent on the impact of their choice on UAV utilization, the logistics system effectively utilizes the neural computing power of each user, which acts as a search function, to create an optimum utilization at every given moment in time. For example, the user is able to, via the interactive ordering system, spot patterns over time, predict changes based on a plethora of external factors and, for example, wait to order a delivery/pick-up until a certain point in time, or decide to select a location that is located further away but associated with a lower transportation price. By letting each user choose location in real-time based on a live overview of the impact on utilization, the collective of users will seamlessly adapt the delivery system to changes with the goal of maximizing utilization. In other words, the logistics system converges by itself when each user makes their individual choice in their own best interest, for example to keep cost down.

Figure 7:
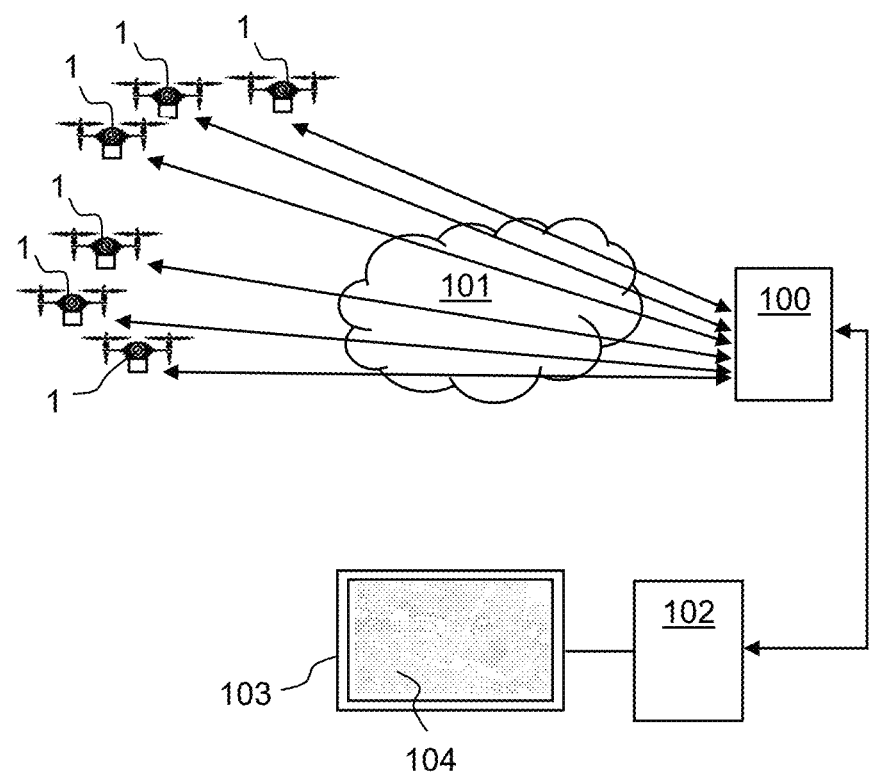
FIG. 7 is a schematic illustration of an example delivery system according to an embodiment.

FIG. 7 illustrates an example delivery system comprising a fleet of UAVs 1. The delivery system comprises a scheduling device 100 which is configured to communicate with the UAVs 1 over a wireless network 101. The scheduling device 100 is further configured to perform methods described herein to determine a utilization schedule for the UAVs 1 and communicate time points and locations for delivery/pickup of goods to individual UAVs 1. The scheduling device 100 is also configured to communicate with user devices 102 (one shown) comprising a display 103 which is operable to display an interactive chart 104 generated by the scheduling device 100, as well as one or more input devices (not shown) for data entry. The user devices 102 may include any type of electronic device, including but not limited to a personal computer, a laptop, a mobile communication device, a tablet computer, etc.

Figure 8:
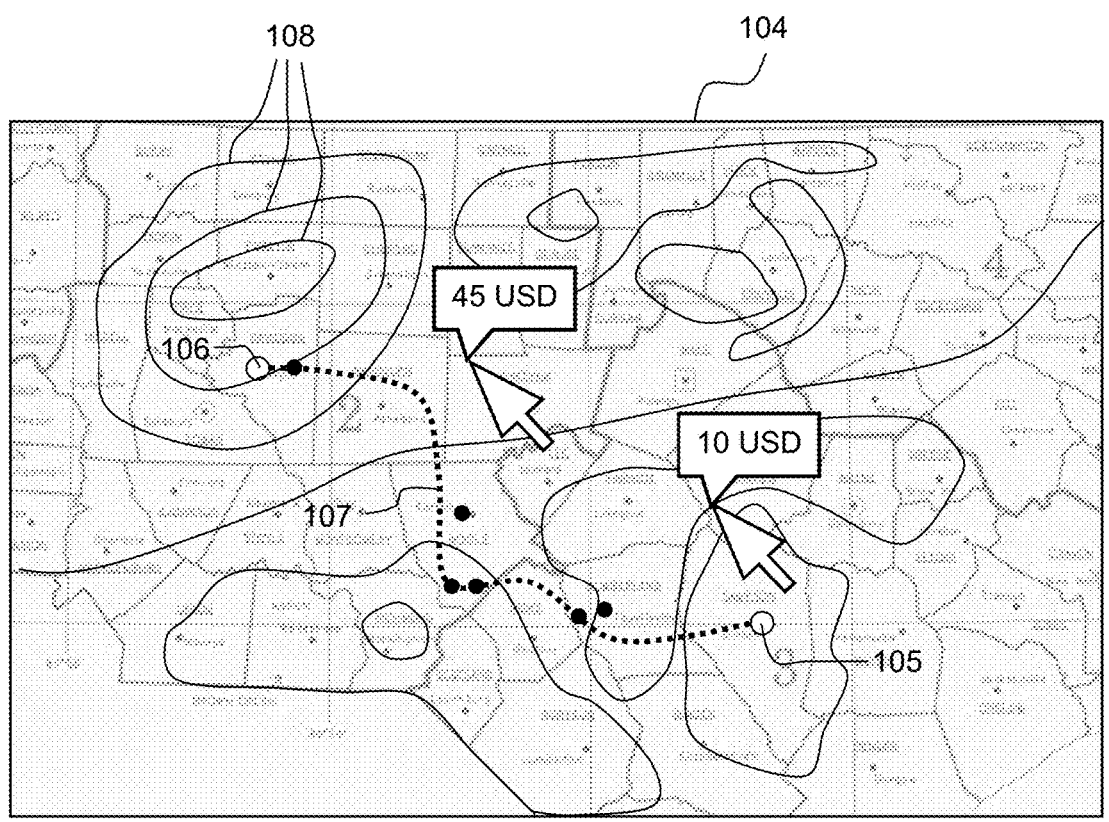
FIG. 8 is a schematic illustration of an example interactive chart generated according to an embodiment and enabling selection of pick-up or delivery location.

FIG. 8 shows a detailed example of an interactive chart 104, which corresponds to a geographic region and may include a background image of the region, for example a satellite photo, a map, etc. The interactive chart 104 also depicts transportation price for individual locations. In the illustrated example, different transportation prices are represented by curves 108 drawn through points of equal transportation prices. In an alternative, the chart 104 may comprise a heatmap, which represents transportation price by different colours or shades. Alternatively or additionally, the chart 104 may display transportation price in clear text upon selection of a location, for example by the user positioning a cursor at the location. In FIG. 8, two locations are indicated by mouse cursors, associated with a transportation price of 10 USD and 45 USD, respectively. The chart in FIG. 8 is also personalized to the user in that it includes a route to be taken by the user, from a starting point 105 to an end point 106 along a movement path 107. The movement path 107 may be manually entered by the user or be automatically derived from an application associated with the user on the user device 102 or another device. Such an application may be a digital personal assistant that has learned user behaviour, a navigation service, etc. The black dots in FIG. 8 represent proposed locations for delivery/pickup on or near the movement path 107. The proposed locations may be determined by the scheduling device 100 to be on or near the movement path. The user may select any location on the chart 104 for delivery/pickup by any suitable selection action. As understood from the foregoing, the scheduling device 100 may update the chart 104 upon receiving the user selection, both as displayed to the user and as displayed to other users, thereby affecting future selections by all users. As an alternative to allowing the user to freely select a location by pointing to the chart 104, the user may be presented with a fixed set of locations, for example as a list or a geographical chart, to select from based on the associated transportation cost.

Figure 10:
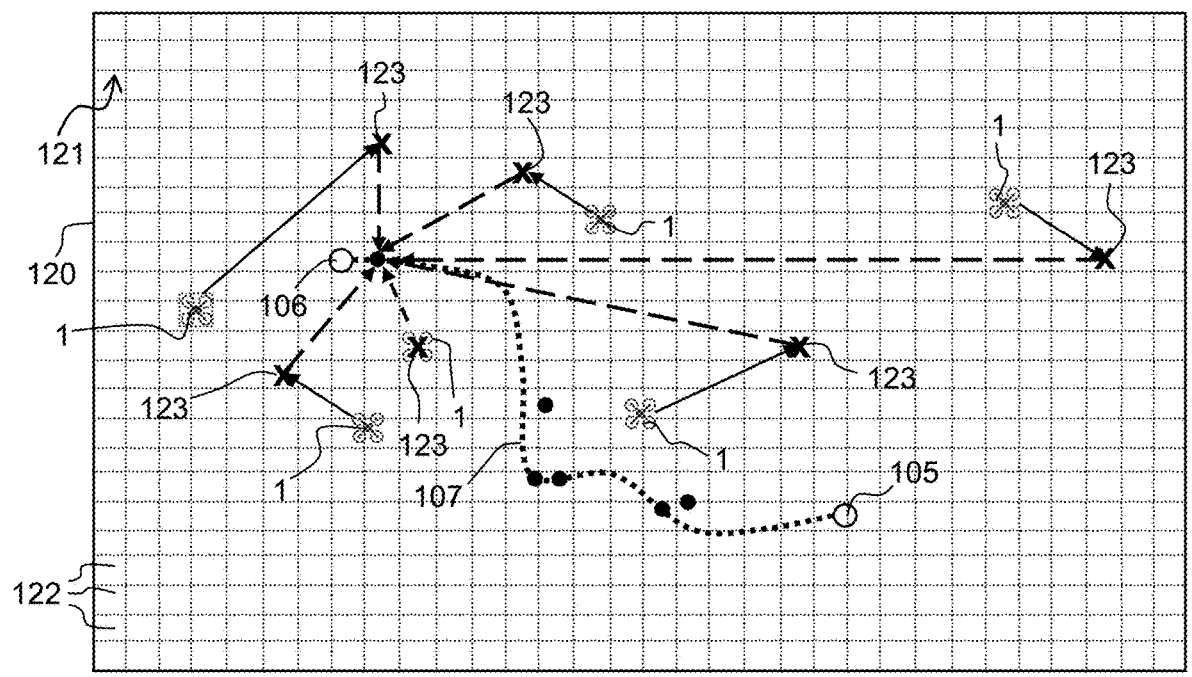
FIG. 10 is a schematic illustration of an example partitioning of a geographic region into sub-regions, and locations of UAVs and idle points in relation to a potential location for pick-up or delivery.
Figure 9:
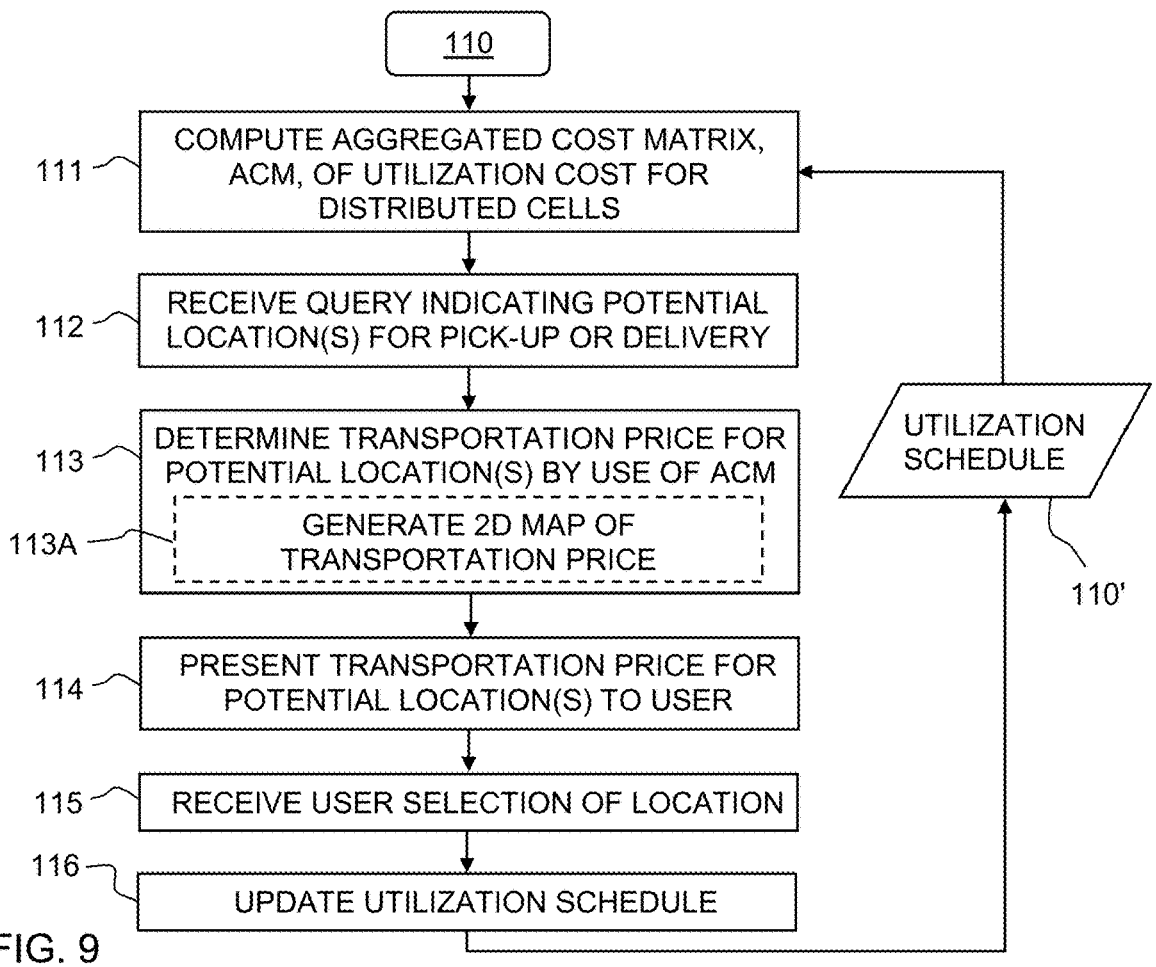
FIG. 9 is a flow chart of an example scheduling method according to an embodiment.

FIG. 9 illustrates an example method 110 for scheduling delivery and/or pick-up of goods in accordance with an embodiment. The method 110 may be performed by the scheduling device 100 in FIG. 7. The method 110 will be described with reference to FIG. 10, which shows a geographic region 120, which may correspond to the region of the chart 104 in FIG. 8 and which is partitioned into sub-regions ("cells") 122. FIG. 10 also shows current locations of UAVs 1 within the region 120, as well as current or future idle points (see below) for the UAVs 1.

In the method 110, step 111 computes aggregated cost data, ACM, for the fleet of UAVs based on current and/or future locations of the UAVs within the geographic region 120, for example given by a utilization schedule 110' (see below). The ACM associates a "utilization cost" with the respective cell 122, where the utilization cost of a cell 122 represents an estimated cost value for directing at least one of the UAVs 1 to this cell 122. As used herein, "cost" or "cost value" need not be a monetary value but may be given in any type of unit. In some embodiments, the utilization cost corresponds to a distance, which may be a physical distance in two or three spatial dimensions. It is also conceivable that the distance comprises further non-spatial dimensions, for example to account for wind direction, wind speed, etc. In some embodiments, the utilization cost corresponds to an energy consumption. The ACM may be represented as a matrix. As used herein, a matrix generally refers to any form of addressable data structure, for example an array of any dimension, comprising values in any format.

Step 112 receives a query indicative of one or more potential locations for delivery/pick-up of a payload. The query may be generated based on a user selection, for example by the user submitting a request for placing an order for delivery or pickup of goods. Alternatively, the query may be system-generated, for example when the user device 102 connects to the scheduling device 100. The query may be indicative of a discrete set of potential locations, one or more coherent areas of potential locations within the geographic region 120, or all locations within the geographic region 120 at a given spatial resolution. In one example, the query may identify the user and cause step 112 retrieve the potential location(s) specifically for the user, for example based on a user profile and/or historical data. For example, the locations indicated by black dots in FIGS. 8 and 10 may be pre-stored as potential locations for the user. In another example, the query may comprise the movement path 107 (FIGS. 8 and 10) and causes step 112 to determine the potential location(s) in relation to the user movement path 107, for example resulting in the locations indicated by black dots in FIGS. 8 and 10. In one example, step 112 may determine the potential location(s) to have the lowest utilization cost along the movement path 107.

Step 113 determines, based on the ACM, a transportation price for at least one potential location among the potential location(s), and step 114 presents the transportation price for the at least one potential location to the user. The transportation price may be given as a monetary value, and step 113 may thus involve searching the ACM to obtain the utilization cost for the cell 122 that includes a potential location, and converting the utilization cost to a transportation price.

The delivery system may be configured to allow the respective user to change a previously selected location and/or time point for delivery/pick-up. It is conceivable that step 113, in the event of such a change, determines an ambient utilization cost that represents the change in overall delivery costs for the delivery system caused by the change, and adds the ambient utilization cost to the utilization cost given by the ACM when determining the transportation price. It may be noted that the ambient utilization cost may be negative.

Step 114 may present a list of transportation prices for different potential locations. Alternatively or additionally, step 114 may present the chart 104 of FIG. 8 or any other graphical representation 104 of a distribution of transportation prices within the geographic region 120, or part thereof. As shown in FIG. 9, step 113 may comprise a sub-step 113A of generating the graphical representation 104. Step 114 may further comprise displaying the transportation price for a location that is given by the user pointing to the specific location in the graphical representation (cf. mouse pointers in FIG. 8).

In a further variant, the query received in step 112 may be generated in response to the user inputting the potential location(s), for example by the user selecting locations/areas on a displayed map of the geographic region 120 or part thereof, by use of a mouse, stylus, finger etc. Alternatively, the user may manually enter coordinates of the potential location(s) by use of a keyboard, to thereby generate the query for step 112.

It is to be understood that the combination of steps 111-114 provide an interactive ordering system, as discussed above, that allows the delivery system to optimize its utilization based on swarm intelligence (SI).

In the example of FIG. 9, the method 110 further comprises a step 115 of receiving a selection by the user of a transportation price and a corresponding potential location. This selection may be indicated by the user in any conventional way, for example by use of a mouse, keyboard, touch screen, etc. Step 115 may also comprise receiving a selected time point or time window for the delivery/pick-up, entered by the user, optionally in response to a set of proposed time points/windows being presented to the user.

Subject to the selection(s) in step 115, step 116 updates a utilization schedule 110' for the delivery system. The utilization schedule 110' defines current and future locations of the UAVs 1 in the fleet within the geographic region 120 and is thus a record of the current plan for utilization of the UAVs in the fleet. For example, the utilization schedule 110' may contain a list of delivery and pick-up locations selected by users of the delivery system and associated time points, and it may also include an assignment of specific UAVs to missions involving the locations/time points. Step 116 may update the utilization schedule 110' by adding the location selected by the user in step 115 to the utilization schedule, optionally together with the associated time point entered by the user. The details of the utilization schedule 110' and its updating are implementation-specific and will not be further described herein.

In the illustrated example, since the ACM is computed by step 111 based on the utilization schedule 110', a subsequent execution of steps 111-116 will account for the updated utilization schedule 110' and thus be automatically adapted to the selection made by the user. Thereby, over time, the transportation prices will be adapted to the selections made by all users in the system, resulting in an inherent convergence of utilization as the respective user makes its individual choice in its own best interest, for example to keep transportation price down.

Although not shown in FIG. 9, the method 110 may further comprise, for example after step 116 in at least some repetitions, a step of controlling the fleet of UAVs by directing one or more of the UAVs 1 to the location selected in step 115 based on the utilization schedule 110'.

Figure 11A:
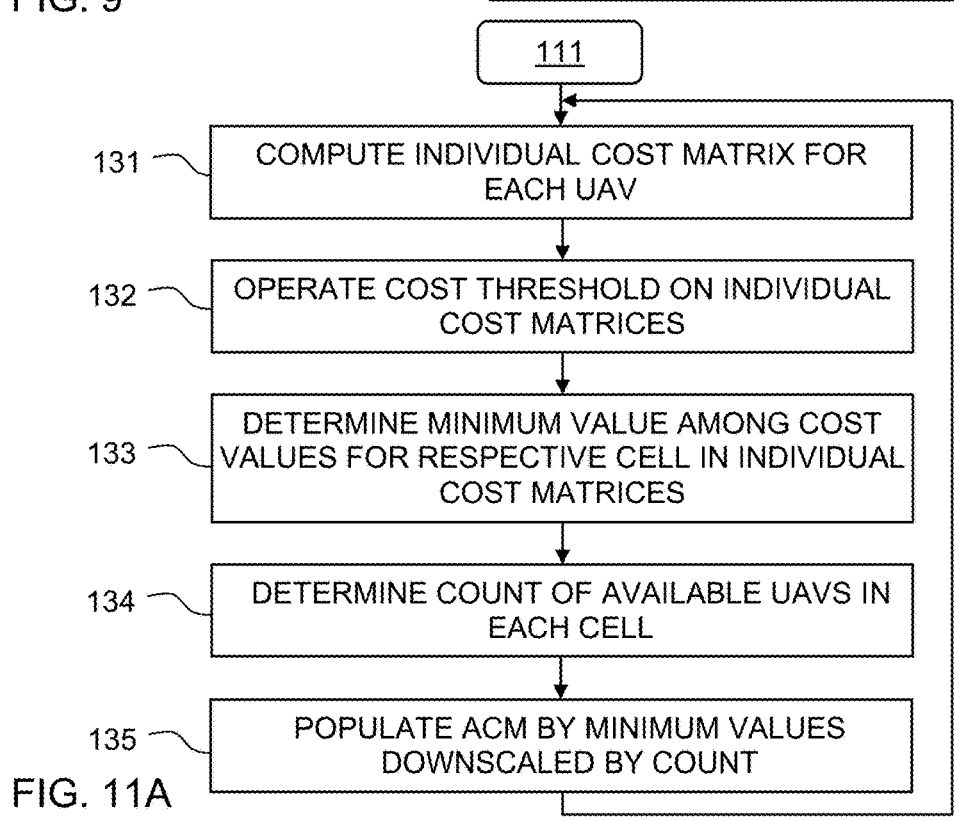
FIG. 11A is a flow chart of an example procedure for generating an aggregated cost matrix according to an embodiment.

FIG. 11A is a flowchart of an example procedure for computing the ACM. As indicated, the example procedure may be part of step 111 in FIG. 9. In step 131, individualized cost matrices for available UAVs are calculated. The respective individualized cost matrix, ICM, defines cost values for directing one of the available UAVs 1 to the different subregions 122 in the geographic region 120 (FIG. 10). Thus, in the example of FIG. 10, there is one ICM for each UAV 1, and each ICM comprises a cost value for each subregion 122. Each ICM may be represented by a matrix or a corresponding data element. Subsequent to step 131, the procedure 111 forms the ACM as a (logic) combination of the ICMs, which is a processing-efficient way of computing the ACM. In the illustrated example, the ACM is formed by steps 132-135.

In step 132, which is optional, a cost threshold is operated on the ICMs, and cost values above the cost threshold are replaced by a predefined value, for example a null value. In the absence of step 132, the ACM may be generated to exhibit an excessive utilization cost for some cells. It may be undesirable to allow the user to select a location in such a cell, since this may force the delivery system to perform a delivery/pick-up that is unfavourable in terms of resource efficiency. Step 132 may also enable step 134 (below).

Figure 13:
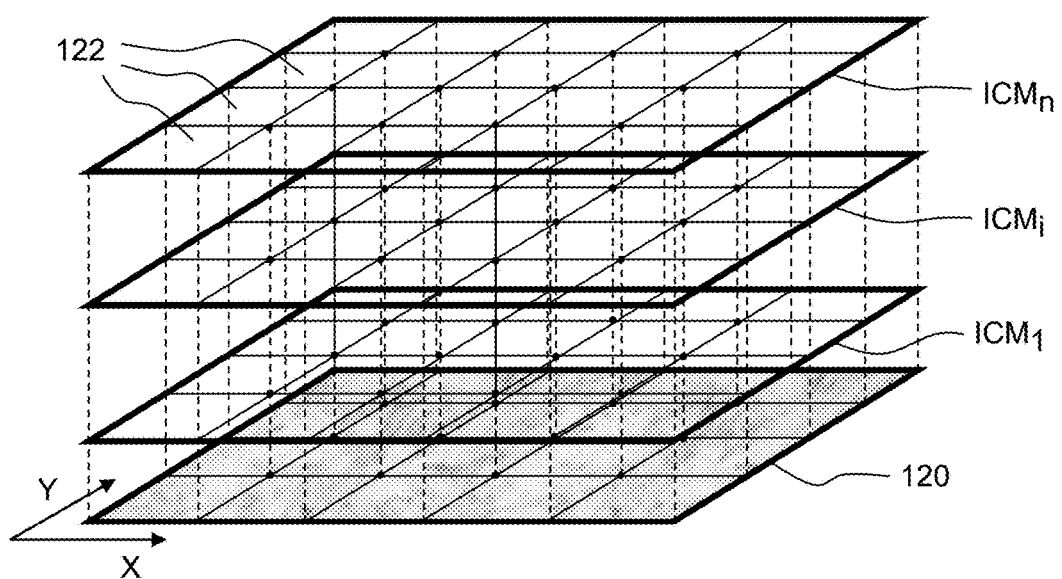
FIG. 13 is a conceptual view of an alignment of sub-regions in individual cost matrices.

In step 133, the utilization cost is determined for the respective cell 122 as a function of cost values that are associated with the respective cell 122 in the ICMs. FIG. 13 is a conceptual view of step 133, in which cells 122 in different ICMs are aligned and processed for generation of the ACM. In FIG. 13, there are N different ICMs designated by $ICM_i$ with $i=1, \ldots, N$. FIG. 13 also shows how the cells 122 are defined in relation to the geographic region 120.

In some embodiments, the utilization cost for a cell 122 is determined by finding the smallest (minimum) cost value among the cost values for this cell 122 in all ICMs. Depending on the definition of cost, this may correspond to identifying the UAV that has the shortest or most energy efficient path to this cell 122, where the UAV is given by the ICM containing the smallest cost value for this cell 122. In some embodiments, the utilization cost for a cell 122 may set to its smallest cost value. In other embodiments, represented by steps 134-135 in FIG. 11A, the utilization cost for a cell 122 may be given by its smallest cost value reduced as a function of the number of available UAVs for the cell 122. In this context, the "available UAVs" may be given by all ICMs for which the cost value is below the above-mentioned threshold. If step 132 has been performed, the number of available UAVs is the number of ICMs for which the cost value of the cell 122 is not the predefined value (for example, the null value). The rationale for reducing the smallest cost value is to promote the user to select (in step 115) a location that has several available UAVs, rather than only one or a few UAVs, since the latter may result in an unfavourable mission in terms of resource efficiency. Thus, in FIG. 11A, step 134 determines a count of the available UAVs for each cell 122, and step 135 populates the respective cell of the ACM by the smallest cost value downscaled by the count.

In some embodiments, step 111 may comprise an interpolation step to increase the granularity of the ACM. Such an interpolation step may operate on the cost values of the cells 122 determined by step 135, for example, to generate interpolated cost values within or between these cells 122. This is a processing-efficient way of increasing the resolution of the ACM. Any interpolation technique may be used, such as linear, polynomial, spline, etc.

In some embodiments, step 111 may comprise a contrast enhancing step, to increase the precision of the ACM, for example after or during the above-mentioned interpolation step. Such a contrast enhancement step may comprise determining the local derivative in cost values for cells 122 within the ACM, and updating the cost values in the ACM based on the local derivatives to enhance the contrast between adjacent cells 122.

Figure 11B:
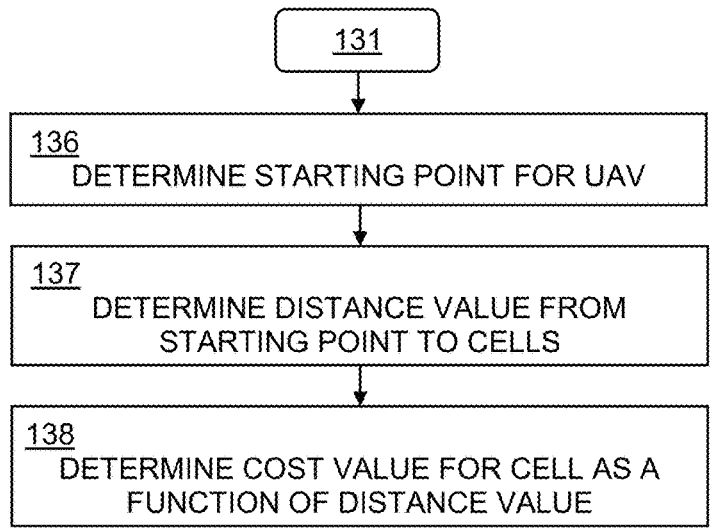
FIG. 11B is a flow chart of an example procedure for computing an individual cost matrix according to an embodiment.

FIG. 11B is a flow chart of an example procedure for computing an ICM. As indicated, the example procedure may be part of step 131 in FIG. 11A. As noted above, the ICM is computed for a specific UAV in the fleet. Step 136 determines a starting point for the UAV in the geographic region 120. In some embodiments, the starting point is set to the current position of the UAV. Simple calculations and sufficiently accurate results may be obtained by setting the starting point to a position at which the UAV 1 is scheduled to be idle. In one example, the UAV 1 is scheduled to be idle whenever it arrives at an infrastructure component of the delivery system, such as a payload storage facility (warehouse, intermediate storage, etc.) or a charging station. The positions of such infrastructure components ("idle points") are known, and the time points of arrival and departure for the respective UAV may be included in the utilization schedule (110' in FIG. 9). Reverting to FIG. 10, idle points 123 are marked by a cross, and the scheduled paths for the UAVs 1 from their current positions to their next idle points 123 are schematically represented by solid arrows. The dashed arrows in FIG. 10 schematically represent the paths from the idle points to one of the cells 122.

Step 137 determines a distance value from the starting point to a cell 122 for the specific UAV, and step 138 determines a cost value for the cell based on the distance value. Steps 137-138 are performed for all cells 122 in the region 120, or a subset thereof. As noted above, the distance value may be a physical distance, but may also include non-spatial dimensions. Step 138 may set the cost value to the distance value or convert the distance value in any suitable way. For example, the cost value may be computed to represent an energy consumption of the UAV. Step 138 may also account for further UAV parameters, such as the scheduled residence time ("idle time") of the UAV at its idle point 123. For example, to promote utilization of UAVs and reduce the scheduled residence time, the cost value may be reduced as a function of scheduled idle time.

Step 137 may account for obstacles that prevent the UAV from taking a straight path from the starting point to the respective cell. In some embodiments, a flood-fill algorithm may be applied for calculating the distance values. One such embodiment is exemplified in FIG. 12A, which illustrates a stepwise calculation of an ICM for a matrix of cells 122. Some of the cells are occupied by an obstacle 124 (filled squares) that the UAVs are deemed unable to overcome, for example by flying above a spatial obstacle. Initially the matrix is empty, except for the cell containing the idle point 123 which is assigned distance value 0. The calculation performs a sequence of iterations to determine distance values for all cells. Each iteration determines distance values for cells adjacent to the cells that so far have been assigned a distance value ("non-empty cells"). In the illustrated example, the cell width is assumed to be 1 and the elevation difference between the cells is assumed to be 0. To determine the distance value of a specific cell in an iteration, step 137 may calculate, for each adjacent cell that is non-empty, the sum of the centre-to-centre distance between these cells and the distance value of the non-empty cell, and set the distance value of the specific cell to the minimum of the resulting sums. The repetitions are terminated when all relevant cells have been assigned a distance value, which thus estimates the minimum travel distance from the respective cell 122 to the idle point 123. In the illustrated example, four repetitions are required to populate the ICM.

Figure 12A:
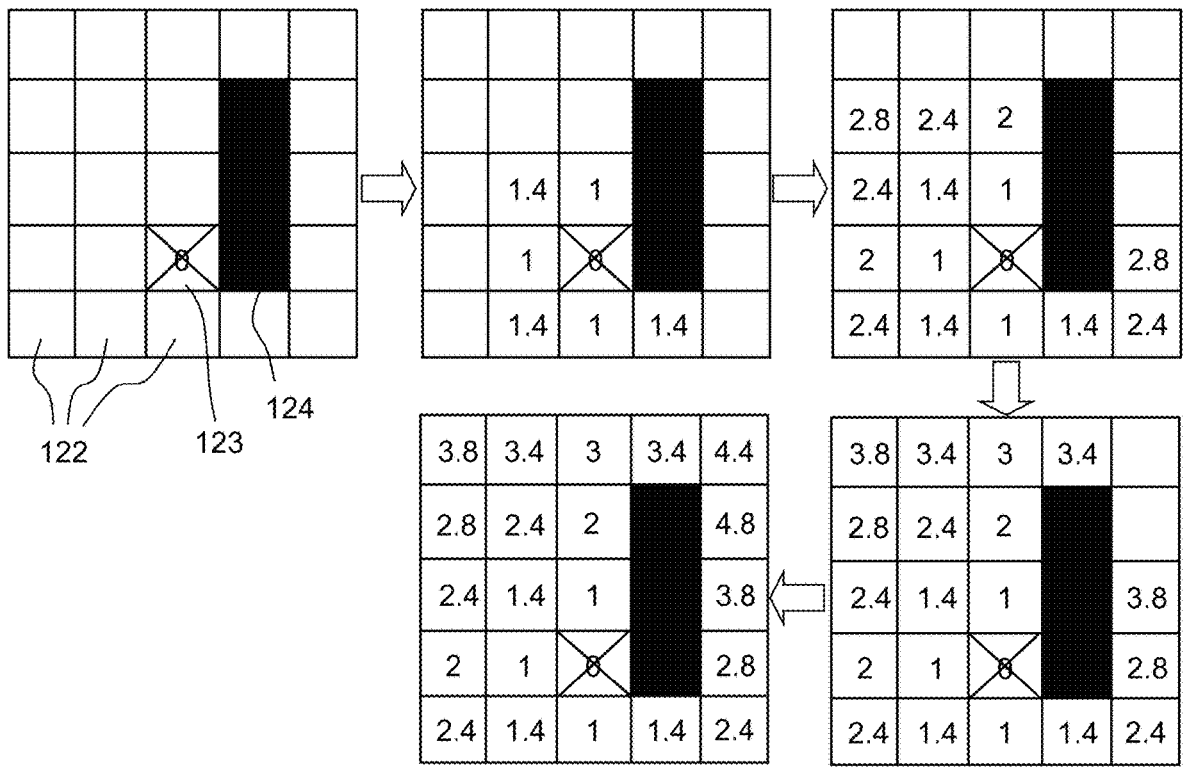
FIG. 12A is a step-wise illustration of an example procedure for computing an individual cost matrix according to an embodiment.
Figures 12B, 12C:
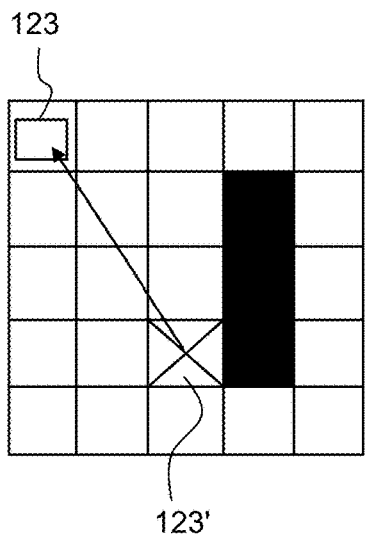
FIG. 12B illustrates a delivery task with an intermediate destination.
FIG. 12C illustrates an example of an individual cost matrix computed for the delivery task in FIG. 12B.

Step 137 may also account for the current position of the UAV in relation to the idle point 123. An example is shown in FIG. 12B, where 123' designates the current location of the UAV and 123 designates an idle point, for example a storage facility where the UAV will pick-up the payload to be delivered and/or stop for charging. In this example, step 137 may perform a first sequence of iterations as described for FIG. 12A, using the current position 123' as starting point, to determine a distance value for the cell containing the idle point 123. As seen in FIG. 12A, this distance value is 3.8. Step 137 then performs a second sequence of iterations as described for FIG. 12A, using the idle point 123 as starting point and using the distance value determined by the first sequence of iterations. The resulting ICM is shown in FIG. 12C.

Step 137 may further comprise an interpolation step and/or a contrast enhancement step that operates on the ICM, for example as described above for the ACM.

Any available algorithm for finding shortest paths in a data set may be implemented to populate the ICM. Examples include a flood-fill algorithm, a Floyd-Warshall algorithm, Johnson's algorithm or any wave propagation algorithm, such as an adapted light propagation volumes algorithm, etc.

Reverting to the method 110 in FIG. 9, it may be noted that the users are presented with transportation prices that are based on the utilization schedule 110' at every single point in time. It is conceivable that step 116 further updates the utilization schedule 100' based on manual or automatic prediction, for example extrapolation based on statistics, to introduce virtual deliveries, or based on relevant events such as changed weather conditions.

In some embodiments, the method 110 is performed for the current time point, irrespective of the user-selected time point when the delivery/pick-up is to be performed. Thus, the ACM may be calculated based on the current positions of the UAVs, forthcoming or current idle points for the UAVs, etc. In such embodiments, the user-selected time point for delivery/pick-up may at least be accounted for when the utilization schedule 110' is updated. As used herein, the "user-selected time point" may be freely selected by the user or be a time point suggested by the system and accepted by the user.

In other embodiments, the method 110 is performed for at least one future time point, which may or may not be selected by the user. The utilization cost is likely to depend on the time of the day, given the varying availability of users to interface with the UAVs for the pick-up or delivery. In these embodiments, the ACM may be calculated based on predictions of future positions of the UAVs, predictions of idle points for the UAVs, etc. These predictions may be based on the utilization schedule, as well as historical data, weather forecasts, advance information from merchants and similar sources.

In some embodiments, the method 110 may be configured to, in step 114, present the transportation price at the potential location(s) for a sequence of time points, for example the current time point and one or more future time points, and allow the user to select the location and time point for delivery/pick-up based on the presented data. The spacing between time points may be one or more hours or one or more days. For example, the interactive chart 104 in FIG. 8 may be supplemented by a scrolling function, for example a time bar, that allows the user to browse interactive charts 104 for different time points. In such embodiments, step 111 may compute the ACM for a plurality of different time points to generate a time sequence of ACMs. Step 113A may generate an interactive chart 104 for the respective ACM in the time sequence, and step 114 may provide the interactive charts 104 for display.

Figure 14:
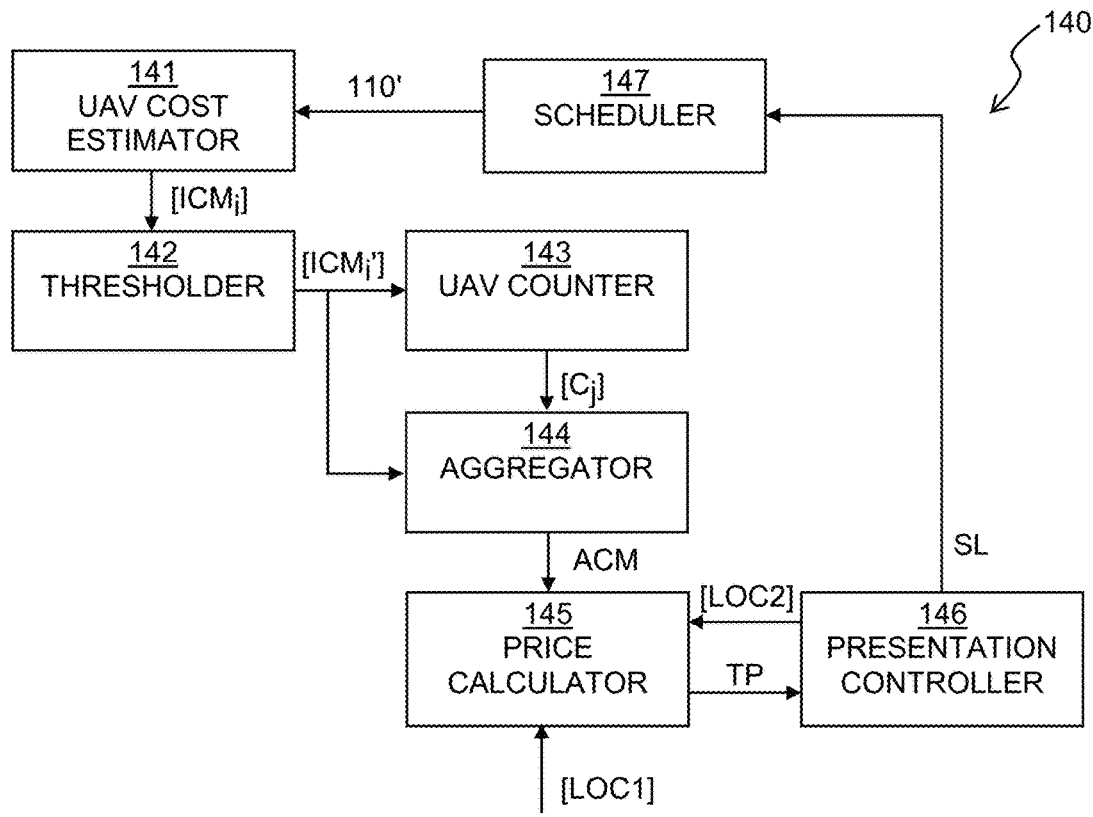
FIG. 14 is a block diagram of an example scheduling module according to an embodiment.

FIG. 14 is a block diagram of an example scheduling module 140, which may be included in the scheduling device 100 in FIG. 7. The module 140 comprises sub-modules 141-147. A UAV cost estimator 141 is configured to compute the ICMs for the different UAVs, designated by [ICMi], for example according to step 131. A thresholder 142 is configured to perform a thresholding operation on the ICMs, resulting in pre-processed ICMs designated by [ICMi'], for example according to step 132. A UAV counter 143 is configured to count the number of available UAVs per cell, resulting in counts designated by [Cj], for example according to step 134. An aggregator 144 is configured to generate the ACM, for example according to steps 133 and 135. A price calculator 145 is configured to generate transportation prices TP, for example according to step 113. The transportation prices TP may be generated for a first set of set of potential locations, which may be system-generated and is designated by [LOC1], and/or for a second set of potential locations, which may be user-generated and is designated by [LOC2]. In the illustrated example, [LOC2] is received from a presentation controller 146. Further examples of the origins of [LOC1] and [LOC2] are given hereinabove with reference to step 112. The presentation controller 146 is configured to present the transportation prices TP to the user on a display (cf. 103 in FIG. 7), for example according to step 114, and receive a user selection of location, designated SL, for example according to step 115. The user selection SL is detected and output by the presentation controller 146, and a scheduler 147 updates the utilization schedule 110' based on SL, for example according to step 116.

In the following, items are recited to summarize some aspects and embodiments as disclosed in the foregoing.

Item 1: A method of scheduling transports by a fleet of unmanned aerial vehicles, UAVs (1), said method comprising:

computing (111) aggregated cost data (ACM) for the fleet of UAVs (1) based on current and/or future locations of the UAVs (1) within a geographic region (120), the aggregated cost data (ACM) associating utilization cost with distributed sub-regions (122) within the geographic region (120), the utilization cost of a respective sub-region (122) representing an estimated cost for directing at least one of the UAVs (1) to the respective sub-region (122);

receiving (112) a query indicative of one or more potential locations for pick-up or delivery of a payload (4);

determining (113), based on the aggregated cost data (ACM), a transportation price for at least one potential location among the one or more potential locations; and presenting (114) the transportation price for the at least one potential location.

Item 2: The method of item 1, wherein said computing (111) the aggregated cost data comprises: computing (131) individualized cost matrices (ICMi) for the UAVs (1), the individualized cost matrices (ICMi) defining cost values for directing a respective UAV (1) to the distributed sub-regions (122); and forming (132-135) the aggregated cost data (ACM) as a combination of the individualized cost matrices (ICMi).

Item 3: The method of item 2, wherein said forming (132-135) the aggregated cost data comprises: determining (133), for the respective sub-region (122), the utilization cost as a function of cost values that are associated with the respective sub-region (122) in the individualized cost matrices (ICMi).

Item 4: The method of item 3, wherein the utilization cost for the respective sub-region (122) is determined as a function of a smallest cost value among the cost values that are associated with the respective sub-region (122) in the individualized cost matrices (ICMi).

Item 5: The method of item 4, wherein said forming (132-135) the aggregated cost data comprises: determining (132, 134) a count of available UAVs (1) for the respective sub-region (122), wherein the utilization cost for the respective sub-region (122) is given by the smallest cost value reduced as a function of the count of available UAVs (1) for the respective sub-region (122).

Item 6: The method of item 5, wherein said determining (132, 134) the count of available UAVs for the respective sub-region comprises: counting cost values that are smaller than a threshold cost among the cost values associated with the respective sub-region (122) in the individualized cost matrices (ICMi).

Item 7: The method of any one of items 2-6, wherein said computing (131) the individualized cost matrices for the UAVs comprises: determining (136) a starting point (123) for the respective UAV (1) in the geographic region (120), determining (137) a distance value from the starting point (123) to the respective sub-region (122), and determining (138) a cost value for the respective sub-region (122) as a function of the distance value of the respective sub-region (122).

Item 8: The method of item 7, wherein said determining (136) the starting point for the respective UAV comprises: determining a position at which the respective UAV (1) is scheduled to be idle.

Item 9: The method of item 7 or 8, wherein the cost value for the respective sub-region (122) is further determined as a function of a residence time of the respective UAV (1) at the starting point (123).

Item 10: The method of any preceding item, wherein said computing (111) the aggregated cost data comprises: determining the utilization cost within or between the sub-regions (122) by interpolation of the utilization cost associated with the sub-regions (122).

Item 11: The method of any preceding item, wherein said computing (111) the aggregated cost data comprises: determining a local derivative in utilization cost within the aggregated cost data (ACM) and updating the utilization cost within the aggregated cost data (ACM) based on the local derivative to enhance contrast in utilization cost between adjacent sub-regions (122).

Item 12: The method of any preceding item, further comprising generating (113A) a graphical representation (104) of a distribution of the transportation price within the geographic region (120), wherein said presenting (114) comprises presenting the graphical representation (104).

Item 13: The method of any preceding item, wherein said computing (111) the aggregated cost data (ACM) comprises: generating a time sequence of aggregated cost data by computing the aggregated cost data (ACM) for a plurality of different time points, wherein said determining (113) the transportation price comprises: determining a time sequence of transportation prices by determining the transportation price for the at least one potential location at the plurality of different time points, wherein said presenting (114) comprises: presenting the time sequence of transportation prices.

Item 14: The method of any preceding item, wherein the query is received in response to a user-selection of the one or more potential locations in the geographic region (120).

Item 15: The method of any preceding item, wherein the query comprises a user movement path (107) in the geographic region (120), and wherein the method further comprises: determining the one or more potential locations in relation to the user movement path (107).

Item 16: The method of any preceding item, further comprising: receiving (115), subsequent to said presenting (114), a user selection of a transportation price and a corresponding potential location.

Item 17: The method of item 16, further comprising: including (116) the user selection in a utilization schedule (110') that defines current and future locations of the UAVs within the geographic region, wherein said computing (111) the aggregated cost data (ACM) is based on the utilization schedule (110').

Item 18: The method of item 17, further comprising: directing said at least one of the UAVs (1) to the corresponding potential location based on the utilization schedule (110').

Item 19: The method of any preceding item, wherein the aggregated cost data (ACM) comprises a matrix that associates the utilization cost with the sub-regions.

Item 20: A device for scheduling transports by a fleet of unmanned aerial vehicles (1), said device comprising logic (1101, 1102) configured to perform the method of any one of items 1-19.

Item 21: A delivery system comprising a fleet of unmanned aerial vehicles (1), and the device according to item 20, wherein the device is configured for communication with the unmanned aerial vehicles (1).

Item 22: A computer-readable medium comprising computer instructions (1102A) which, when executed by a processing system (1101), cause the processing system (1101) to perform the method according to any one of items 1-19.

3. Improvements in Launching Uavs

This part of the disclosure relates to launching of UAVs and is based on the insight that the performance of UAVs may be significantly improved by elevating the UAVs before they are launched, by use of a power source that is external to the UAVs. By elevating the UAVs, energy from the power source is converted into increased potential energy of the UAVs. The increased potential energy may be utilized to improve the performance of the UAVs, for example in terms of range, power consumption, ability to carry payload, transit time to destination, etc., and may also enable use of UAVs of simpler construction, for example UAVs without local power source. Further, the UAVs may be elevated to avoid obstacles in the flight route. Still further, the UAV may be elevated to enable the UAV to harvest energy by use of gravity, for example to charge a battery.

Some embodiments involve a system for launching UAVs. The launch system comprises a lifting arrangement which is physically separate from the UAVs and powered by a power source. The lifting arrangement is operable, before launch of an UAV, to vertically elevate the UAV. The launch system is useful for all UAV missions but provides distinct advantages for UAVs that carry a payload. The power consumption for vertical motion of the UAV depends on the total weight of the UAV, and if the payload is heavy, the power consumption may be considerable. The launch system may therefore enable significant savings in the power consumption of the UAV. The launch system may also allow the UAV to carry more weight than it can lift, since the UAV may be launched at an altitude above the destination.

In the following examples, the launch system is arranged in a mobile station, for example a vehicle, a ship, or a trailer connected to a truck. The launch system may thereby be moved into a desired geographic position from which one or more UAVs are launched on a respective mission. However, it is also conceivable that the station is stationary.

Figures 15A, 15B:
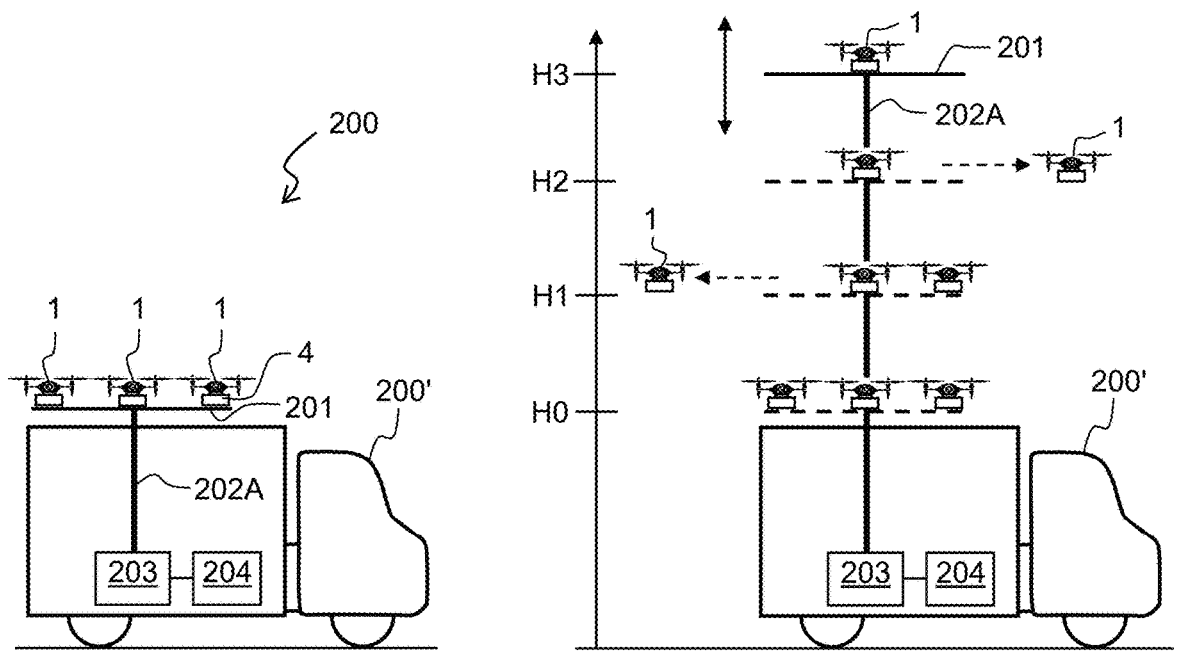
FIGS. 15A-15B are side views of an example UAV launch system according to an embodiment, in a default state and a launch state, respectively.

FIGS. 15A-15B illustrate an example launch system 200 in accordance with an embodiment. The launch system comprises a control system 203, which is located in the station 200' and configured to operate the lifting arrangement to vertically elevate the UAVs 1 to one or more selected heights. The control system 203 may comprise control electronics for generating control signals to one or more actuators (not shown) of the lifting arrangement. Such actuator(s) may be electrically, hydraulically or pneumatically operated. The system also comprises a system power source 204 which is ground-based and supplies power for operating the control system 203 and thereby the lifting arrangement. The system power source may comprise a battery, a fuel cell, a combustion engine, a solar panel, a wind turbine, etc., and/or be connected to a power distribution grid. In the illustrated example, the lifting arrangement comprises an extendable mechanical structure 202A, for example a telescopic device or mast, a pivotable device, a bay lift, a 4-bar linkage, etc. The extendable structure 202A is mechanically connected to a platform 201 for carrying one or more UAVs 1 to be launched. FIG. 15A shows the system 200 in a default state, in which the extendable structure 202A is retracted with the platform 201 and the UAVs 1 being at a default or reference level (H0 in FIG. 15B), in this example substantially flush with the top of the station 200'. FIG. 15B shows the system 200 in a launch state, in which the extendable structure 202A has been operated by the control system 203 to vertically elevate the platform 201 and the UAVs 1 to a selected height ("altitude"). In the illustrated example, the platform 201 has been sequentially operated to attain heights H1, H2 and H3 for launch of a respective UAV 1. As will be described in detail further below, the heights H1-H3 may be selectively determined for the respective UAV 1.

When one or more UAVs 1 have been launched, the platform 201 may be operated into a predefined height, for example the reference level H0 below heights H1-H3. This may reduce the power consumption of any UAV that may need to land on the platform 201, for example a UAV 1 that returns after completing its mission.

Figures 16, 17A, 17B:
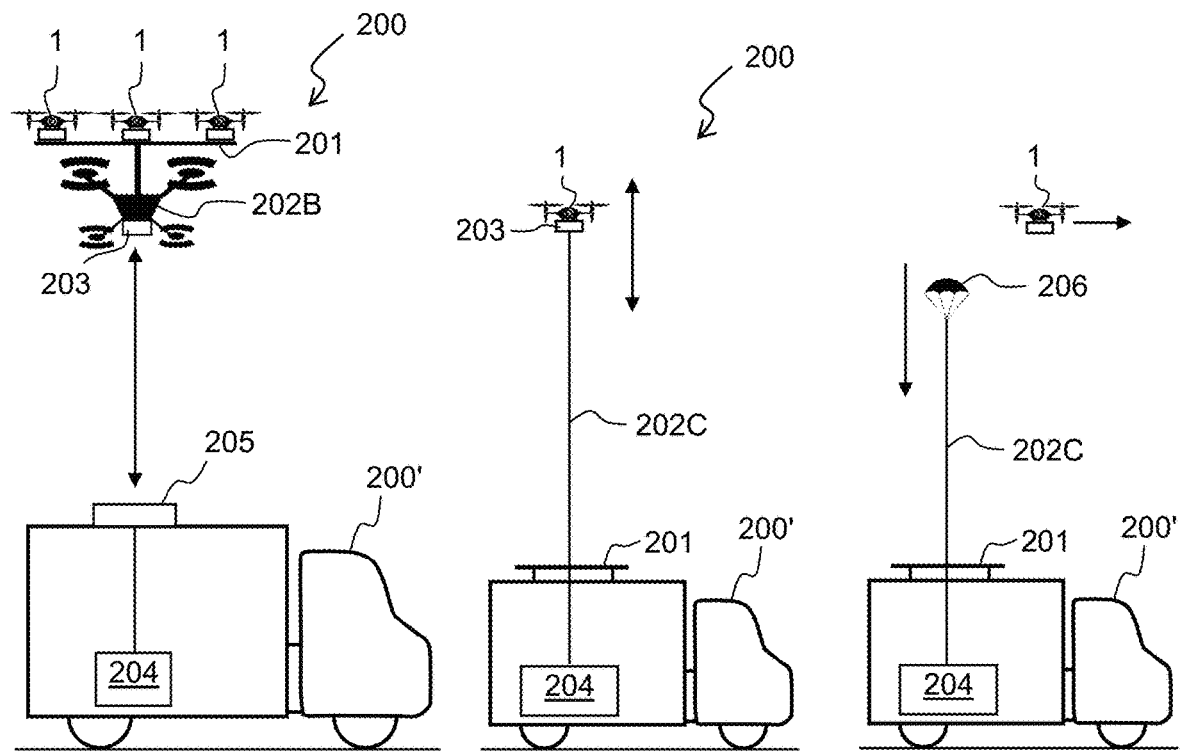
FIG. 16 is a side view of an example UAV launch system according to another embodiment.
FIGS. 17A-17B are side views of an example UAV launch system according to another embodiment before and after launch, respectively.

FIG. 16 illustrates an example launch system 200 according to another embodiment. The lifting arrangement comprises an aircraft 202B, for example a dedicated lifting UAV, which may be configured to carry substantial load. In one example, the aircraft 202B is a so-called "cargo drone". Other examples of aircrafts include aerostats, airships and hot air balloons. The platform 201 for the UAVs 1 is arranged on the aircraft 202B and is thus vertically elevated together with the aircraft 202B. If the aircraft 202B has a propulsion system, the platform 201 is preferably arranged to be shielded from air movement caused by the propulsion system, for example to avoid downward forces onto the UAVs 1 from the air movement.

In the illustrated example, the control system 203 is located on the aircraft 202B. The aircraft 202B may comprise a local power source (not shown) which is charged by the system power source 204, for example when the aircraft 202B has landed on a docking station 205 on the station 200'. Alternatively or additionally, the aircraft 202B may be connected by a power cable to the system power source 204.

FIGS. 17A-17B illustrate an example launch system 200 according to another embodiment. The lifting arrangement comprises a power cable 202C, which is releasably connected to the UAV 1 for supplying energy from the system power source 204 to the UAV 1 while it elevates to the selected height. In this embodiment, the control system 203 is arranged on the UAV 1 and operates the propulsion system of the UAV 1 (cf. 1002 in FIG. 1) to vertically elevate the UAV. The platform 201, if provided, is fixed in the system, for example on the top of the station 200' as shown. FIG. 17A illustrates the system 200 before launch, when the UAVs is in transit to the selected height, and FIG. 17B illustrates the system 200 after launch, when the control system 203 has operated a holding mechanism (not shown) on the UAV 1 to detach the power cable 202C. In the illustrated example, the power cable comprises a parachute 206 that may be automatically released when the power cable 202C is detached to facilitate a controlled return path for the power cable 202C. The system 200 may further comprise a hauling mechanism for pulling back the power cable 202B, for example a reeling device, as well as an attachment mechanism for re-attaching the power cable 202B to another UAV 1.

Figures 18, 19:
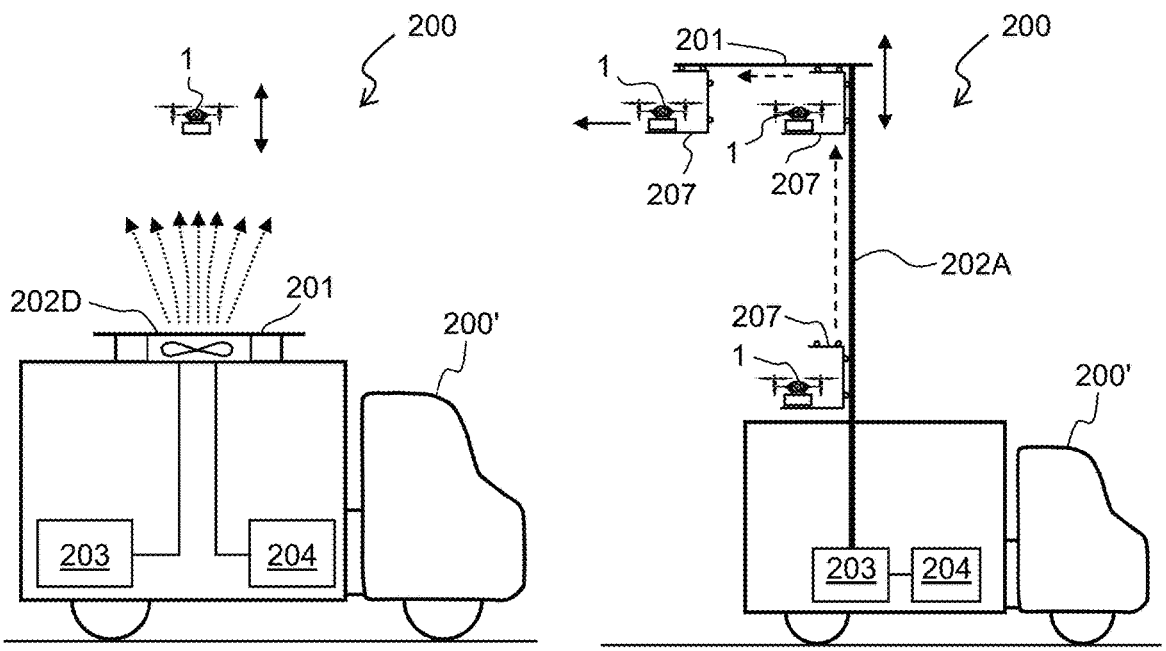
FIGS. 18-19 are side views of example UAV launch systems according to further embodiments.

FIG. 18 illustrates an example launch system 200 according to another embodiment. The lifting arrangement comprises a flow generator 202D which is operable to generate a vertical air flow towards an UAV 1. The flow generator 202D is powered by the system power source 204. In some embodiments, the flow generator 202D is operable to lift the UAV 1 to the selected height, subject to control by the control system 203 in the station 200'. In other embodiments, the flow generator 202D is operated to sustain or facilitate the vertical elevation of the UAV 1, while the control system 203 is located in the UAV 1 to operate the propulsion system (1002 in FIG. 1) to attain the selected height. As shown, the launch system 200 may include a platform 201 for carrying UAVs, the platform 201 being fixed to the station 200' and configured to let through the air flow.

FIG. 19 illustrates an example launch system 200 according to another embodiment. The lifting arrangement comprises a conveyor device 207 which is configured to lift one or more UAVs 1 onto a platform 201. The platform 201 is attached to an extendable mechanical structure 202A. Like in FIG. 15, the control system 203 in the station 200' may operate the extendable structure 202A to vertically elevate the platform 201 to a selected height and operate the conveyor device 207 to elevate the UAV(s) 1 to the level of the platform 201, for example shown in FIG. 19.

It should be noted that any combination of the examples in FIGS. 15-19 is conceivable. For example, the flow generator 202D in FIG. 18 may be combined with the embodiments in FIGS. 16-17. Further, FIGS. 15-19 depict non-limiting examples of launch systems and the skilled person should be able to conceive variants and alternatives based on the foregoing disclosure.

Figure 20:
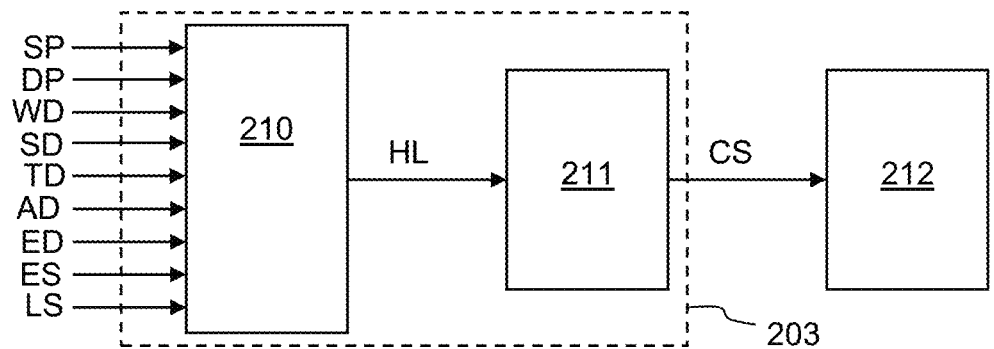
FIG. 20 is a block diagram of an example launch control system according to an embodiment.

FIG. 20 is a schematic block diagram of an example control system 203 for controlling the lifting arrangement in a launch system 200. The control system 203 comprises a calculation module 210 which is configured to calculate the selected height for launching one or more UAVs. In FIG. 20, the selected height is designated by HL. The control system 203 further comprises a controller 211 for generating a control signal CS in correspondence with HL and provide CS to an actuator mechanism 212 of the lifting arrangement. The controller 211 may be of any suitable configuration, such as a feedback and/or feed-forward controller. The controller 211 may thus operate in response a signal from one or more sensors that measure the current height of the lifting arrangement, such as a barometer or a distance meter (radar, lidar, time-of-flight, etc). The actuator mechanism 212 will depend on the type of lifting arrangement and will not be described further.

Figure 21:
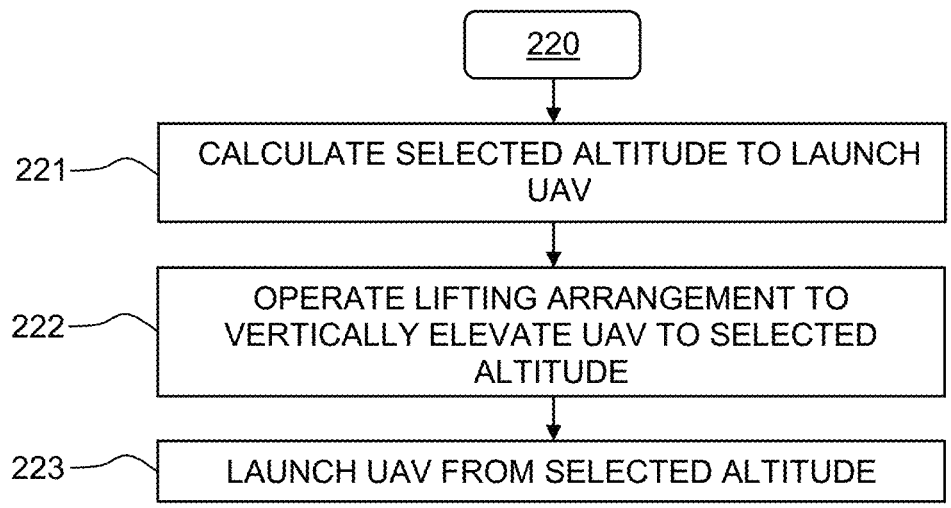
FIG. 21 is a flow chart of an example UAV launch method in accordance with an embodiment.

FIG. 21 is a flow chart of an example method 220 for launching an UAV in accordance with an embodiment. The method 220 may be performed by the control system 203. Step 221 calculates the selected height (altitude) HL for launching the UAV. The selected height HL is calculated in relation to a reference height or reference datum, for example the mean sea level (MSL) or a position on the station 200', such as the reference level H0 in FIG. 15B. In step 222, the lifting arrangement is operated to vertically elevate the UAV to the selected height. In step 223, the UAV launches from the selected height, and thereby begins its mission. In the example of FIG. 20, step 221 may be performed by the calculation module 210, and step 222 may be performed by the controller 211. Step 223 may comprise providing a launch signal to the UAV when the lifting arrangement has elevated the UAV to the selected altitude, thereby causing the UAV to launch. The launch signal may be generated by the control system 203 and transmitted to the local controller of the UAV. If the control system 203 is located in the station 200' (FIGS. 15, 18, 19), the launch signal may be transmitted by wireless communication or over wire integrated in the lifting mechanism (FIGS. 15, 19). If the control system 203 is located in the UAV (FIGS. 16, 17), the launch signal may be conveyed by wire or wirelessly to the local controller of the UAV. It is also conceivable that the control system 203 is integrated in the local controller.

Step 221 may calculate the selected height HL based on parameter data that represents the UAV to be launched, the lifting arrangement, or the surrounding conditions between the lifting arrangement and the destination of the UAV. Examples of such parameter data is indicated in FIG. 20. In one example, the parameter data comprises the location of the lifting arrangement (SP, "starting point") and the destination for the UAV to be launched (DP, "destination point"). The starting and destination points SP, DP may be given as two-dimensional (2D) or three-dimensional (3D) coordinates in any global coordinate system, for example a geographic coordinate system. In one example, the parameter data for the UAV may indicate the type of UAV and/or a current state of the UAV. The current state may comprise one or more of current weight data (WD) for the UAV, current size data (SD) for the UAV, or current energy content (ED)

of the local power source in the UAV (cf. 1010 in FIG. 1). If the UAV carries a payload to be delivered at a destination, WD may represent either the weight of the payloads or the total weight of UAV and payload. Similarly, SD may represent either the size of the payload or the total size of UAV and payload. Here, size may be represented as an area, shape, one or more dimensions, or any equivalent measure. In one example, the parameter data for the surrounding conditions may comprise one or more of topography data (TD) for a region comprising SP and DP, or current ambient data (AD) of the region. Here, TD may indicate the 3D profile of the region and include the location, extent and height of obstacles between SP and DP, and AD may indicate current weather conditions, air pressure, humidity, etc. The obstacles may include buildings, trees, power lines, etc. In one example, the parameter data for the lifting arrangement may comprise one or more of energy content data (ES) of the system power source 204, and elevation speed data (LS) for the lifting arrangement. Here, LS may indicate a nominal or estimated speed for the elevation by the lifting arrangement.

Step 221 may calculate the selected height HL by evaluating the parameter data in relation to at least one predefined consumption parameter. In one example, step 221 evaluates the parameter data by optimizing a cost function that represents the predefined consumption parameter(s). Such a cost function may take the parameter data as known variable(s) and the height parameter as unknown variable. The cost function may be optimized by finding the value of the height parameter that produces a maximum or minimum of the cost function, this value representing the selected height. Any suitable optimization algorithm may be applied to optimize the cost function, including but not limited to a gradient method such as gradient descent, coordinate descent, conjugate descent, etc., or an evolutionary algorithm such as genetic algorithm, genetic programming, etc.

In some embodiments, the at least one predefined consumption parameter represents a consumption cost for performing a delivery at the destination. In one example, the selected height HL is calculated to minimize the UAV energy consumption, and the consumption cost may represent the required energy consumption of the UAV to deliver the payload at the destination. In one example, the selected height HL is calculated to minimize the total energy consumption to deliver the payload at the destination, and the consumption cost may represent both the required energy consumption of the UAV and the required energy consumption of the lifting arrangement to vertically elevate the UAV to the selected altitude. In one example, the selected height HL is calculated to minimize the delivery time, and the consumption cost may represent the required time for the UAV to reach the destination, from launch or from when the lifting arrangement is activated to elevate the UAV. In one example, the selected height HL is calculated to minimize the monetary cost to deliver the payload at the destination.

It may be noted that step 221 may simultaneously calculate selected heights for a plurality of UAVs 1, for example by jointly optimizing cost functions for the different UAVs.

The underlying principles will be further described for a specific example, in which the consumption parameter is the total energy consumption, and the cost function comprises the following parameters: type of UAV (TYPE), weight of the payload (WD), obstacle height (OH), and the height parameter (HP) to be optimized. In this example, the cost function C may be defined as:

$$C = C1(\text{TYPE}, WD) \cdot (OH - HP) + C2(\text{TYPE}, WD) \cdot HP$$

where a first function C1 provide the unit energy consumption in the UAV when moving upwards with the payload, and a second function C2 provides the unit energy consumption for driving the lifting arrangement upwards while carrying the UAV and its payload. It is realized that the selected height may be determined by minimizing the cost function C.

Figure 22A:
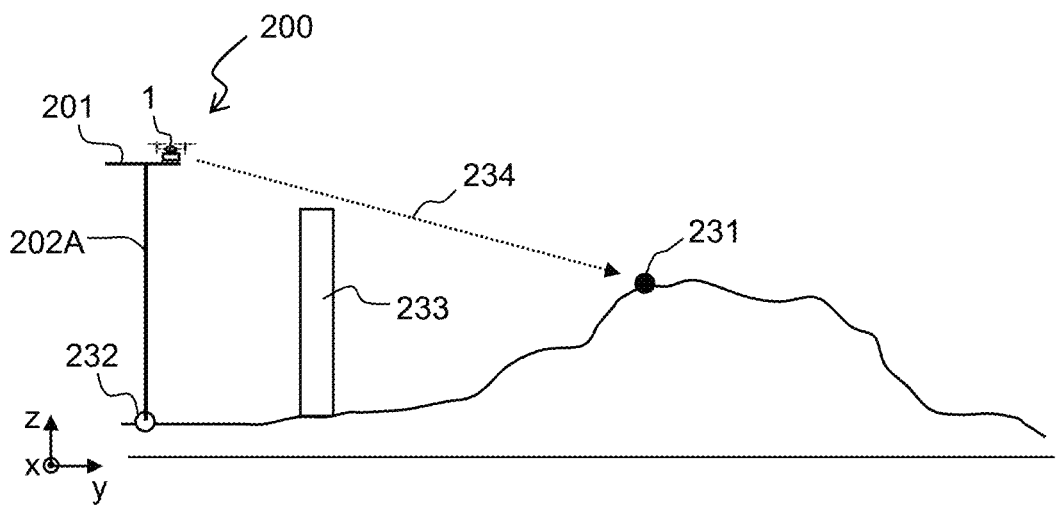
FIGS. 22A-22B are side and top views of example UAV flight paths from a launch system location to a destination.
Figure 22B:
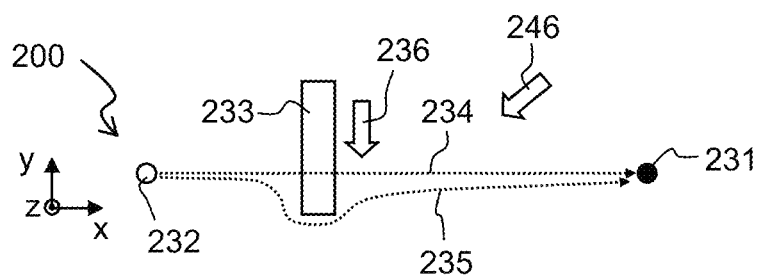

A further simplified example is shown in FIGS. 22A-22B. A launch system 200 of the type shown in FIG. 15 is arranged to launch an UAV 1 for transit to a destination 231 (given by DP in FIG. 20). The launch system 200 is located at a launch location 232 (given by SP in FIG. 20), and an obstacle 233 is located between the launch location 232 and the destination 231. Properties of the obstacle 233 may be given by the above-mentioned topography data TD. As indicated by arrows 236, 246 in the top plan view of FIG. 22B, the wind pattern (for example, direction and speed) between the launch location 232 and the destination 231 is known, for example given by the above-mentioned weather data WD. Based on this input data, step 221 may calculate the selected height to optimize, for example, the total energy consumption, the UAV energy consumption or the transit time. In this calculation, step 221 may evaluate the options of elevating the UAV 1 to a level above the obstacle 233 to provide a straight route 234 for the UAV 1 to the destination location 231, or to elevate the UAV 1 to a lower level and have the UAV 1 take a route 235 around the obstacle 233.

As noted above, the launch system 200 may be mobile. Consider a delivery system that comprises a fleet of UAVs 1 and a plurality of launch systems 200, for example as exemplified in FIG. 24. The delivery system comprises a scheduling apparatus 270. The launch systems 200 are arranged on mobile stations 200' which hold a respective set of UAVs 1. In some embodiments, the delivery system is optimized for delivery of payloads to a plurality of destinations by actively selecting launch positions of one or more of the launch systems 200 in relation to the plurality of destinations.

Figure 23A:
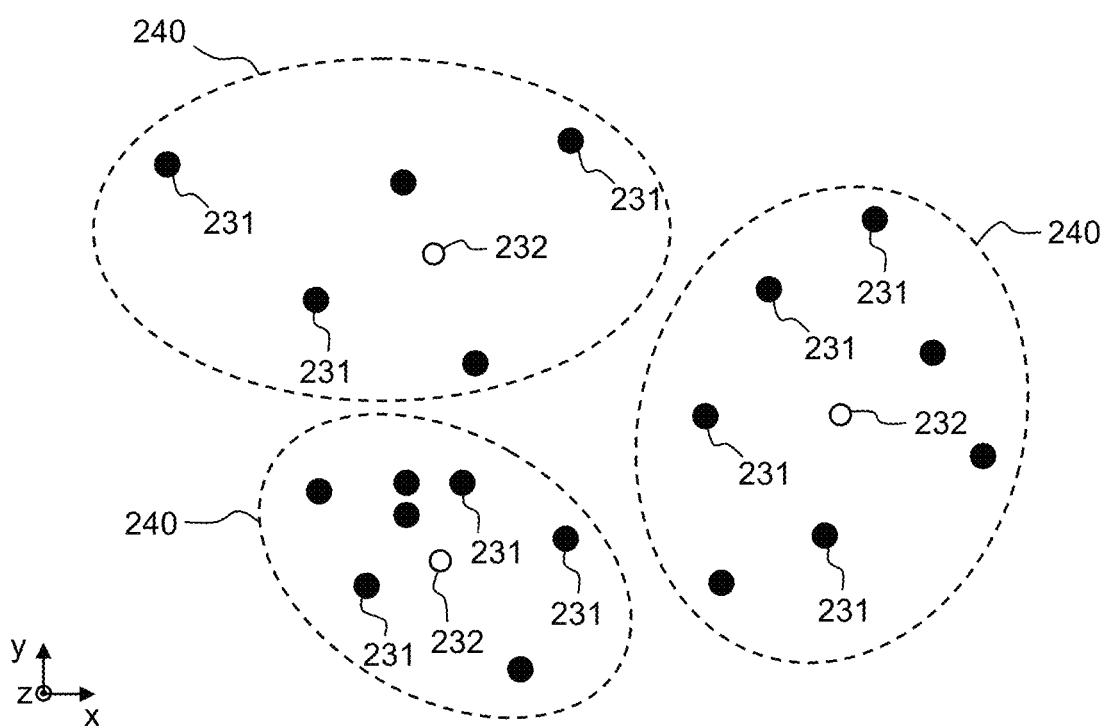
FIG. 23A is a schematic view of example clusters generated for a plurality of destination locations of a delivery system.
Figures 23B, 23C:
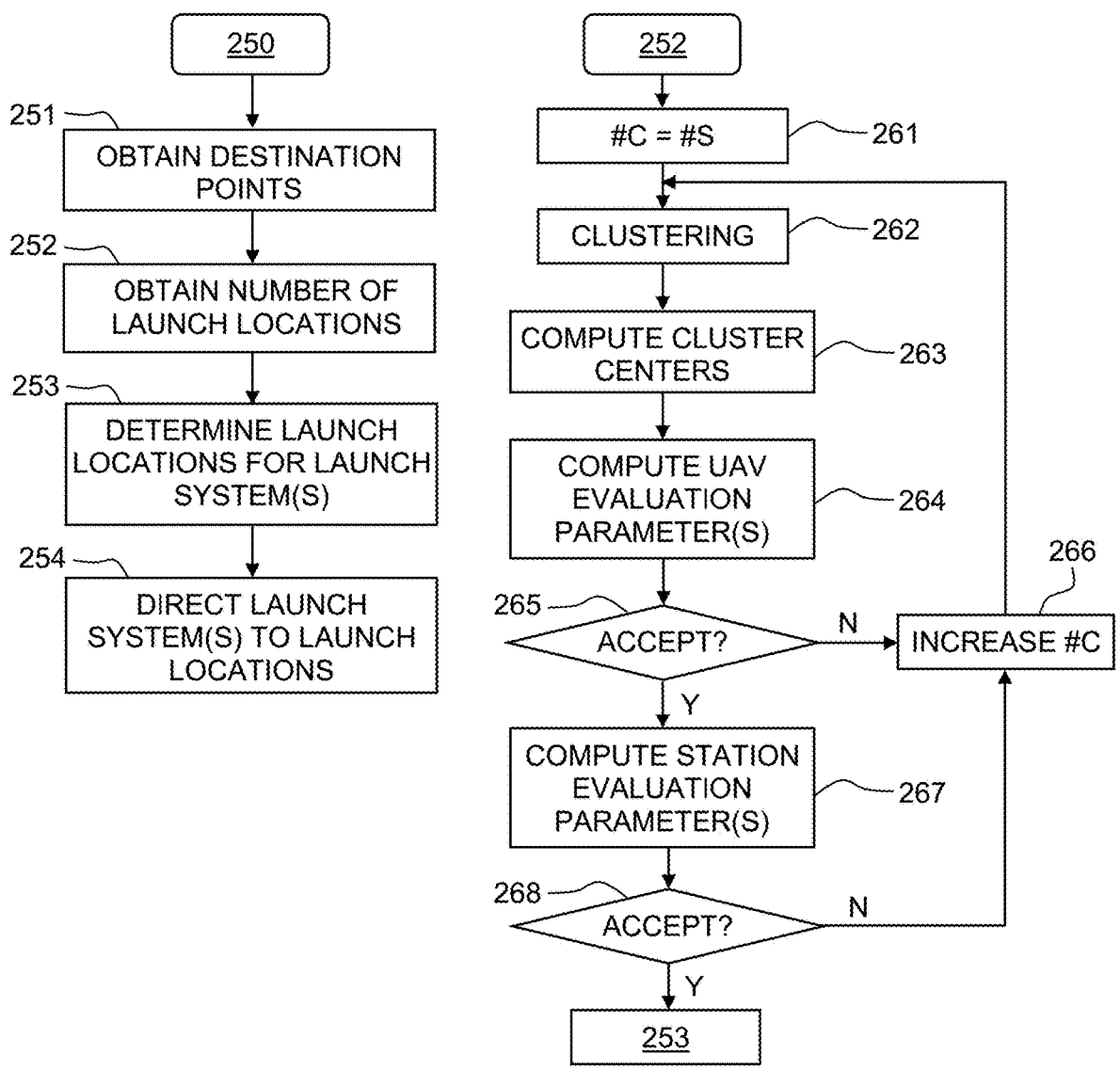
FIGS. 23B-23C are flow charts of methods for configuring a delivery system.

FIG. 23B is a flowchart of an example method 250 for configuring such a delivery system. The method 250 may be performed by the scheduling apparatus 270. Step 251 obtains the plurality of destinations ("destination points", [DP]) for delivery of payloads by the delivery system. Step 252 obtains the number of launch locations to be determined by the method 250. Step 253 determines this number of locations as a function of the plurality of destinations. Step 254 directs a set of launch systems 200 to the launch locations, represented by [SP] in FIG. 24. Step 254 may be performed by electronic communication from the scheduling apparatus 270 to the stations 200' and/or to drivers of the stations. Alternatively, the launch location(s) may be manually transferred to the drivers/stations. It should be understood that step 253 may assign a subset of the destinations to the respective launch location, and that step 254 may transfer the subset of destinations to the UAV(s) 1 to be launched from the respective launch location. Further, step 254 may cause the goods to be delivered to be loaded on the respective station 200'.

The delivery system may cover a geographic region that is divided into areas that have a respective distribution center with stations 200'. The scheduling apparatus 270 may assign goods to different distribution centers based on the destination of the respective goods, sort the destinations into groups by the expected time of delivery, and then operate the method 250 on each group separately to determine the launch locations 232.

FIG. 23A illustrates a plurality of destinations (filled dots) 231 for goods to be delivered by a delivery system, and launch locations (open dots) 232 determined by the method 250 for the destinations 231. The method 250 may also assign a respective subset of the destinations 231 to the launch locations 232. In FIG. 23A, the respective subset is indicated as a cluster 240. In some embodiments, step 253 of method 250 comprises operating a clustering algorithm on the destinations 231 to determine a number of clusters 240 that is equal to the number given by step 252, calculating geometric centers for the clusters 240, and determining the launch locations 232 in relation to the geometric centers. The launch locations 232 may be set in or near the geometric centers taking, for example, into account the physical environment such as availability of roads, parking, etc. The launch locations 232 may be assigned to different stations 200', but it also conceivable one station 200' is assigned to stop at two or more of the launch locations 232.

The clustering algorithm may be configured to identify a selected number of groups among the destinations. For example, any partitional clustering algorithm may be used, such as k-means, minimum spanning tree (MST), squared error, nearest neighbor, k-medoids, or expectation maximization (EM), or variants, alternatives or derivatives thereof.

Figure 24:
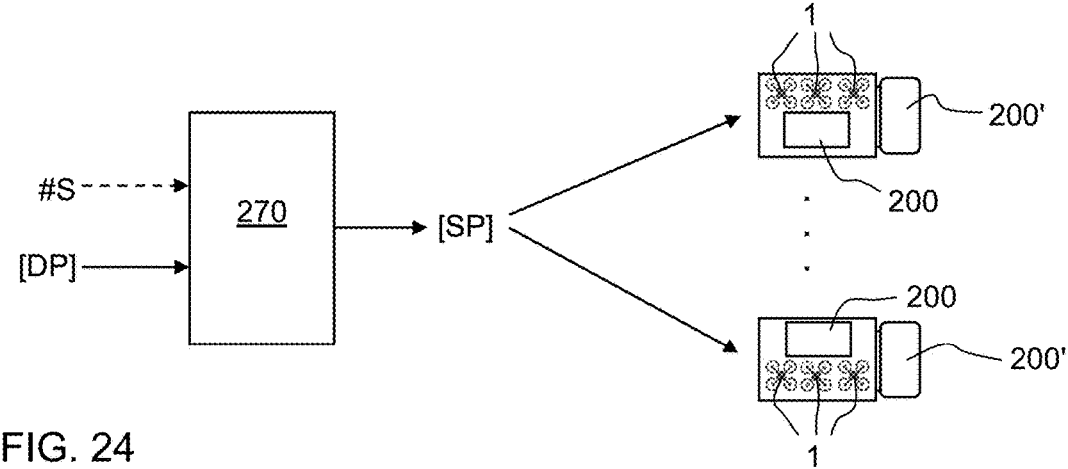
FIG. 24 is a schematic view of an example delivery system.

In some embodiments, step 252 may obtain the number of launch locations as a predefined value, for example from a memory. In some embodiments, the number of launch locations may be provided to step 252 by an operator, for example as input to the scheduling apparatus 270. In FIG. 24, the selected number of clusters is designated by #S. By increasing the number of clusters, the total travel distance of the station(s) 200' increases while the total flight path of the UAVs decreases. Thus, the number of clusters may be adjusted by the operator to achieve a desired balance between the distance traveled by stations 200' versus UAVs 1.

In some embodiments, step 252 operates the cluster algorithm on the destination points 231 for different numbers of clusters, determines one or more evaluation parameters for the respective clustering result, and selects the number of launch locations based on one or more evaluation parameters. Step 253 may then determine the launch locations 232 for the set of clusters that was produced in step 252 for the selected number. The evaluation parameter(s) may be a default parameter for the scheduling apparatus 270 or selected by an operator. In some embodiments, the evaluation parameter(s) may comprise a first parameter, which is related to the UAVs. For example, the first parameter may identify the maximum flight distance, the maximum flight time or the maximum energy consumption among the UAVs when assumed to travel from the geometric centers of the clusters 240 to the destinations 231 within the clusters. Such an UAV evaluation parameter may be used to ensure that the clusters 240 are commensurate with the operating capabilities of the UAVs. If the maximum flight distance/flight time/energy consumption is too high for a set of clusters, even when using other clusters' stations as trampolines, it may be inappropriate or even impossible to assign UAVs to perform deliveries in accordance with the set of clusters. In some embodiments, the evaluation parameter(s) may comprise a second parameter, which is related to the stations 200'. For example, the second parameter may identify the total energy consumption of the stations 200' during their mission, the total distance travelled by the stations 200' during their mission, or the time required for the stations 200' to complete their mission. The mission may be started when the stations 200' leave a distribution center and be completed when they return or when all UAVs have been launched. During the mission, one or one of the stations 200' may visit two or more launch locations.

FIG. 23C is a flow chart of an example procedure for determining the number of launch locations. As indicated, the example procedure may be part of step 252 in FIG. 23B. In step 261, the current number of clusters (#C) is set to a start value, for example a value #S entered by the operator or a default value. In one example, the start value is equal to the maximum number of currently available stations 200'. Step 262 operates the clustering algorithm on the destinations 231 to define #C different clusters. Step 263 computes the geometric centers of the clusters, and step 264 computes at least one UAV evaluation parameter as a function of the geometric centers. If the at least one UAV evaluation parameter is deemed unacceptable, step 265 proceeds to step 266 which increases the number of clusters (#C). When the at least one UAV evaluation parameter is deemed acceptable, step 265 proceeds to 267 which computes at least one station evaluation parameter. If the at least one station evaluation parameter is deemed unacceptable, step 268 proceeds to step 266 which increases the number of clusters. When the at least one station evaluation parameter is deemed acceptable, step 268 proceeds to step 253 which may determine the launch locations for the set of clusters that was generated by the latest execution of step 262. It is realized that the procedure in FIG. 23C enables a balance to be stricken between travel parameters of UAVs and stations, by setting proper evaluation criteria, such as thresholds, for the evaluation steps 265 and 268.

In the following, items are recited to summarize some aspects and embodiments as disclosed in the foregoing.

Item 1: A system for launching an unmanned aerial vehicle (1), UAV, to deliver goods to a destination, said system comprising:
a lifting arrangement (202A-202D, 205, 207) which is physically separate from the UAV (1) and powered by a power source (204), the lifting arrangement (202A-202D, 205, 207) being operable, before launch of the UAV (1), to vertically elevate the UAV (1) to a selected altitude (HL) relative to a reference level, and
a control system (203) configured to calculate the selected altitude (HL) and provide a corresponding control signal (CS) for the lifting arrangement (202A-202D, 205, 207).

Item 2: The system of item 1, wherein the control system (203) is configured to calculate the selected altitude (HL) as a function of parameter data representing at least one of the UAV (1), the lifting arrangement (202A-202D, 205, 207), or surrounding conditions between the lifting arrangement (202A-202D, 205, 207) and the destination.

Item 3: The system of item 1 or 2, wherein the parameter data comprises a location of the lifting arrangement (202A-202D, 205, 207) and the destination for the UAV (1).

Item 4: The system of any preceding item, wherein the parameter data comprises one or more of: topography data (TD) for a region comprising the lifting arrangement (202A-202D, 205, 207) and the destination, current ambient data (AD) of the region, current weight data (WD) for the UAV (1), current size data (SD) for the UAV (1), current energy content data (ED) of a local power source (1010) in the UAV (1), current energy content data (ES) of the power source (204), and elevation speed data (LS) of the lifting arrangement (202A-202D, 205, 207).

Item 5: The system of any preceding item, wherein the control system (203) is configured to calculate the selected altitude (HL) by evaluating the parameter data in relation to at least one predefined consumption parameter.

Item 6: The system of item 5, wherein the at least one predefined consumption parameter represents a consumption cost for performing the delivery at the destination.

Item 7: The system of item 5 or 6, wherein the at least one predefined consumption parameter comprises one or more of: an energy consumption in the UAV (1) to deliver the goods at the destination, a total energy consumption comprising the energy consumption in the UAV (1) and an elevation energy consumption to vertically elevate the UAV (1) to the selected altitude (HL), a time period from a reference time point to arrival of the UAV (1) at the destination, or a monetary cost to deliver the goods at the destination.

Item 8: The system of any preceding item, wherein the lifting arrangement (202A-202D, 205, 207) is arranged on a mobile station (200').

Item 9: The system of any preceding item, wherein the lifting arrangement (202A, 202B, 207) is operable to vertically elevate a platform (201) for carrying the UAV (1).

Item 10: The system of item 9, wherein the lifting arrangement (202A, 202B, 207) is configured to vertically elevate the platform (201) while the UAV (1) is carried by the platform (201).

Item 11: The system of item 9 or 10, wherein the control system (203) is further configured to, after the launch of the UAV (1), operate the lifting arrangement (202A, 202B, 207) to lower the platform (201) from the selected altitude (HL) to a predefined altitude (H0).

Item 12: The system of any one of items 9-11, wherein the lifting arrangement comprises a conveyor device (207) which is configured to lift the UAV (1) onto the platform (201) at least when the platform (201) is vertically elevated.

Item 13: The system of any preceding item, wherein the lifting arrangement comprises an extendable mechanical connection device (202A).

Item 14: The system of any one of items 1-11, wherein the lifting arrangement comprises an aircraft (202B).

Item 15: The system of any preceding item, wherein the lifting arrangement comprises a flow generator (202D) which is arranged to generate a vertical air flow towards the UAV (1).

Item 16: The system of any one of items 1-8, wherein the lifting arrangement comprises a power cable (202C), which is releasably connected to the UAV (1) for supplying energy from the power source (204) to the UAV (1) while the control system (203) operates a propulsion system (1002) of the UAV (1) to vertically elevate the UAV (1).

Item 17: The system of any preceding item, which is further configured to provide a launch signal to the UAV (1) when the lifting arrangement (202A-202D, 205, 207) has elevated the UAV (1) to the selected altitude (HL), the launch signal causing the UAV (1) to launch for the destination.

Item 18: An apparatus for configuring a delivery system comprising a plurality of systems in accordance with any one of items 1-17, the plurality of systems being mobile and the apparatus being configured to perform a method comprising:
obtaining (251) a plurality of destinations (231) for delivery of goods by the delivery system;
obtaining (252) a number of launch locations (232) to be determined;
determining (253) said number of launch locations (232) as a function of the plurality of destinations (231); and
directing (254) one or more systems among the plurality of systems to the launch locations (232).

Item 19: The apparatus of item 18, wherein said determining (253) comprises: operating a clustering algorithm on the plurality of destinations (231) to determine a number of clusters (240) equal to said number of launch locations (232), calculating geometric centers for the number of clusters (240), and determining the launch locations (232) in relation to the geometric centers.

Item 20: The apparatus of item 18, wherein said obtaining (252) the number of launch locations comprises: operating a clustering algorithm on the plurality of destinations (231) in a plurality of repetitions, each repetition being configured to result in a different number of clusters (240); evaluating (264-268) the clusters (240) resulting from the plurality of repetitions in relation to at least one evaluation parameter to be optimized; and setting the number of launch locations (232) based on said evaluating (264-268).

Item 21: The apparatus of item 20, wherein the at least one evaluation parameter comprises a first parameter representing operation of one or more UAVs from the launch locations (232) to the plurality of destinations (231) and/or a second parameter representing operation of one or more systems to launch the one or more UAVs.

Item 22: The apparatus of item 21, wherein the first parameter represents a maximum flight distance, a maximum flight time or a maximum energy consumption among the one or more UAVs when travelling from the launch locations (232) to the plurality of destinations (231).

Item 23: The apparatus of item 21 or 22, wherein the second parameter represents a total energy consumption for the one or more systems, a total distance travelled by the one or more systems, or a time required for the one or more systems to launch the one or more UAVs.

Item 24: A method of launching an unmanned aerial vehicle, UAV, to deliver goods at a destination, said method comprising:
calculating (221) a selected altitude, relative to a reference level, for launching the UAV;
operating (222) a lifting arrangement to vertically elevate the UAV to the selected altitude; and
causing (223) the UAV to be launched from the selected altitude.

Item 25: The method of item 24, wherein the selected altitude is calculated as a function of parameter data representing at least one of the UAV, the lifting arrangement, or surrounding conditions between the lifting arrangement and the destination.

Item 26: The method of item 24 or 25, wherein the parameter data comprises a location of the lifting arrangement and the destination for the UAV.

Item 27: The method of any one of items 24-26, wherein the parameter data comprises one or more of: topography data (TD) for a region comprising the lifting arrangement and the destination, current ambient data (AD) of the region, current weight data (WD) for the UAV, current size data (SD) for the UAV, current energy content data (ED) of a local power source in the UAV, current energy content data of a power source providing power to the lifting arrangement, and elevation speed data (LS) of the lifting arrangement.

Item 28: The method of any one of items 24-27, wherein the selected altitude is calculated by evaluating the parameter data in relation to at least one predefined consumption parameter.

Item 29: The method of item 28, wherein the at least one predefined consumption parameter represents a consumption cost for performing the delivery at the destination.

Item 30: The method of item 28 or 29, wherein the at least one predefined consumption parameter comprises one or more of: an energy consumption in the UAV to deliver the goods at the destination, a total energy consumption comprising the energy consumption in the UAV and an elevation energy consumption to vertically elevate the UAV to the selected altitude, a time period from a reference time point to arrival of the UAV at the destination, or a monetary cost to deliver the goods at the destination.

Item 31: The method of any one of items 24-30, wherein the lifting arrangement is operated to vertically elevate a platform for carrying the UAV.

Item 32: The method of item 31, wherein the lifting arrangement (202A, 202B, 207) is operated to vertically elevate the platform while the UAV is carried by the platform.

Item 33: The method of item 31 or 32, further comprising: operating, after the UAV has been launched, the lifting arrangement to lower the platform from the selected altitude to a predefined altitude.

Item 34: The method of any one of items 31-33, wherein said operating (222) the lifting arrangement comprises: operating a conveyor device to lift the UAV onto the platform at least when the platform is vertically elevated.

Item 35: The method of any one of items 24-34, wherein said operating (222) the lifting arrangement comprises: operating an extendable mechanical connection device.

Item 36: The method of any one of items 24-33, wherein said operating (222) the lifting arrangement comprises: operating an aircraft (202B) that carries the UAV.

Item 37: The method of any one of items 24-36, wherein said operating (222) the lifting arrangement comprises: operating a flow generator to generate a vertical air flow towards the UAV.

Item 38: The method of any one of items 24-30, wherein said operating (222) the lifting arrangement comprises: supplying energy from a ground-based power source to the UAV over a power cable connected to the UAV while the propulsion system of the UAV operates to vertically elevate the UAV, and wherein said causing (223) the UAV to be launched comprises: releasing the power cable from the UAV.

Item 39: The method of any one of items 24-38, wherein said causing (223) the UAV to be launched comprises: providing a launch signal to the UAV when the lifting arrangement has elevated the UAV to the selected altitude, the launch signal causing the UAV to launch for the destination.

Item 40: A computer-readable medium comprising computer instructions (1102A) which, when executed by a processing system (1101), cause the processing system (1101) to perform the method according to any one of items 24-39.

4. Controlling a Group of Uavs for Delivery of Goods

This part of the disclosure relates to an improvement in the energy efficiency when delivering goods by UAVs.

One major challenge when operating a UAV on a mission for delivery and/or pick-up of goods is to ensure that the UAV has a sufficient reach to complete its mission given the available power capacity of the UAV and/or to make the most efficient use of the available power capacity. Conventionally, the reach of a UAV-based delivery system may be extended by special long-reach design of the UAVs, by air charging, or by handover of goods between UAVs. Each of these measures will increase cost and/or complexity of the delivery system.

Figure 25A:
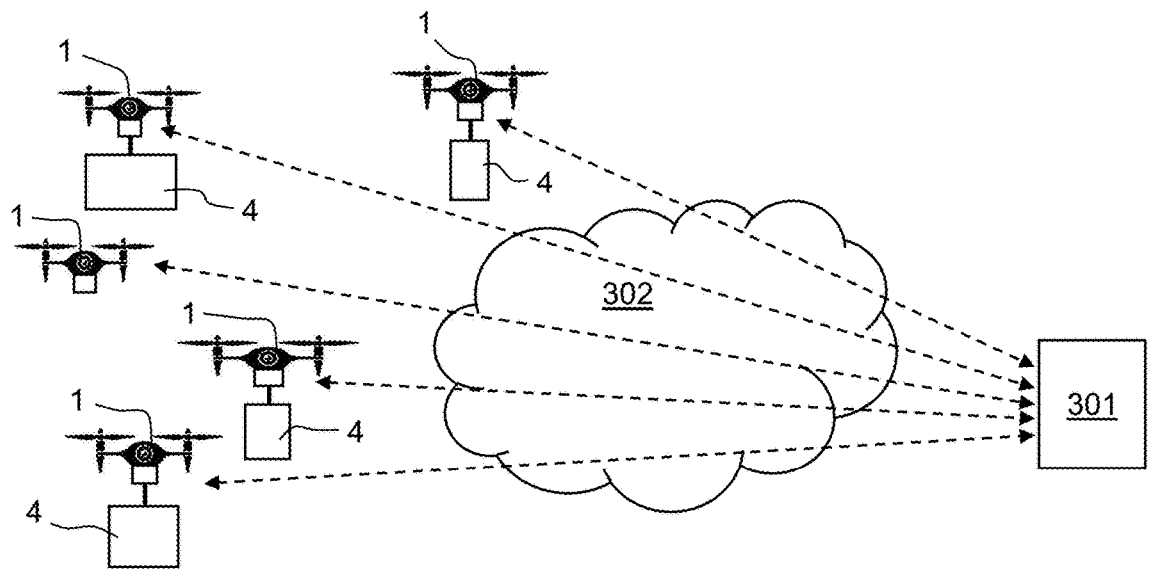
FIG. 25A is a schematic illustration of UAVs included in an example delivery system.

FIG. 25A illustrates an example delivery system comprising a fleet of UAVs 1. The delivery system comprises a control system 301 which is configured to communicate with the UAVs 1 over a wireless network 302. The control system 301 may be configured to assign missions to the UAVs 1 in the fleet, where a mission may comprise delivery and/or pick-up of goods 4 at one or more destinations, as well as other tasks that involve a relocation of an UAV such as taking pictures, making measurements, etc.

The energy efficiency of an individual UAV, or plural UAVs, may be improved by operating UAVs to fly in groups or "swarms". The UAVs in a swarm fly in the same direction and at the same travel speed. The UAVs may be arranged into such a swarm for at least part of their respective mission, for example as long as their respective destination is in approximately the same direction. During flight, UAVs may leave and join the swarm. Further, a swarm of UAVs may be broken up into smaller swarms, or swarms may be merged to form a larger swarm.

Figure 25B:
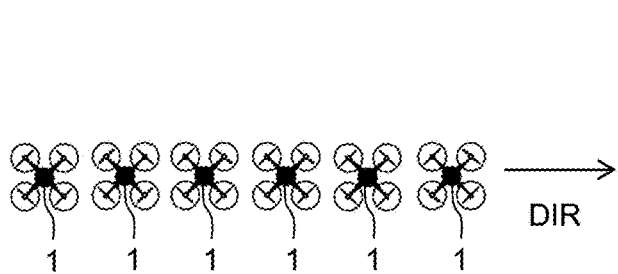
FIGS. 25B-25C are top plan views of example formations of UAVs on mission to deliver and/or pick up goods.
Figure 25C:
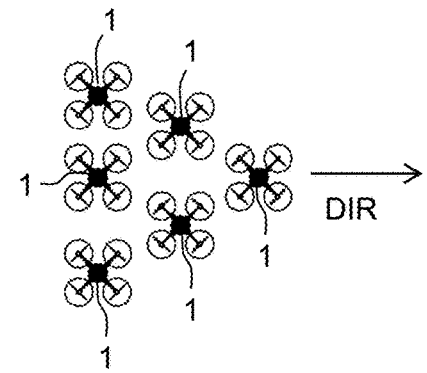

FIGS. 25B-25C show two non-limiting examples of swarm formations ("flight formations") that may be attained by a group of UAVs 1. In FIG. 25B, the swarm has a line formation, in which the UAVs 1 are arranged one after the other in the flight direction DIR of the swarm. In FIG. 25C, the swarm has a delta formation, in which the UAVs 1 are arranged to form an arrow shape in the flight direction DIR. FIG. 25C may be in plan view or in elevated side view. The swarm formation need not be two-dimensional, as shown, but may be three-dimensional.

Embodiments relate to the techniques for configuring a swarm of UAVs, and in particular the relative position of one or more UAVs in the swarm, to improve the performance of an individual UAV in the swarm, a subset of the UAVs in the swarm, or the swarm as a whole. The relative position of a UAV may be changed by changing the distance and/or direction between the UAV and one or more other UAVs in the swarm, and/or by switching places between the UAV and another UAV in the swarm, and/or by changing the swarm formation.

Figure 26:
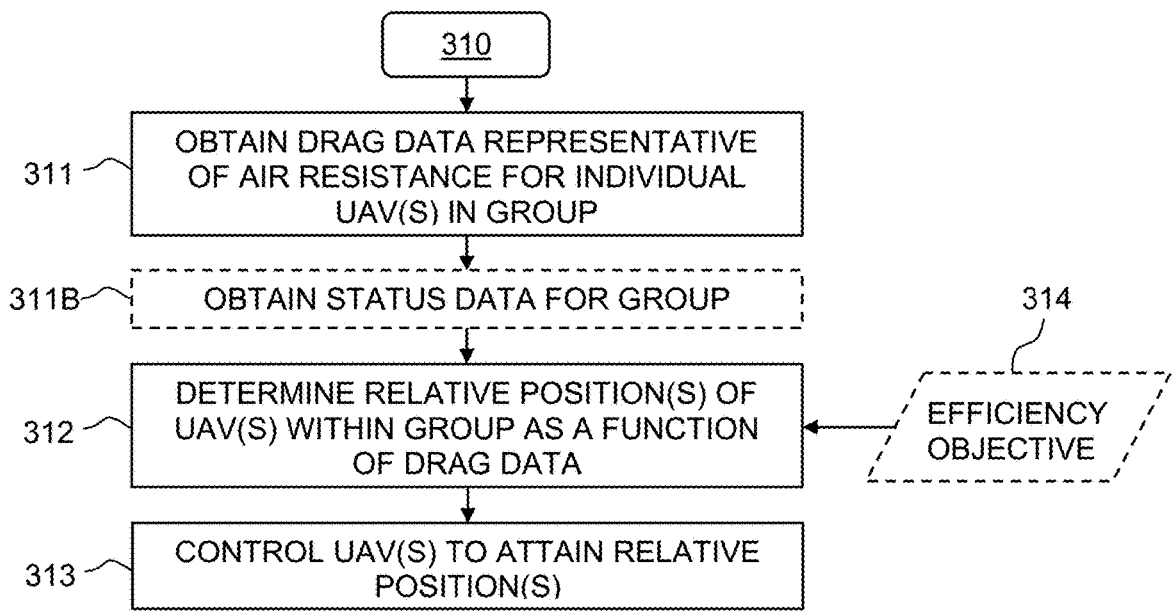
FIG. 26 is a flow chart of an example method of controlling a group of UAVs according to an embodiment.

FIG. 26 is a flow chart of an example method 310 for controlling a group of UAVs, which are on one or more missions to deliver and/or pickup goods and which travel in a common direction (cf. DIR in FIGS. 25A-25B) and thereby define a swarm. The example method 310 may be performed by the control system 301 or, as will be described below with reference to FIGS. 31A-31C, by one or more of the UAVs in the swarm. Step 311 obtains drag data indicative of the air resistance for a set of UAVs in the swarm. Such a set of UAVs comprises one or more UAVs and is denoted "monitored set" in the following. As will be described further below with reference to FIGS. 29A-29C, the drag data may include a measured value or a predefined value, or both. In some embodiments, step 311 may calculate a parameter value that represents the air resistance, based on the drag data. Step 312 determines a respective relative position for each UAV in the monitored set, based on the drag data, or the parameter value if calculated by step 311. In step 313, each UAV in the monitored set is controlled to attain its relative position.

Figure 30A:
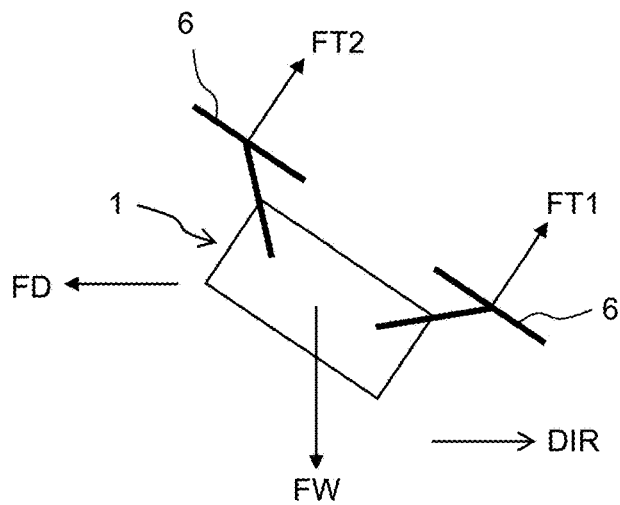
FIG. 30A is side view of forces acting on a UAV in transit.

The forces acting on an example UAV is illustrated in FIG. 30A, where the main body of the UAV 1 comprises at least two rotors or other spatially separated propulsion elements 6, which are operated to generate a respective thrust force FT1, FT2. In order for the UAV 1 to remain at its altitude, the vertical components of the trust forces FT1, FT2 need to be equal to the gravitational force FW acting on the UAV 1. The gravitational force FW corresponds to the total weight of the UAV, including any payload carried by the UAV. In order for the UAV 1 to move in the flight direction DIR, the rotors 6 need to generate a horizontal component of thrust force this direction. As seen, this may be achieved by increasing thrust force FT2 in relation to thrust force FT1, causing the UAV 1 to tilt in the flight direction DIR. When the UAV 1 moves at constant speed, the horizontal component of the total thrust force is equal to a force FD generated by air resistance, commonly denoted "drag force" or "drag". The drag force FW is a function of the size and shape of the UAV 1, as well as the size and shape of the payload 4, if present (cf. FIG. 25A). The drag force FW is also a function of the current absolute travel speed of the UAV 1, as well as the current direction and absolute speed of wind. As used herein, "absolute speed" is given relative to a fixed reference and may be ground speed. Further, as used herein, "air speed" of an UAV refers to the sum between the absolute travel speed of the UAV in the current direction and the absolute wind speed in the flight direction, where wind speed opposite to the flight direction has a negative value.

It is realized that the drag force FD may have a significant impact on the energy consumption of the UAV 1. A UAV carrying a payload with large cross-section and low weight may have the same total energy consumption as an identical UAV carrying a payload with small cross-section and high weight. In the context of a swarm, the wind speed, and possibly also the wind direction, will depend on the position of the UAV relative to other UAVs in the swarm. Thus, since the drag force FW is a function of wind speed/direction, one or more UAVs may be selectively re-positioned relative to other UAVs in the swarm based on their actual or estimated drag force. In one example, the above-mentioned UAV carrying a payload with large cross-section may be positioned to act as a "wind cover" for other UAVs in the swarm and thereby significantly reduce the energy consumption of the other UAVs. In another example, the above-mentioned UAV carrying a payload with large cross-section will benefit significantly, in terms of energy consumption, from being positioned behind one or more other UAVs that provide wind cover. It is thus realized that significant improvements in terms of energy consumption, reach, flight time, etc. may be achieved by adjusting the relative position of one or more UAVs in a swarm based on estimated drag, for example in accordance with the example method 310.

As indicated in FIG. 26, the determination in step 312 may be performed to achieve an efficiency objective. In some embodiments, step 312 may involve optimizing the respective relative position of the UAV(s) in the monitored set to meet the efficiency objective. The efficiency objective for a swarm may change over time and may be set by the control system 301 or by one or the UAVs in the swarm. In one example, the efficiency objective is set to minimize the air resistance for at least one UAV in the swarm, which may or may not be included in the monitored set. In another example, the efficiency objective is set to minimize the energy consumption for at least one UAV in the swarm. In a further example, the efficiency objective is set to minimize the flight time for at least one UAV in the swarm, for example by allowing the speed of the swarm to be increased or by allowing the at least one UAV to operate at an increased speed after leaving the swarm.

The example method 310 may include an optional step 311B of obtaining current status data for the swarm, and step 312 may determine the respective relative position of the UAV(s) in the monitored set as a function of the drag data and the current status data. For example, the current status data may represent the number of UAVs in the swarm, the absolute travel speed of the swarm, the total weight of one or more UAVs, a remaining energy level in the local power source of one or more UAVs (cf. 1010 in FIG. 1), a model identifier of one or more UAVs, the destination of one or more UAVs, or any combination thereof. By including the current status data in the determination by step 312, a more precise optimization of the swarm is possible.

A simplified example of such use of current status data is shown in FIGS. 27A-27B. In FIG. 27A, an UAV 1 that carries a large-sized payload 4 and has a large remaining energy level, indicated by icon 315, is arranged at the front of the swarm to act as a wind cover for the other UAVs. In FIG. 27B, the UAV 1 carrying the large-size payload 4 is low in energy, as indicated by icon 315, and is therefore arranged at the trailing end of the swarm to benefit from the wind cover provided by the other UAVs 1.

In some embodiments, steps 312 and 313, and optionally step 311 and/or step 311B, may be performed continuously or intermittently for the swarm. This enables the swarm to account for changes in external conditions such as wind speed/direction, changes caused by one or more UAVs joining and/or leaving the swarm, as well as changes in the above-mentioned current status data for the swarm.

FIG. 28 is a flow chart of an example procedure 320 for arranging the UAVs in swarm. The example procedure 320 may be performed intermittently during swarm travel, for example at initial formation of a swarm and whenever a major structural change of the swarm occurs, for example when the number of UAVs in the swarm is changed. In step 321, a flight formation for the swarm is determined. In some embodiments, the flight formation is determined to minimize the air resistance of the swarm as a whole in view of the wind direction at the location of the swarm. Alternatively or additionally, the flight formation may be determined based on the air speed at one or more UAVs. Alternatively or additionally, the flight formation may be determined based on the number of UAVs in the swarm. Generally, the flight formation may be determined based on the drag data, the current status data, or any combination thereof. In some embodiments, the flight formation is selected among a set of predefined flight formations, for example including a line formation (FIG. 25B) and one or more arrow formations (FIG. 25C). In a non-limiting example, step 321 may select a line formation if the swarm encounters a strong headwind, and an arrow formation is the swarm encounters a strong crosswind.

In some embodiments, the predefined flight formations are associated with a respective flight template, which may comprise a predefined spatial arrangement of relative positions ("slots"), where each such slot is designated for one UAV. In some embodiments, the flight template may also associate an efficiency rank with the respective slot. The efficiency rank is a relative parameter that ranks the slots by air resistance for a nominal case, for example assuming that all UAVs are identical and carry no payload. A high efficiency rank may imply a low air resistance. For example, slots at the front of a flight formation are likely to have low efficiency rank. Reverting to FIG. 28, step 322 may obtain the flight template for the flight formation selected by step 321 and the associated efficiency ranks. Step 323 may obtain travel capacity data of one or more UAVs. For the respective UAV, the travel capacity data may include an estimation of a remaining flight range. In some embodiments, the remaining flight range may represent the flight distance (or equivalently, flight time) that remains before the local power source in the UAV is empty or has reached a low energy limit. In the following, the remaining flight range is designated ERFD ("estimated remaining flight distance"). The ERFD may be continuously or intermittently calculated by or for the respective UAV, for example based on historic or current power consumption and current energy level of the local power source. The historic or current power consumption may be supplemented or replaced by calculations based on drag data and status data, such as total frontal area, total weight, air speed, etc. It may be noted that ERFD, irrespective of calculation, is a composite parameter that inherently includes both drag data and status data of an UAV. Specifically, momentary changes in ERFD for an UAV during flight in a swarm is directly proportional to changes in air resistance, since all other variables affecting the ERFD may be considered to be constant. In step 324, the UAVs are assigned to the slots so as to match the ERFD to the efficiency ranks of the slots. For example, the matching may involve assigning UAVs with higher ERFD to slots with lower efficiency rank.

It should be understood that other definitions of the remaining flight range are possible. In one example, the remaining flight range may represent the flight distance (or equivalently, flight time) that remains until the UAV has completed its mission, for example by arriving at its destination to perform a pick-up/delivery of goods. Such a remaining flight range may be used to optimize the monitored set to enable the respective included UAV to complete its mission.

The procedure 320 results in a basic swarm configuration, which is optimized for flight distance or flight time based on a generic estimation of air resistance for the respective UAV. By applying this basic swarm configuration to the swarm, the magnitude and number of changes among the UAVs in the swarm during continued flight, for example based on the method 310, will be reduced. This will in turn reduce the complexity of controlling the UAVs during flight in the swarm.

In other embodiments, the efficiency rank and the travel capacity data may be omitted and step 324 assigns the UAVs to the slots based on some other logic or randomly.

Reverting to step 311 in FIG. 26, the drag data may comprise a predefined value for the respective UAV in the measured set. The predefined value may be a pre-estimated air resistance value ("drag value") for the UAV 1 and any payload 4 it presently carries. For example, the UAVs may be categorized into different UAV types by air resistance and the payloads 4 may be categorized into different payload types by air resistance. Thus, based on UAV type and payload type, a drag value may be estimated for the respective UAV.

FIG. 29A is a flowchart of an example procedure for determining a drag value for an UAV based on drag data comprising one or more predefined values. As indicated, the example procedure may be part of step 311. Step 331 obtains an identifier ("goods ID") for the payload carried by the UAV. The goods ID may directly or indirectly represent the above-mentioned payload type. The goods ID may be obtained from a scheduling device in the delivery system, or may be read by the UAV from the payload, for example by the above-mentioned code reader (cf. 1020 in FIG. 1). Step 332 determines, based on the goods ID, the frontal area of the UAV combined with its payload. Step 332 may be performed by use of a look-up table or algorithmically. It may be noted that the frontal area may be supplemented by data on the 2D or 3D shape of the payload 4, and/or other aerodynamic properties of the payload. Step 333 estimates the air speed of the UAV. The air speed may be given by the absolute travel speed of the UAV (and thus the swarm) and an estimation of the wind speed and wind direction. The wind speed and wind direction may be given by a weather forecast for the location of the swarm, optionally modified based on the slot occupied by the UAV. Alternatively or additionally, the wind speed/direction may be wind data compiled based on wind measurements performed by a large number of UAVs, which may be included in the fleet or not. Such UAVs may continuously measure and report local wind speeds and directions together with 3D coordinates to a wind server, which is configured to compile the reported data into a wind map, for example a 3D array layering above a geographical map. The wind server may also generate wind maps for a region with insufficient amounts of reported data by use of learning model, for example a convolutional neural network, which is trained based on compiled wind maps for different regions together with 3D models of the regions, and regional wind and weather conditions, etc. The wind server may then use the trained learning model to estimate wind maps for any region based on a 3D model of the region and regional wind and weather conditions. Such a wind server may be queried to obtain wind data in any of the concepts, aspects and embodiments described herein. Given the frontal area of the payload and the estimated air speed, and assuming that at least the frontal area of the UAV is known, step 334 may determine the drag value of the UAV.

In step 311, the drag data may comprise a measured value by or for the UAV, in addition to or instead of the predefined value. In the example procedure of FIG. 29A, step 333 may estimate the air speed of the UAV by obtaining measurement data from a wind sensor on the UAV, or on another UAV in the swarm.

FIG. 29B is a flowchart of another example procedure for determining a drag value for a UAV based on a measured value. As indicated, the example procedure may be part of step 311. Assuming that the UAV comprises two or more spatially separated propulsion elements (cf. rotors 6 in FIG. 30A), step 341 measures the distribution of propulsion energy between the propulsion elements, and step 343 calculates the current air resistance based on the distribution. As understood from the description of FIG. 30A, the difference in propulsion energy between rotors 6 represent the energy spent on compensating for air resistance. Step 341 may be performed when the acceleration is zero or close to zero. Alternatively, the procedure may include a step 342 of measuring the acceleration, and step 343 may compensate for the measured acceleration when calculating the air resistance.

Figure 29C:
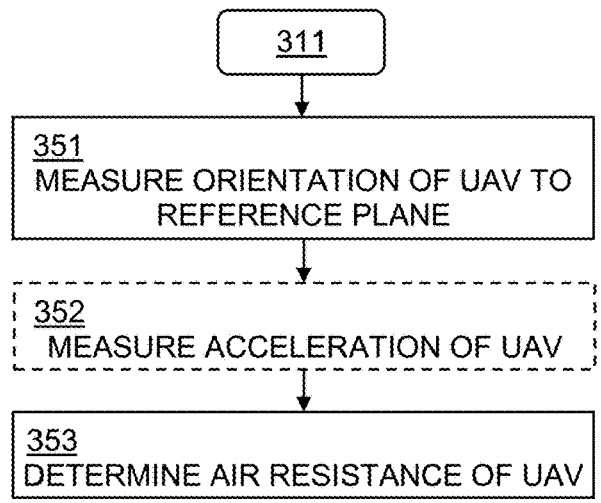
Figure 30B:
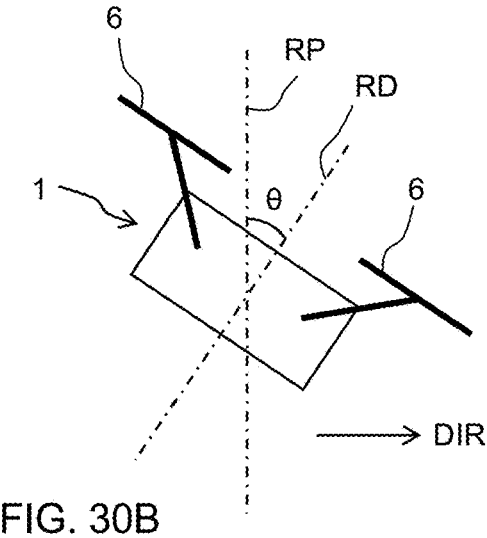
FIG. 30B shows an example definition of an orientation parameter of the UAV.

FIG. 29C is a flowchart of a further example procedure, which may be part of step 311. Step 351 measures the orientation of the UAV in relation to a reference plane. FIG. 30B shows an example of such a measurement, where the orientation is given by the tilt of the UAV 1 in the flight direction DIR, for example represented by an angle θ between a reference direction RD of the UAV 1 and a vertical reference plane RP facing DIR. Generally, the orientation may be represented by more than one angle, for example conventional angles for pitch and roll of the UAV, as measured by one or more sensors on the UAV (cf. 1016 in FIG. 1). Step 353 calculates the current air resistance based on the orientation, when the acceleration is zero or close to zero or by accounting for the current acceleration measured by step 352.

In some embodiments, the methods and procedures described in the foregoing are performed by the control system 301 in FIG. 25A. With reference to the method 310 in FIG. 26, the control system 301 may obtain (step 311) drag data and optionally status data (step 311B) for the respective UAV in the monitored set, and transmit (step 313) control data to the swarm causing the respective UAV to attain its relative position, as determined by the control system 301 (step 312). As understood from the foregoing, the control system 301 may or may not communicate with the swarm to obtain the drag data.

In some embodiments, at least part of the methods and procedures are performed by the respective UAV in the monitored set. For example, one or more of the procedures in FIGS. 29A-29C may be performed by the respective UAV and the resulting drag value may be transmitted to the control system 301.

Figure 31A:
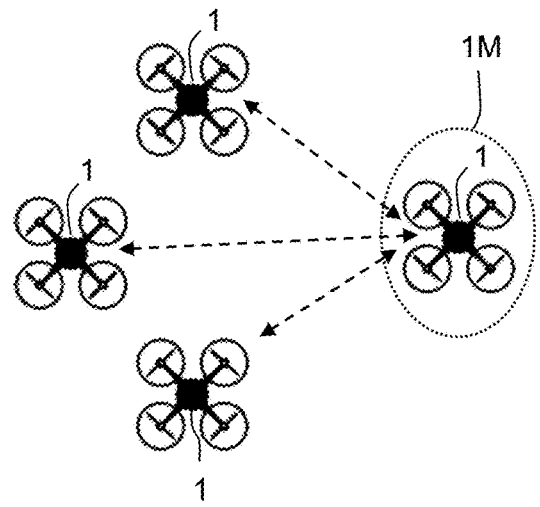
FIGS. 31A-31B are top plan views of an example group of UAVs with a master and illustrates example data paths within the group.
Figure 31B:
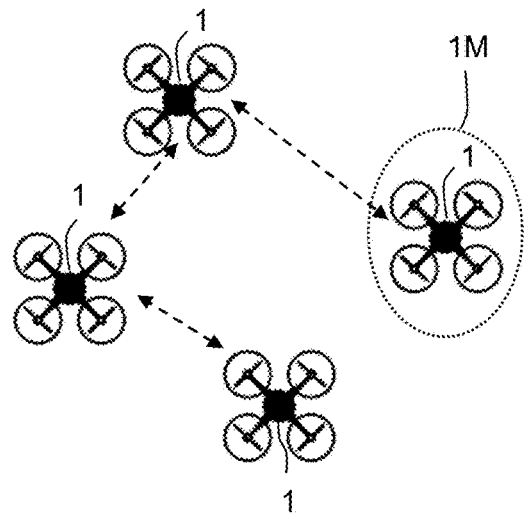

In some embodiments, the methods and procedures are performed by at least one of the UAVs in the swarm. For example, at least part of the methods and procedures may be performed by a master UAV among the UAVs in the swarm. The master UAV may thus take the role of the control system 301 and is configured to at least communicate control data to the UAVs in the swarm. The master UAV may also be configured to receive UAV data from the UAVs, for example drag data and/or status data. FIGS. 31A-31B show two examples of communication paths within the swarm. In FIG. 31A, the master UAV 1M communicates directly with the other UAVs in the swarm. In FIG. 31B, the UAVs are configured to form a sequence of communication links between pairs of UAVs, where the respective UAV may transfer at least part of incoming data to another UAV.

In some embodiments, the master UAV is dynamically selected among the UAVs in the swarm, for example by performing a voting procedure among the UAVs. The voting procedure may be based on any conventional algorithm for leader election, for example as practiced in mesh networks. The voting procedure may be performed at initial formation of the swarm and/or in advance of the master UAV leaving the swarm.

In other embodiments, the master UAV is pre-selected, for example by the control system 301. The master UAV may be a UAV that is known to be included in the swarm from start to a final destination.

Figure 31C:
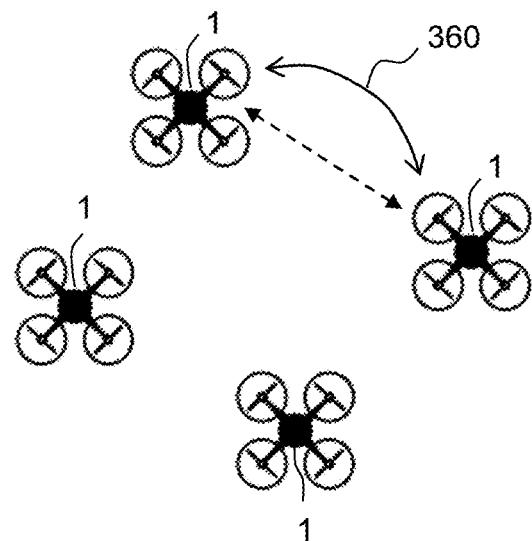
FIG. 31C is a top plan view of an example group of UAVs without master and illustrates a data exchange and a resulting switch of position.

In some embodiments, the method and procedures are performed jointly by the UAVs in the swarm, and the UAVs are operated to pairwise switch places in the swarm based on UAV data exchanged between the UAVs. An example is shown in FIG. 31C, in which two UAVs 1 exchange UAV data, as indicated by a dashed arrow, and then switch places, as indicated by a solid arrow 360. It should be understood that the UAV data may be exchanged between pairs of UAVs in other ways, for example via one or more other UAVs in the swarm. The UAV data may comprise drag data, and optionally status data. In some embodiments, the UAV data may comprise the travel capacity data, which may be given by the above-mentioned remaining flight range. In the following, use of the travel capacity data will be exemplified for the ERFD. The description is equally applicable to other definitions of the travel capacity data.

In some embodiments, the UAV data may be used to update a swarm that is configured in accordance with a flight template associated with efficiency ranks. In one example, a switching of positions is decided based on the ERFD of the respective UAV and the efficiency rank of the slot currently occupied by the respective UAV. The decision may made by pairs of UAVs, by a master UAV, or by the control system 301. The switching may be made to maximize the difference between the ERFD and the efficiency rank in the respective slot. Thus, UAVs switch places if one of the UAVs has both a higher ERFD and a higher efficiency rank than the other UAV. In other words, a switching will be performed if the total ERFD for the pair of UAVs is deemed to become higher when the UAVs switch places. When such switching is performed throughout the swarm, the UAVs with the highest ERFD will be in positions that take most air resistance, while UAVs with lower ERFD will fly in cover. The result is increased efficiency and thereby longer overall flight distance for the swarm. Additional information may be exchanged and used to decide on switching. For example, the additional information may include planned flight distance for the respective UAV, enabling the switching to optimize the swarm to ensure that all UAVs are capable of completing their planned flight distance. It should be noted that the ERFD decreases for the respective UAV during flight, and it may therefore be beneficial for the UAVs to repeatedly exchange UAV data and decide on switching.

The switching based on exchange of UAV data may be applied to achieve other efficiency objects. For example, the switching may be decided to maximize the ERFD for one or more selected UAVs in the swarm, causing the selected UAV(s) to be placed in the slots with the highest efficiency ranks.

Figure 32:
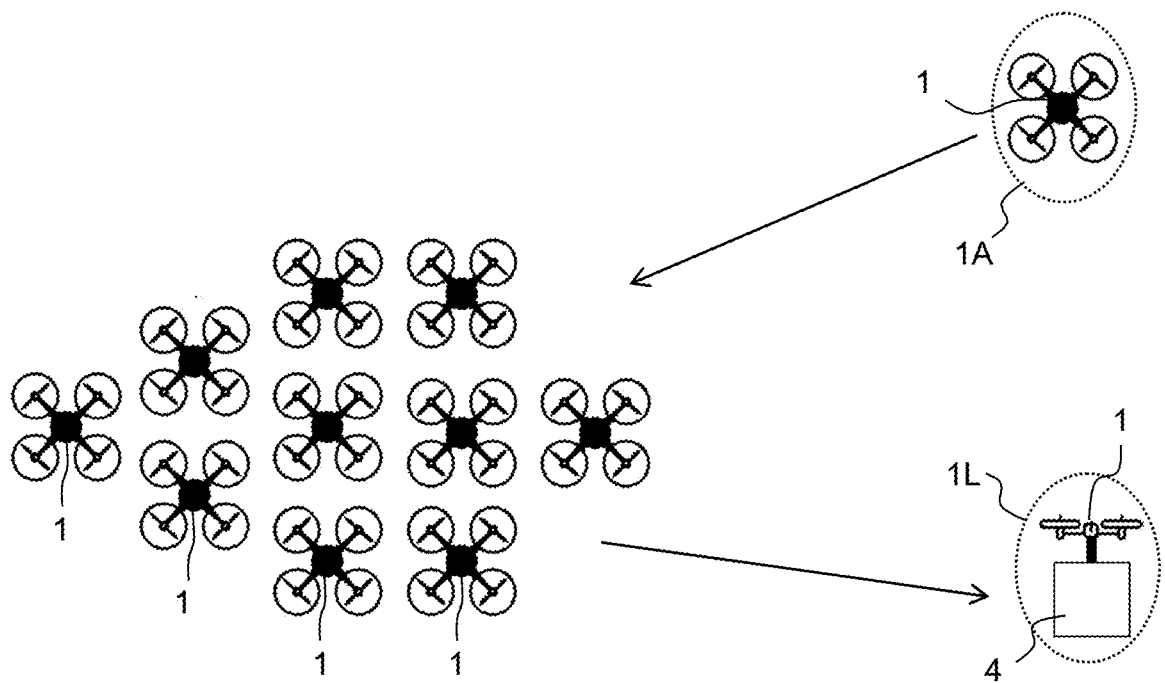
FIG. 32 is a schematic illustration of a group of UAVs in relation to UAVs joining and leaving the group.

Reverting the example method 310 in FIG. 26, step 312 may also account for upcoming events when determining the relative position of the respective UAV in the monitored set. In some embodiments, the relative position is determined as a function of a predicted time point when at least one UAV leaves the swarm, as indicated by 1L in FIG. 32, and/or a predicted time point when at least one UAV arrives and joins the swarm, as indicated by 1A in FIG. 32. For example, the UAV 1L and/or other UAVs in the swarm may be re-positioned to facilitate for the UAV 1L to leave the swarm. Similarly, the UAVs in the swarm may be re-positioned to provide a suitable position for the joining UAV 1A in the swarm, for example based on its ERFD.

In the following, items are recited to summarize some aspects and embodiments as disclosed in the foregoing.

Item 1: A method of controlling unmanned aerial vehicles, UAVs (1), which are organized in a group to perform one or more missions to deliver and/or pick up goods (4), said method comprising:

obtaining (311) drag data indicative of air resistance for one or more UAVs in the group;

determining (312), as a function of the drag data, a respective relative position of at least the one or more UAVs within the group; and controlling (313) at least the one or more UAVs to attain the respective relative position.

Item 2: The method of item 1, wherein the drag data comprises at least one of a predefined value for the one or more UAVs, or a measured value by or for the one or more UAVs.

Item 3: The method of item 2, wherein the predefined value is obtained as a function of the goods (4) carried by the one or more UAVs (1).

Item 4: The method of item 2 or 3, wherein the predefined value is indicative of a frontal area of the one or more UAVs (1) when carrying its goods (4).

Item 5: The method of any one of items 2-4, wherein the measured value is at least one of a travel speed of the one or more UAVs, an air speed at the one or more UAVs, a wind speed and/or wind direction, an acceleration of the one or more UAVs, an orientation of the one or more UAVs in relation to a reference plane (RP), or a distribution of propulsion energy to spatially separate propulsion elements (6) on the one or more UAVs.

Item 6: The method of any preceding item, wherein said determining (312) the respective relative position and said controlling (313) are performed continuously or intermittently while the UAVs (1) are organized in the group.

Item 7: The method of any preceding item, further comprising: obtaining (311B) current status data for the group, wherein the respective relative position is determined as a function of the drag data and the current status data, and wherein the current status data comprises one or more of: a total weight of a respective UAV, a count of the UAVs in the group, a speed of a respective UAV, a remaining energy level in a power source (1010) of a respective UAV, a model identifier of a respective UAV, or a destination of a respective UAV.

Item 8: The method of any preceding item, wherein said determining (312) the respective relative position comprises: optimizing, as a function of the drag data, the respective relative position of at least the one or more UAVs within the group to meet an efficiency objective.

Item 9: The method of item 8, wherein the efficiency objective comprises: minimizing, for at least one UAV in the group, one or more of air resistance, energy consumption or flight time.

Item 10: The method of any preceding item, further comprising: determining (321, 322) a flight formation for the group.

Item 11: The method of item 10, wherein the flight formation is selected among a set of predefined flight formations.

Item 12: The method of item 10 or 11, wherein the flight formation is associated with a template of predefined positions, wherein said method further comprises: selectively assigning (324) at least the one or more UAVs to at least a subset of the predefined positions.

Item 13: The method of item 12, further comprising: obtaining (323) travel capacity data of at least the one or more UAVs, wherein the predefined positions have a respective efficiency rank, and wherein at least the one or more UAVs are selectively assigned to the predefined positions to match the travel capacity data to the efficiency ranks of said at least a subset of the predefined positions.

Item 14: The method of any one of items 1-12, wherein said obtaining (311) the drag data comprising: obtaining travel capacity data of at least the one or more UAVs, wherein the respective relative position is determined as a function of the travel capacity data.

Item 15: The method of item 14, further comprising: repeatedly updating the travel capacity data, wherein said determining (312) the respective relative position and said controlling (313) comprise: selectively causing one or more pairs of UAVs to switch places in the group based on the updated travel capacity data.

Item 16: The method of item 14 or 15, wherein said obtaining (311) the drag data comprises: causing each UAV among the one or more UAVs to determine its travel capacity data, and causing the one or more UAVs to exchange the travel capacity data.

Item 17: The method of any of items 13-16, wherein the travel capacity data is indicative of a remaining flight range of the one or more UAVs at a defined time point.

Item 18: The method of any one of items 1-16, wherein said obtaining (311) the drag data, said determining (312) the respective relative position, and said controlling (313) are performed by a master UAV (1M) in the group.

Item 19: The method of any preceding item, wherein the respective relative position is further determined as a function of a predicted time point of at least one UAV (1A, 1L) leaving or joining the group.

Item 20: A control system configured to perform the method of any one of items 1-19 and comprising a communication device (1103) for communicating with at least one UAV in the group.

Item 21: An unmanned aerial vehicle, UAV, which is configured to be organized in a group with at least one further UAV and to perform the method of any one of items 1-19, said UAV comprising a communication device (1013) for communicating with said at least one further UAV.

Item 22: A computer-readable medium comprising computer instructions (1102A) which, when executed by a processing system (1101), cause the processing system (1101) to perform the method of any one of items 1-19.

5. Configuring a System for Delivery of Goods by Uavs

This part of the disclosure relates to a technique for configuring a delivery system to improve its resource efficiency and/or flexibility.

One problem that occurs in systems for delivery of goods by UAVs is that the recipient might not be present to receive the goods. Often, it is not an option to leave the goods at the location of the recipient, for example outside a house. Conventionally, deliveries need to be planned so that the UAVs have sufficient energy to return with the goods to its origin, for example a warehouse. In addition, delivery by UAVs involves a complex route/resource planning problem to optimize the utilization of the fleet of UAVs.

This part of the disclosure is based on the insight that utilization and flexibility may be improved by introducing mobile storages, also denoted "mobile nests" herein, which may be used as an intermediate storage facility where goods may be stored for a shorter period of time. The introduction of mobile nests provides for better resource efficiency, since the mobile bests may be positioned to facilitate operation of the delivery system. For example, UAVs may return goods to the mobile nests instead of to the warehouse and perform another delivery, allowing the final delivery of the goods to be performed by the UAV or another UAV at a later time. Further, the provision of nests may extend the distance for UAV-based delivery of goods, since one UAV may transport goods to a nest and another UAV may pick up the goods for transportation to a recipient or another nest. The nests may also be used as a switching points between different delivery systems, for example for hand over goods from one provider to another.

FIGS. 33A-33C illustrate an example delivery system configured in accordance with an embodiment. The delivery system comprises one or more central storage facilities 400 (one shown), for example a warehouse, and one or more local storage facilities ("fixed nests") 401 (one shown). The storage facilities 400, 401 are stationary and thus have fixed locations 400', 401' in a common coordinate system, for example given by (x,y,z) coordinates as shown. The delivery system further comprises mobile nests 402 (one shown) with variable positions in the common coordinate system. Generally, the delivery system may be seen to comprise "first storages" 400, 401 with fixed positions, and "second storages" 402 with variable positions. The delivery system may also comprise a fleet of UAVs 1.

FIG. 34A is a flowchart of an example method 410 for transportation of goods ("items") in this type of delivery system. In this example, it is assumed that the items 4 to be delivered are located at a warehouse 400 at the onset of the method 410, as shown in FIG. 33A. In step 411, one or more mobile nests 402 are moved into a respective selected rest position 402' (FIG. 33A). In step 412, items that have been ordered for delivery is transported at one or more time points from the warehouse 400 to the fixed nests 401 and the mobile nests 402, as shown in FIG. 33B. Any suitable vehicle 405 may be used for this transport, for example trucks, vans (as shown), cars, ships, UAVs, etc. In step 413, the items 4 are delivered to the recipients by UAVs 1 from the fixed nests 401 and the mobile nests 402, and possibly from the warehouse 400, as shown in FIG. 33C. It is realized that the rest position 402' of the respective mobile nest 402 may be adapted to achieve various objectives such as increasing the capacity of the delivery system, extending the range of the delivery system, reducing energy consumption, increasing flexibility, etc.

In the example method 410, the one or more mobile nests 402 are first controlled to move to the respective rest position 402', and the items to be delivered are then transported to mobile nest(s) 402 in the rest position(s) 402', and to the fixed nests 401. The mobile nests 402 may thus be distributed well in advance, for example based on estimated need for capacity. The estimation may be done on historical data and/or by use of preliminary requests for deliveries or pick-ups by users of the delivery system. One advantage of the time separation between nest distribution and goods distribution is that the goods may be delivered to the nests during bad conditions like major incidents, disasters or traffic congestions. For example, if goods are transported by cargo drones from the warehouse 400 to the nests 401, 402, the goods may be efficiently delivered to the nests 401, 402 even if there are traffic congestions for example during rush hours. In high risk areas for disasters, for example earthquake zones or a quarantined area, mobile nests 402 may be distributed and used as intermediate storages to enable UAV-based delivery of supplies and medicine to areas that are complicated or risky to reach by ground transportation.

In an alternative to the example method 410, at least some of the items to be delivered are transported by the mobile nest(s) 402 to the rest position(s) 402'.

The fixed and mobile nests 401, 402 may be used for intermediate storage of an item in the vicinity of its final delivery point, at which it will be received/retrieved by the consignee. For example, the nests 401, 402 may be placed in locations that are unused, for example on the roof of a building or on an unused parking space.

The items may be transported to the nests 401, 402 using the best delivery method based on, for example, one or more of: distance, weight of the items, number of items, value of the items, urgency, cost, speed of delivery, and available resources for the transportation, including vehicles and staff.

The nest 401, 402 may be configured to ensure tamper resistant storage of items, both for items delivered by the vehicles 105 and items that may be dropped off by a UAV for intermediate storage. Tamper resistance may be provided by a physical barrier or by a monitoring system that alerts an operator of unauthorized access. The nest may also comprise a charging station that allows one or more UAVs to land and re-charge their local power source (cf. 1010 in FIG. 1).

In some embodiments, a nest 401, 402 may be used for an intermediate storage of an item until one of the following events occurs: the delivery system detects that the consignee (for example, a recipient) is ready to receive the items, an UAV on the nest 401, 402 is re-charged and operable to deliver the item, or a new UAV arrive at the nest 401, 402 to continue the delivery of the item.

In some embodiments, once the item is stored in a nest 401, 402 located within range of the final delivery point, the consignee may be notified about the item and is allowed to schedule delivery, subject to the availability of UAVs for performing the final delivery.

In the following, embodiments for determining the rest position of the respective mobile nest 402 ("second storage") will be described. For clarity of presentation, these embodiments are exemplified for delivery of items to delivery points, which may represent a final delivery point selected by a consignee for the delivery or the location of another first or second storage in the delivery system. However, it may be noted that the embodiments are equally applicable to pick-up of items at pick-up points, which may represent the location selected by a consignor (for example, a user wanting a parcel collected) for the pick-up or the location of another first or second storage in the delivery system. Generally, the delivery and pick-up points are "destination points" for the UAVs irrespective of the direction that items are transported by the UAVs in relation to first and second storages.

The second storages 402 may be road-based vehicles, as shown in FIGS. 33A-33C. Generally, a second storage 402 is any storage facility that may be freely positioned and re-positioned at any rest position within the common coordinate system. Thus, the second storage 402 may be a container that is lifted off or a trailer that is disconnected from a road-based vehicle at a selected rest position, and which is later retrieved by this or another road-based vehicle. The first storages 400, 401 may be any storage facility that cannot be freely positioned and has a predefined location, at least at one or more predefined time points. Thus, the respective first storage may be any type of permanent structure such as a building, or a structure located on a vehicle that with restricted movement such as a train or a bus. For example, a first storage may be formed by a stop of the train or bus at a predefined time point. Generally, the first storages 400, 401 are associated with first positions that are known to the delivery system at any given time point.

FIG. 34B is a flow chart of an example method 420 for configuring a delivery system comprising the above-mentioned first and second storages. Step 421 obtains position data for a plurality of delivery points to which items are to be delivered. Step 422 operates a clustering algorithm of the position data to determine clusters of delivery points. Any density-based or partitional clustering algorithm may be used. In some embodiments, the clustering algorithm may be configured to separate the delivery points into any number of clusters given by the clustering itself. In other embodiments, the number of clusters may be predefined for the clustering algorithm. In some embodiments, such a predefined number of clusters may be set in relation to the number of currently available second storages. Step 423 evaluates the clusters in relation to the first positions of the first storages to determine a set of rest positions ("stopping positions") for at least one second storage.

The method 420 provides a technique of adapting the capacity of the delivery system to a current demand for delivery of goods in a resource efficient way, by accounting for the first positions of the first storages when determining the set of rest positions for the second storage(s).

In some embodiments, the set of rest positions is determined based on an evaluation function that evaluates the resource efficiency of assigning a respective destination point in a cluster to a reference point of the cluster in relation to assigning the respective destination point to one of the first positions. Such an evaluation function may evaluate the resource efficiency in terms of energy consumption, travel distance, delivery time, etc.

Figure 35A:
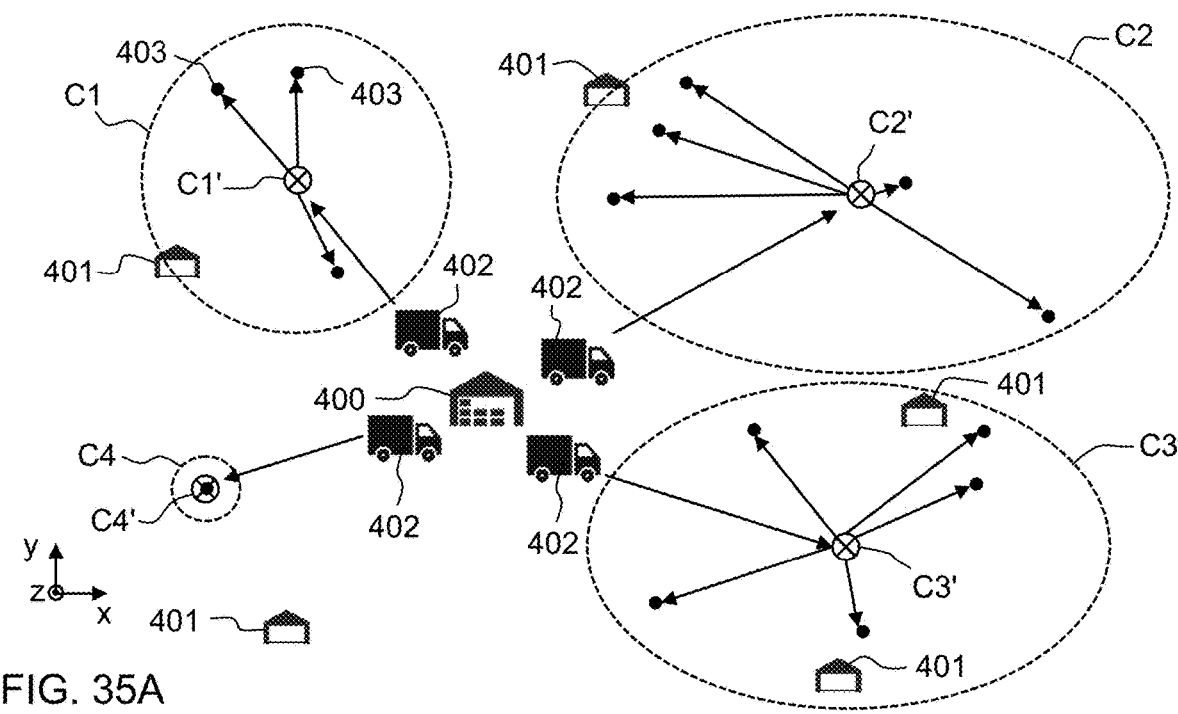
FIGS. 35A-35E are overviews of an example configuration method according to an embodiment.
Figure 35B:
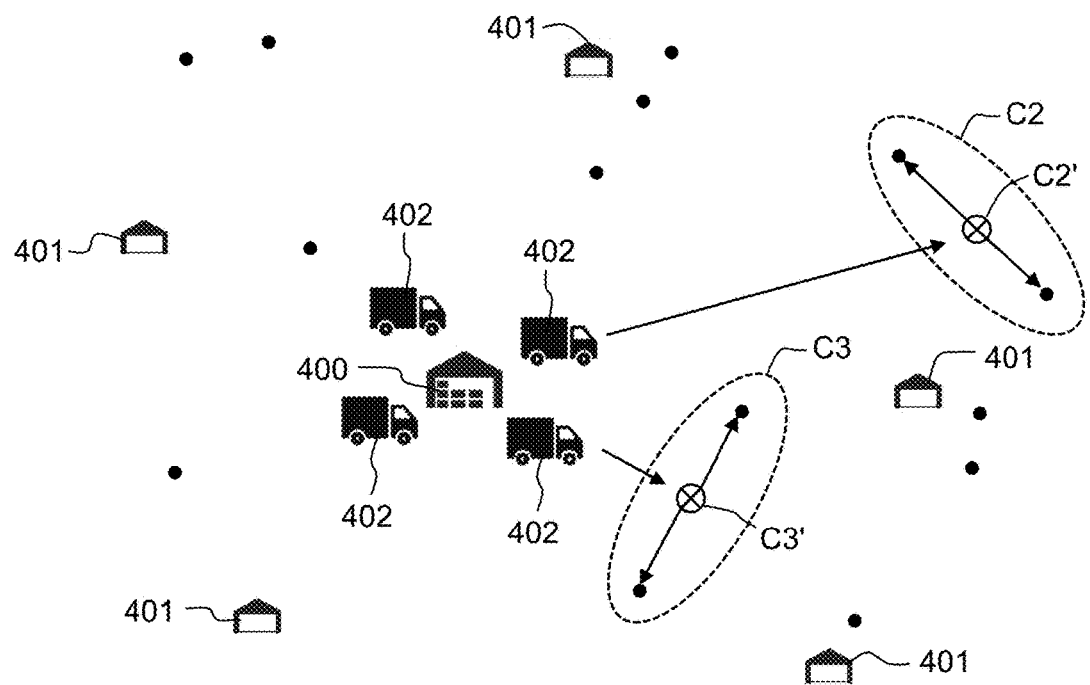
Figure 35C:
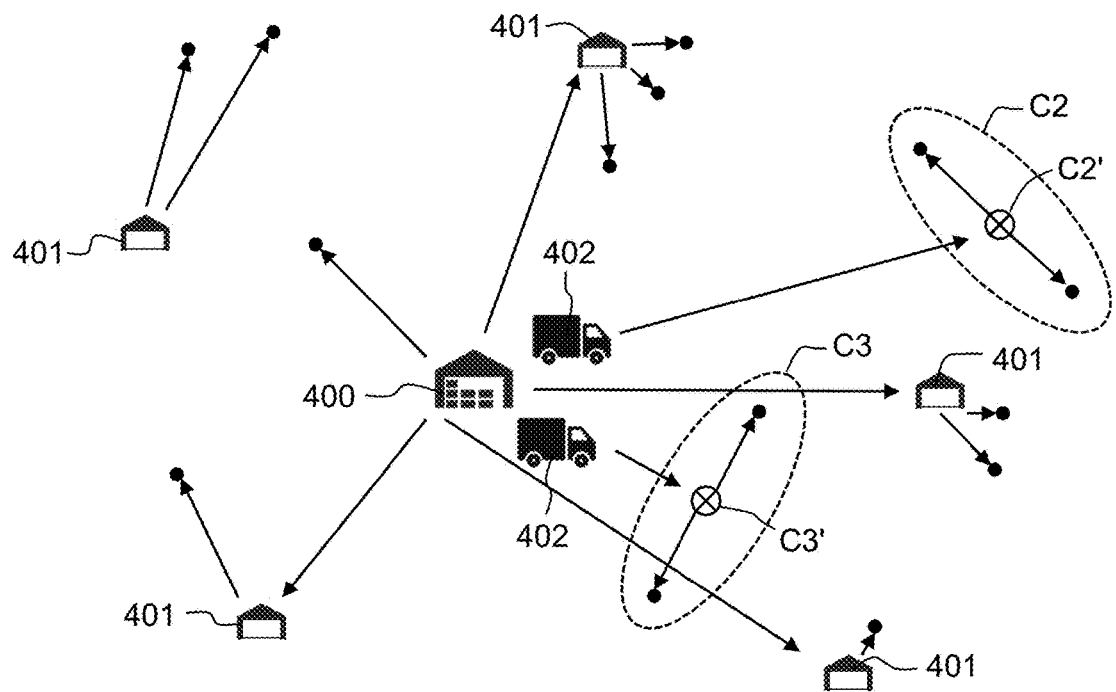

FIG. 35A shows an example delivery system with six first storages 400, 401 made up of one warehouse 400 and five fixed nests 401 that are distributed in a region around the warehouse 400. The delivery system also comprises four second storages 402, which are stationed at the warehouse 400 when not in use. Black dots represent the plurality of delivery points 403 to which items are to be delivered by UAVs. FIG. 35A also illustrates four clusters C1-C4 that have been generated by step 422. It is realized that step 423 may be performed in different ways to evaluate the clusters C1-C4 in relation to the first storages 400, 401 for determination of rest position(s). Some non-limiting examples will be given below with reference to FIGS. 34C-34D and FIGS. 35B-35E.

Reverting to FIG. 34B, the example method 420 may comprise a step 424 of assigning one or more of the first storages 400, 401 to a respective first subset of the delivery points and assigning one or more rest positions of the second storages 402 to a respective second subset of the delivery points. All first and second subsets may be mutually exclusive. In this context, "assigning" infers that the first/second storage is associated with the delivery point(s) of the respective first/second subset and will be used as a starting point for delivery of goods to the delivery point(s) by one or more UAVs. The example method 420 may further comprise a step 425 of assigning UAVs 1 for performing the delivery of goods from the respective first storage 400, 401 to its associated delivery points 403 and from the respective rest position of the second storage(s) 402 to its associated delivery points 403. Based on the assignment by step 424, items may be transported by the vehicles 105 to one or more second storages 402 at the rest position(s) determined by step 423. Based on the assignment by step 425, UAVs in the fleet of UAVs may be scheduled to perform the respective delivery. Some of the UAVs may be transported to the second storage(s) 402 together with the items. Other UAVs may be scheduled to fly to the rest position at a specific time point to perform one or more deliveries.

FIG. 34C is a flow chart of an example procedure for evaluating the clusters generated by the clustering in step 422. As indicated, the example procedure may be part of step 423. Step 430 determines a cost value for performing the delivery to each delivery point. The cost value is determined by assuming that the delivery is performed via a reference point of the cluster to which the delivery point belongs. In FIG. 35A, the reference point is represented as C1'-C4' in the clusters C1-C4. The reference point may be set at or near a center point of the cluster. The center point may be calculated in relation to the included delivery points, for example as a mean of their locations. The cost value for a delivery thus accounts at least for the UAV transportation of items from the reference point C1'-C4' to the delivery point 403, as indicated by arrows in FIG. 35A. The cost value may also account for the transport of items and/or a second station 402 to the reference point C1'-C4', for example from the central warehouse 400, and/or the transport of UAVs 1 to the respective reference point C1'-C4'. The cost value need not be a monetary value but may be given in any type of unit. In some embodiments, the cost value may be calculated as a function of distance in the common coordinate system and/or as a function of estimated energy consumption. In this context, as least when relating to transport by road, the distance may be determined to account for the availability of roads and speed limits of these roads, for example to meet a time limit for arrival at the respective reference point C1'-C4'. The cost value may also be calculated to account for "overall costs", such as costs for drivers of the second storages, parking fees for the second storages, etc. Such overall costs may be specific to each cluster and may be split across all delivery points associated with the cluster.

The procedure may then use the cost values to determine rest position(s) of second storages 402, as well as first storages 400, 401, to be used for the delivery of goods. In some situations, this determination may result in only first storages 400, 401 or only second storages 402 being used. In the example of FIG. 34C, the determination involves a step 431 of identifying and selecting, based on the cost values, delivery points that are unsuitable for delivery via second storages 402 or, equivalently, delivery points that are more suitable for delivery via first storages 400, 401. For example, step 431 may select all delivery points with a cost value that exceeds a cost threshold, CTH. These selected delivery points are denoted "first storage delivery points" (FSDP) in the following. The CTH may be set to represent a nominal cost for performing a delivery via one of the first storages 400, 401. It is conceivable that the CTH is specific to each cluster C1-C4, or even to each delivery point. In one embodiment, to set a CTH for each delivery point, step 431 may determine "candidate cost values" for delivery to the delivery point via each one of the first storages 400, 401, and set the CTH as a function of the candidate cost values. For example, the CTH may be set is relation to the smallest of the candidate cost values. Thereby, step 431 will identify all delivery points for which it is more cost-effective to deliver the items via a first storage 400, 401.

Step 432 then determines a set of remaining clusters among the clusters after removing the FSDP from the clusters, where each such remaining cluster includes at least one delivery point. Step 433 then determines the rest position(s) as a function of the remaining cluster(s), for example by setting a rest position at the reference point of the respective remaining cluster. The effect of steps 431-433 may be seen by comparing FIG. 35A with FIG. 35B, which illustrates the remaining clusters C2, C3 after removal of the FSDP from the clusters C1-C4 in FIG. 35A. The rest positions may be given by the reference points C2', C3' of the remaining clusters C2, C3. It should be noted that the reference points C2', C3' differ between FIG. 35A and FIG. 35B, since the included delivery points have changed.

Step 433 may further comprise assigning the FSDP among the first storages 400, 401 according to any suitable algorithm. It is also conceivable that step 433 performs further refinement of the remaining clusters before determining the rest positions. FIG. 34C is a flowchart of an example procedure for assigning the FSDP in accordance with an embodiment. As indicated, the example procedure may be part of step 433.

In step 434, the respective delivery point in FSDP is associated with its closest first storage. The effect of step 434 is visualized in FIG. 35C, where arrows from first storages 400, 401 to delivery points (black dots) represent the resulting associations.

In step 435, the first storages 400, 401 are evaluated based on a cost criterion. In one example, step 435 may evaluate the first storages 400, 401 for detection of a negative cost balance. Such a negative cost balance may be identified if the cost for performing deliveries via the first storage 400, 401 to its associated delivery points exceeds a cost limit. The cost limit may represent the setup costs for the first storage 400, 401, or any other limit. Step 435 may also perform a corresponding evaluation of the second storages 402 as located at the reference points C2', C3' of the remaining clusters C2, C3. Step 435 may thus result in a set of first and/or second storages 400, 401, 402 with negative cost balance, denoted "candidate storage set" (CS S) in the following.

Figure 35D:
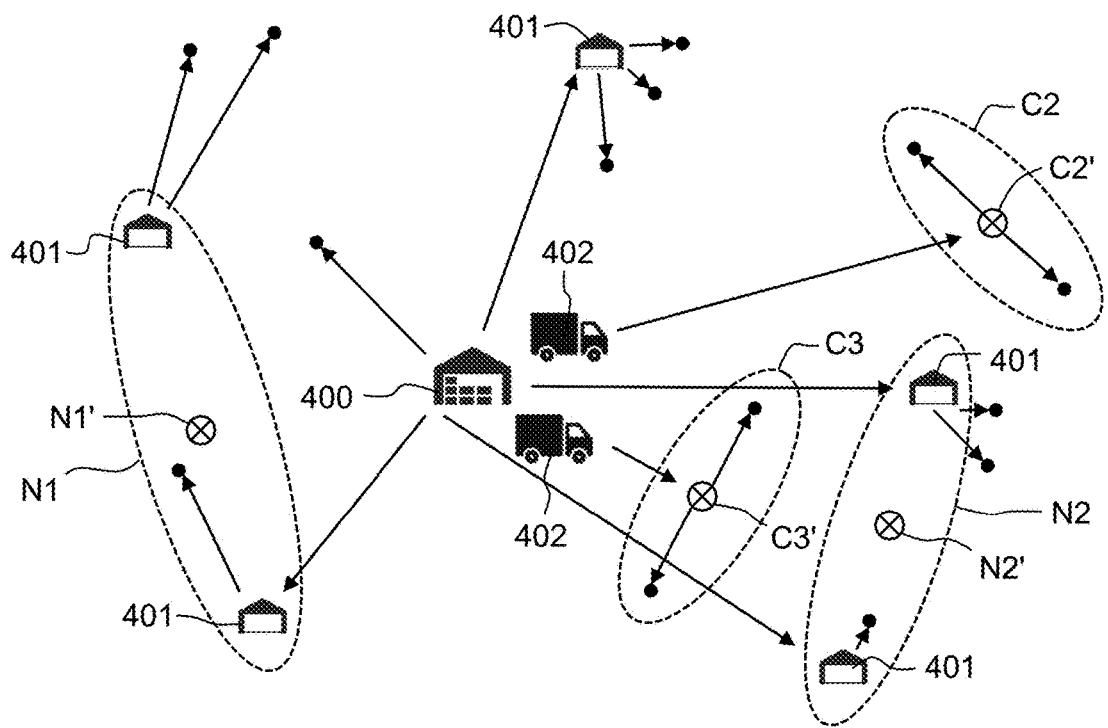

Step 436 operates a further clustering algorithm on the locations of the storages in the CSS. The further clustering algorithm may be a density-based algorithm such as DBSCAN, OPTICS, mean-shift, etc. Step 436 results in one or more storage clusters. The effect of step 436 is visualized in FIG. 35D, where two subsets of the first storages 401 are included in a respective storage cluster N1, N2. In FIG. 35D, the warehouse 400, the fixed nest 401 at the top, and the second storages at the reference points C2', C3' are not included in the candidate storage set and have thus not been found to have a negative cost balance in step 435. These storages will keep their assigned delivery points, given by steps 432-433 for second storages 402 (cf. FIG. 35B) and step 434 for first storages 400, 401 (cf. FIG. 35C).

In step 437, one storage is selected per storage cluster N1, N2, resulting in a "selected storage" (SS) or, equivalently, "selected storage position". In some embodiments, step 437 excludes any second storages, if present, and selects the SS among first storage(s) in the respective storage cluster. In some embodiments, step 437 determines a center point of the respective storage cluster, determines the distance from each storage in the storage cluster to the center point, and selects the SS as a function of the distances. In some embodiments, the SS may be selected as function of the distances and the number of delivery points associated with each storage in the storage cluster. For example, the distance of each storage may be downscaled by its number of associated delivery points. In FIG. 35D, center points of the storage clusters N1, N2 are designated by N1', N2'.

In step 438, all delivery points that are associated with the storages in the respective storage cluster are assigned to the SS for the storage cluster. The effect of step 438 is visualized in FIG. 35D, where the delivery points designated by arrows 401X have been added to the selected storages of the storage clusters N1, N2 (FIG. 35D).

Finally, in step 439, the rest position(s) for the second storages may be updated, if steps 435-437 has changed the content of delivery points in the remaining cluster(s). The updated rest position may be set in relation to the center point of respective remaining cluster. In the example of FIG. 35D, step 439 need not be performed.

Figure 35E:
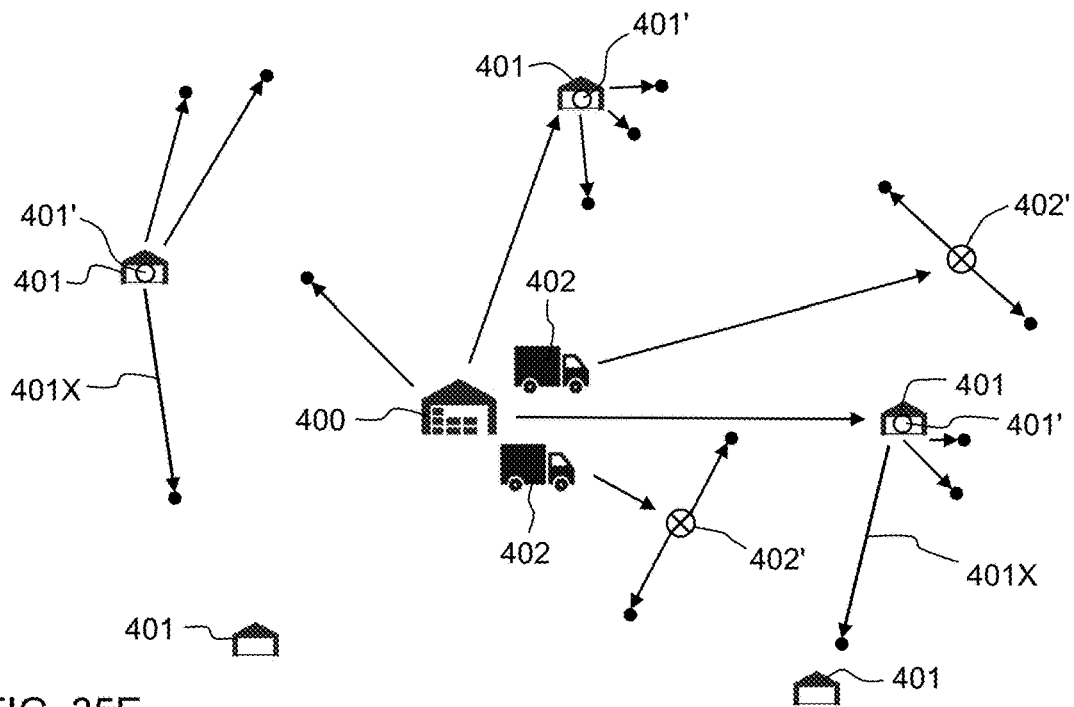

FIG. 35E illustrates the resulting configuration of the delivery system after completion of step 439. It is understood that the method 420, irrespective of embodiment, determines first locations 401' of first storages to be used for delivery to a respective subset of delivery points, as well as second locations (rest positions) to be attained by second storages for delivery to a respective subset of delivery points.

Figure 36:
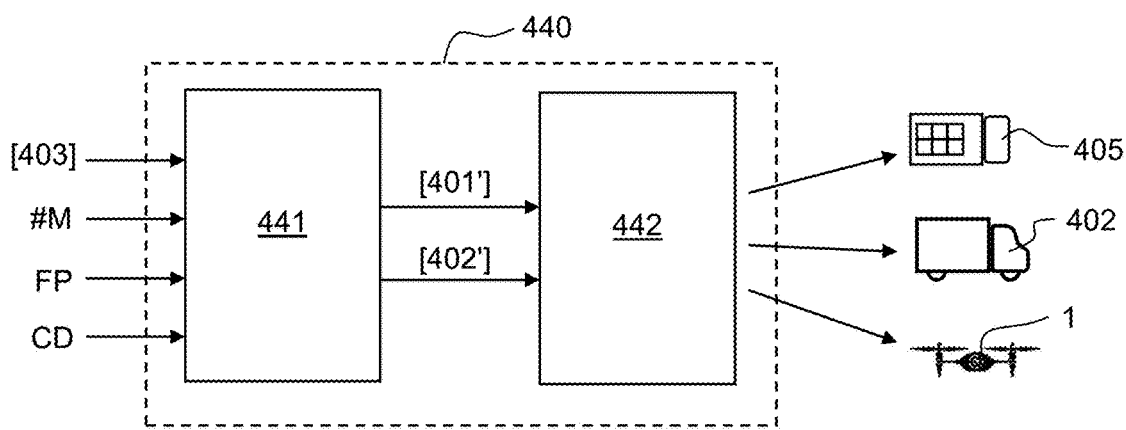
FIG. 36 is a block diagram of an example control system for a delivery system according to an embodiment.

The methods and procedures described above with reference to FIGS. 34-35 may be performed by a control system in the delivery system. FIG. 36 shows an example of such a control system 440, which comprises a calculation module 441 and a distribution module 442. The calculation module 441 may perform the method 420 in FIG. 34B, optionally based on the embodiments in FIG. 34C and/or FIG. 34D, to calculate a set of first positions [401'] and a set of second positions [402'] to be used for delivery of goods to a plurality of delivery points. The delivery points [403] are provided as input to the calculation module 441. The input to the calculation module 441 may further comprise, as shown, the number of second storages 402 that are available to be used (#M), the positions of all first storages 400, 401 that are available to be used (FP), or predefined cost parameters that may be used in the calculations (CD), such as the above-mentioned overall costs, predefined thresholds or limits (if used), etc. The distribution module 442 may be configured to receive the sets of first and second positions [401'], [402'] and to communicate corresponding configuration data to the second storages 402, UAVs 1 and transportation vehicles 405. The distribution module 442 may thereby perform the transportation method 410 in FIG. 34A by providing the configuration data to the second storages 402 in step 411, to the transportation vehicles 405 in step 412 and to the UAVs 1 in step 413.

In the following, items are recited to summarize some aspects and embodiments as disclosed in the foregoing.

Item 1: A method of configuring a delivery system, said delivery system comprising first storages (400, 401) with predefined positions, second storages (402) with variable positions, and unmanned aerial vehicles (1), UAVs, which are operable to transport goods between destination points (403) and the first and second storages (400-402), the destination points being locations where the UAVs pick up or deliver said goods, said method comprising:

obtaining (421) position data for the destination points;
operating (422) a clustering algorithm on the position data to determine clusters (C1-C4) of destination points; and
evaluating (423) the clusters in relation to the predefined positions of the first storages to determine a set of stopping positions (402') for at least one of the second storages (402).

Item 2. The method of item 1, wherein the set of stopping positions (402') is determined by evaluating the resource efficiency of assigning the destination points to reference points (C1'-C4') in the clusters (C1-C4) in relation to assigning the destination points to the first storages (400, 401).

Item 3. The method of item 1 or 2, further comprising: associating (424) one or more of the first storages (400, 401) to a respective first subset of the destination points; and associating (424) each stopping position in the set of stopping positions (402') to a respective second subset of the destination points.

Item 4. The method of item 3, further comprising: assigning (425) subsets of the UAVs (1) for delivery from the one or more of the first storages (400, 401) to the respective first subset of the destination points and from said each stopping position to the respective second subset of the destination points.

Item 5. The method of any preceding item, wherein said evaluating (423) comprises: determining (430), for a respective destination point in a respective cluster, a cost value for transportation to or from the respective destination point via a reference position (C1'-C4') within the respective cluster, wherein the set of stopping positions (402') is determined as a function of the cost value.

Item 6. The method of item 5, wherein said evaluating (423) further comprises: identifying (431), among the destination points, a selected set of destination points for which the cost value exceeds a cost threshold; determining (432) a set of remaining clusters among the clusters after removing the selected set of destination points from the clusters (C1-C4), a respective remaining cluster comprising at least one destination point; and determining (433) the set of stopping positions as a function of the set of remaining clusters.

Item 7. The method of item 6, wherein said determining (433) the set of stopping positions as a function of the set of remaining clusters comprises: setting, for the respective remaining cluster, a stopping position (402') in relation to the reference position of the respective remaining cluster.

Item 8. The method of item 6 or 7, wherein the evaluating (423) further comprises: associating (434) the selected set of destination points with a corresponding set of closest predefined positions among the predefined positions; identifying (435), based on a cost criterion, a set of candidate storage positions among the set of closest predefined positions; operating (436) a further clustering algorithm on the set of candidate storage positions to generate one or more storage clusters (N1, N2), and determining (437) a selected storage position (401') for a respective storage cluster among the one or more storage clusters (N1, N2).

Item 9. The method of item 8, wherein the evaluating (423) further comprises:
assigning (438) the selected storage position (401') to all destination points associated with the respective storage cluster (N1, N2).

Item 10. The method of item 8 or 9, wherein the selected storage position (401') is determined, for the respective storage cluster (N1, N2), as a function of at least one of: a distance from a respective candidate storage position in the respective storage cluster (N1, N2) to a reference point (N1', N2') of the respective storage cluster (N1, N2), or a number of destination points associated with a respective candidate storage position in the respective storage cluster (N1, N2).

Item 11. The method of any one of items 6-10, further comprising: determining the cost threshold for the respective destination point among the destination points, wherein said determining the cost threshold comprises: determining candidate cost values for transportation between the respective destination point and the predefined positions of the first storages (400, 401), and setting the cost threshold as a function of the candidate cost values.

Item 12. The method of any one of items 5-11, wherein the cost value corresponds to an estimated energy consumption.

Item 13. The method of any one of items 5-12, further comprising: determining a center point of the respective cluster (C1-C4), and setting the reference position (C1'-C4') in relation to the center point.

Item 14. The method of any preceding item, wherein the clustering algorithm is configured to generate a predefined number of clusters.

Item 15. The method of any preceding item, further comprising: providing (411) instructions to arrange the at least one second storage in the set of stopping positions in a first time interval, and providing (412) instructions to transport a subset of the goods to the at least one second storage in the set of stopping positions in a second time interval subsequent to the first time interval.

Item 16. A computer-readable medium comprising computer instructions (1102A) which, when executed by a processing system (1101), cause the processing system (1101) to perform the method of any one of items 1-15.

Item 17. A control system configured to perform the method of any one of items 1-15 and comprising a communication device (1103) for communicating with the second storages (402).

Figure 37:
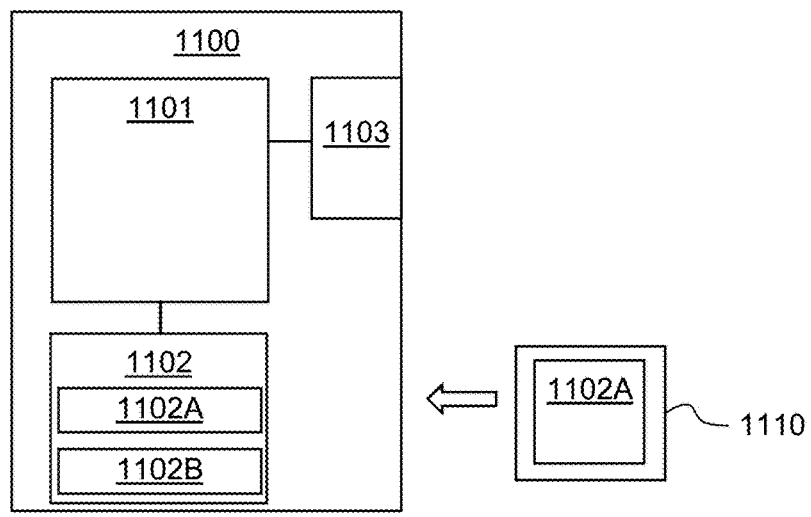
FIG. 37 is a block diagram of a machine that may implement methods, procedures and functions as described herein.

The structures and methods disclosed herein may be implemented by hardware or a combination of software and hardware. In some embodiments, such hardware comprises one or more software-controlled computer systems. FIG. 37 schematically depicts such a computer system 1100, which comprises a processing system 1101, computer memory 1102, and a communication interface or device 1103 for input and/or output of data. Depending on implementation, the computer system 1100 may be included in an UAV, in any external computing resource in communication with an UAV, or any other computing resource. The communication interface 1103 may be configured for wired and/or wireless communication. The processing system 1101 may e.g. include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 1102A comprising computer instructions is stored in the memory 1102 and executed by the processing system 1101 to perform any of the methods, operations, functions or steps exemplified in the foregoing. As indicated in FIG. 37, the memory 1102 may also store control data 102B for use by the processing system 1102. The control program 1102A may be supplied to the computer system 1100 on a computer-readable medium 1110, which may be a tangible (non-transitory) product (e.g. magnetic medium, optical disk, read-only memory, flash memory, etc.) or a propagating signal.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results. In certain circumstances, parallel processing may be advantageous.

As noted, any and all combinations of the above-described concepts and embodiments are possible and may provide synergies. A few non-limiting examples are presented below.

The embodiments presented in Chapter 1 may be combined with any of the embodiments presented in Chapters 2-5 to ensure safeguarded delivery of goods. The embodiments for improving utilization presented in Chapter 2 may be combined with the embodiments for safeguarded delivery presented in Chapter 1 to minimize the amount of lost/damaged goods, for example by including in the utilization cost the predicted risk of the goods being lost/damaged at a certain geographical position or sub-region. The embodiments presented in Chapter 2 may also be combined with the embodiments for controlling a group of UAVs presented in Chapter 4, for example by using the swarm position/direction as input to the computation of the aggregated cost data. The embodiments presented in Chapter 2 may also be combined with the embodiments for improved launching of UAVs presented in Chapter 3, for example by including the launch position and the altitude of the respective UAV being launched in the computation of the aggregated cost data. The embodiments for controlling a group of UAVs presented in Chapter 4 may be combined with the embodiments for improved launching of UAVs presented in Chapter 3 and/or the embodiments for configuring a delivery system presented in Chapter 5, for example to launch a swarm of UAVs from a launch station and/or a nest for further increased flight. The embodiments for configuring a delivery system presented in Chapter 5 may be combined with the embodiments for improved launching of UAVs presented in Chapter 3, for example by including the respective launch position as a position of a second storage (mobile nest). The embodiments presented in Chapter 5 may also be combined with the embodiments for safeguarded delivery presented in Chapter 1, for example to select a specific location for the second storage at the stopping position, for example by treating the second storage as a payload for safeguarded delivery.

The invention claimed is:

1. A system for launching an unmanned aerial vehicle (UAV) to deliver goods to a destination, said system comprising:
a lifting arrangement which is physically separate from the UAV and powered by a power source, the lifting arrangement being operable, before launch of the UAV, to vertically elevate the UAV to a selected altitude relative to a reference level; and
a control system configured to calculate the selected altitude and provide a corresponding control signal for the lifting arrangement,
wherein the control system is configured to calculate the selected altitude as a function of parameter data representing at least one of the UAV, the lifting arrangement, or surrounding conditions between the lifting arrangement and the destination, and
wherein the parameter data comprises one or more of topography data for a region comprising the lifting arrangement and the destination, current ambient data of the region, current weight data for the UAV, current size data for the UAV, current energy content data of a local power source in the UAV, current energy content data of the power source, or elevation speed data of the lifting arrangement.

2. The system of claim 1, wherein the parameter data further comprises a location of the lifting arrangement and the destination for the UAV.

3. The system of claim 1, wherein the control system is configured to calculate the selected altitude by evaluating the parameter data in relation to at least one predefined consumption parameter.

4. The system of claim 3, wherein the at least one predefined consumption parameter represents a consumption cost for performing delivery at the destination.

5. The system of claim 3, wherein the at least one predefined consumption parameter comprises one or more of an energy consumption in the UAV to deliver the goods at the destination, a total energy consumption comprising the energy consumption in the UAV and an elevation energy consumption to vertically elevate the UAV to the selected altitude, a time period from a reference time point to arrival of the UAV at the destination, or a monetary cost to deliver the goods at the destination.

6. The system of claim 1, wherein the lifting arrangement is on a mobile station.

7. The system of claim 1, wherein the lifting arrangement is operable to vertically elevate a platform for carrying the UAV.

8. The system of claim 7, wherein the lifting arrangement is configured to vertically elevate the platform while the UAV is carried by the platform.

9. The system of claim 7, wherein the control system is further configured to, after the launch of the UAV, operate the lifting arrangement to lower the platform from the selected altitude to a predefined altitude.

10. The system of claim 7, wherein the lifting arrangement comprises a conveyor device which is configured to lift the UAV onto the platform at least when the platform is vertically elevated.

11. The system of claim 1, wherein the lifting arrangement comprises one or more of:

an extendable mechanical connection device;
an aircraft;
a flow generator which is arranged to generate a vertical air flow towards the UAV; or
a power cable, which is releasably connected to the UAV for supplying energy from the power source to the UAV while the control system operates a propulsion system of the UAV to vertically elevate the UAV.

12. The system of claim 1, wherein the system is further configured to provide a launch signal to the UAV when the lifting arrangement has elevated the UAV to the selected altitude,
wherein the launch signal is configured to cause the UAV to launch for the destination.

13. An apparatus for configuring a delivery system comprising a plurality of systems in accordance with claim 1, the plurality of systems being mobile and the apparatus being configured to perform a method comprising:
obtaining a plurality of destinations for delivery of goods by the delivery system;
obtaining a number of launch locations to be determined;
determining said number of launch locations as a function of the plurality of destinations; and
directing one or more systems among the plurality of systems to the launch locations.

14. The apparatus of claim 13, wherein said determining comprises:
operating a clustering algorithm on the plurality of destinations to determine a number of clusters equal to said number of launch locations;
calculating geometric centers for the number of clusters; and
determining the launch locations in relation to the geometric centers.

15. The apparatus of claim 13, wherein said obtaining the number of launch locations comprises:
operating a clustering algorithm on the plurality of destinations in a plurality of repetitions, each repetition being configured to result in a different number of clusters;
evaluating the clusters resulting from the plurality of repetitions in relation to at least one evaluation parameter to be optimized; and
setting the number of launch locations based on said evaluating.

16. The apparatus of claim 15, wherein the at least one evaluation parameter comprises a first parameter representing operation of one or more UAVs from the launch locations to the plurality of destinations and/or a second parameter representing operation of one or more systems to launch the one or more UAVs.

17. The apparatus of claim 16, wherein the first parameter represents a maximum flight distance, a maximum flight time or a maximum energy consumption among the one or more UAVs when travelling from the launch locations to the plurality of destinations.

18. The apparatus of claim 16, wherein the second parameter represents a total energy consumption for the one or more systems, a total distance travelled by the one or more systems, or a time required for the one or more systems to launch the one or more UAVs.

19. A computer-implemented method of launching an unmanned aerial vehicle, UAV, to deliver goods at a destination, said method comprising:
calculating a selected altitude, relative to a reference level, for launching the UAV;

operating a lifting arrangement to vertically elevate the UAV to the selected altitude; and causing the UAV to be launched from the selected altitude.

20. The computer-implemented method of claim 19, wherein the selected altitude is calculated as a function of parameter data representing at least one of the UAV, the lifting arrangement, or surrounding conditions between the lifting arrangement and the destination.

\* \* \* \* \*